(12) United States Patent
Kim et al.

(10) Patent No.: US 10,768,484 B2
(45) Date of Patent: Sep. 8, 2020

(54) DISPLAY DEVICE

(71) Applicant: LG ELECTRONICS INC., Seoul (KR)

(72) Inventors: Jeonggyu Kim, Seoul (KR); Jongho Han, Seoul (KR); Eunseok Kim, Seoul (KR); Uihyung Lee, Seoul (KR); Juyoung Joung, Seoul (KR); Jinsin Park, Seoul (KR)

(73) Assignee: LG ELECTRUNECS INC., Seoul (KR)

(*) Notice: Subject to any disclaimer, the term of this patent is extended or adjusted under 35 U.S.C. 154(b) by 0 days.

(21) Appl. No.: 16/441,910

(22) Filed: Jun. 14, 2019

(65) Prior Publication Data

US 2019/0310518 A1 Oct. 10, 2019

Related U.S. Application Data

(63) Continuation of application No. 15/407,611, filed on Jan. 17, 2017, now Pat. No. 10,324,334.

(30) Foreign Application Priority Data

Jan. 21, 2016 (KR) .................. 10-2016-0007564
May 19, 2016 (KR) .................. 10-2016-0061420

(51) Int. Cl.
*G02F 1/13357* (2006.01)
*G02F 1/1335* (2006.01)

(52) U.S. Cl.
CPC ...... *G02F 1/133608* (2013.01); *G02F 1/1335* (2013.01); *G02F 1/133605* (2013.01);
(Continued)

(58) Field of Classification Search
CPC ......... G02F 1/133608; G02F 1/133611; G02F 1/133605; G02F 1/133606; G02F 1/1335;
(Continued)

(56) References Cited

U.S. PATENT DOCUMENTS 8,651,707 B1 * 2/2014 Tang .................. F21V 5/04
362/311.02
2004/0218388 A1 11/2004 Suzuki
(Continued)

FOREIGN PATENT DOCUMENTS

CN 1952750 A 4/2007
CN 203349065 U 12/2013
(Continued)

OTHER PUBLICATIONS

English Machine Translation of KR_20160148810A Jang Soon Ick (Year: 2016).*

*Primary Examiner* — Isiaka O Akanbi
*Assistant Examiner* — Glenn D Zimmerman
(74) *Attorney, Agent, or Firm* — Birch, Stewart, Kolasch & Birch, LLP

(57) ABSTRACT

A backlight unit including a frame having a bottom area and a sidewall area extended from the bottom area; a single substrate located in on the bottom area of the frame, a plurality of optical assemblies being mounted on the single substrate; a reflection sheet located the frame and configured to reflect light emitted by the optical assemblies; and an optical sheet located over the reflection sheet. Further, the reflection sheet a first sheet area corresponding to the bottom area of the frame; a second sheet area corresponding to the sidewall area of the frame; and a cut portion cut from the first sheet at one portion abutting on one side of the single substrate.

22 Claims, 69 Drawing Sheets

(52) U.S. Cl.
CPC .. *G02F 1/133606* (2013.01); *G02F 1/133611* (2013.01); *G02F 1/133603* (2013.01); *G02F 2001/133607* (2013.01); *G02F 2201/465* (2013.01)

(58) Field of Classification Search
CPC ......... G02F 2201/465; G02F 1/133603; G02F 2001/133607
See application file for complete search history.

(56) References Cited

U.S. PATENT DOCUMENTS

| | | | |
|---|---|---|---|
| 2005/0270671 A1 | 12/2005 | Nousou et al. | |
| 2008/0100773 A1* | 5/2008 | Hwang | G02B 3/005 349/62 |
| 2010/0002431 A1 | 1/2010 | Lin et al. | |
| 2012/0069248 A1* | 3/2012 | Yokota | G02F 1/133605 348/739 |
| 2014/0168970 A1* | 6/2014 | Choi | F21V 17/101 362/335 |
| 2014/0211121 A1* | 7/2014 | Cho | G02F 1/133603 349/58 |
| 2014/0218662 A1 | 8/2014 | Nameda | |
| 2014/0307421 A1 | 10/2014 | Lee et al. | |
| 2014/0321127 A1 | 10/2014 | Chang et al. | |
| 2015/0138759 A1* | 5/2015 | Nameda | G02F 1/133603 362/97.2 |
| 2015/0176807 A1* | 6/2015 | Park | G02B 19/0071 362/235 |
| 2015/0261041 A1 | 9/2015 | Choi et al. | |
| 2015/0331284 A1 | 11/2015 | Cho et al. | |
| 2015/0378214 A1* | 12/2015 | Tran | F21V 3/02 349/64 |
| 2016/0091760 A1* | 3/2016 | Ogura | G02F 1/133611 349/69 |
| 2016/0370652 A1* | 12/2016 | Hwang | G02F 1/133605 |
| 2017/0219881 A1 | 8/2017 | Shin et al. | |

FOREIGN PATENT DOCUMENTS

| | | | | | |
|---|---|---|---|---|---|
| CN | 203643721 U | | 6/2014 | | |
| CN | 103969888 A | | 8/2014 | | |
| CN | 105785486 B | * | 8/2018 | ................ | F21V 5/04 |
| KR | 10-2014-0076723 A | | 6/2014 | | |
| KR | 20160148810 A | * | 12/2016 | ........ | G02F 1/133605 |
| WO | 2012/165282 A1 | | 12/2012 | | |

* cited by examiner (a)

(b)

(a)

(b)

(a)

(b)

(a)

(b)

DISPLAY DEVICE

CROSS-REFERENCE TO RELATED APPLICATION

This application is a Continuation of U.S. application Ser. No. 15/407,611 filed Jan. 17, 2017, which claims the benefit of Korean Patent Application No. 10-2016-0007564 filed on Jan. 21, 2016, and Korean Patent Application No. 10-2016-0061420 filed on May 19, 2016 the entire contents of which are incorporated herein by reference for all purposes as if fully set forth herein.

BACKGROUND OF THE INVENTION

Field of the Invention

The present disclosure relates to a display device.

Discussion of the Related Art

With the development of the information society, various demands for display devices are increasing. Various display devices, such as liquid crystal displays (LCDs), plasma display panels (PDPs), electroluminescent displays (ELDs), and vacuum fluorescent displays (VFDs), have been studied and used to meet various demands for the display devices.

Among the display devices, the liquid crystal display panel of the LCD includes a liquid crystal layer, and a thin film transistor (TFT) substrate and a color filter substrate disposed to face each other with the liquid crystal layer interposed therebetween. The liquid crystal display panel displays an image using light provided by the backlight unit of the LCD.

SUMMARY OF THE INVENTION

In accordance with an aspect of the present invention, there can be provided a backlight unit, including a frame including a bottom area and a sidewall area extended from the bottom area, a single substrate located in at least one portion on the frame, a plurality of optical assemblies being mounted on the substrate, a reflection sheet located in at least another portion on the frame, and an optical sheet located over the reflection sheet, wherein the reflection sheet includes a cut portion, both ends of a portion abutting on one side of the substrate being cut.

In accordance with another aspect of the present invention, there is provided a display device, including a frame including a bottom area and a sidewall area extended from the bottom area, a single substrate located in at least one portion on the frame, a plurality of optical assemblies being mounted on the substrate, a reflection sheet located in at least another portion on the frame, an optical sheet located over the reflection sheet, and a display panel located over the optical sheet, wherein the reflection sheet includes a cut portion, both ends of a portion abutting on one side of the substrate being cut.

In accordance with yet another aspect of the present invention, there can be provided an optical lens, including a first surface forming an upper part, a second surface facing the first surface and forming a lower part, a third surface connecting the first surface and the second surface, and a plurality of lens extension parts extended in an external diameter direction of the second surface from some area of the third surface, wherein at least any one of the plurality of lens extension parts is spaced apart from at least another of the plurality of lens extension parts.

In accordance with another aspect of the present invention, there is provided a backlight unit, including a frame, a substrate located in front of the frame, a reflection sheet located in front of the at least one substrate, and an optical assembly disposed on the substrate. The optical assembly may include a light source and a lens located on one side of the light source and including a first surface having a circular section shape and forming an upper part, a second surface facing the first surface and forming a lower part, a third surface connecting the first surface and the second surface, and a plurality of lens extension parts extended in an external diameter direction of the second surface from some area of the third surface. At least one of the plurality of lens extension parts can be spaced apart from at least another of the plurality of lens extension parts.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
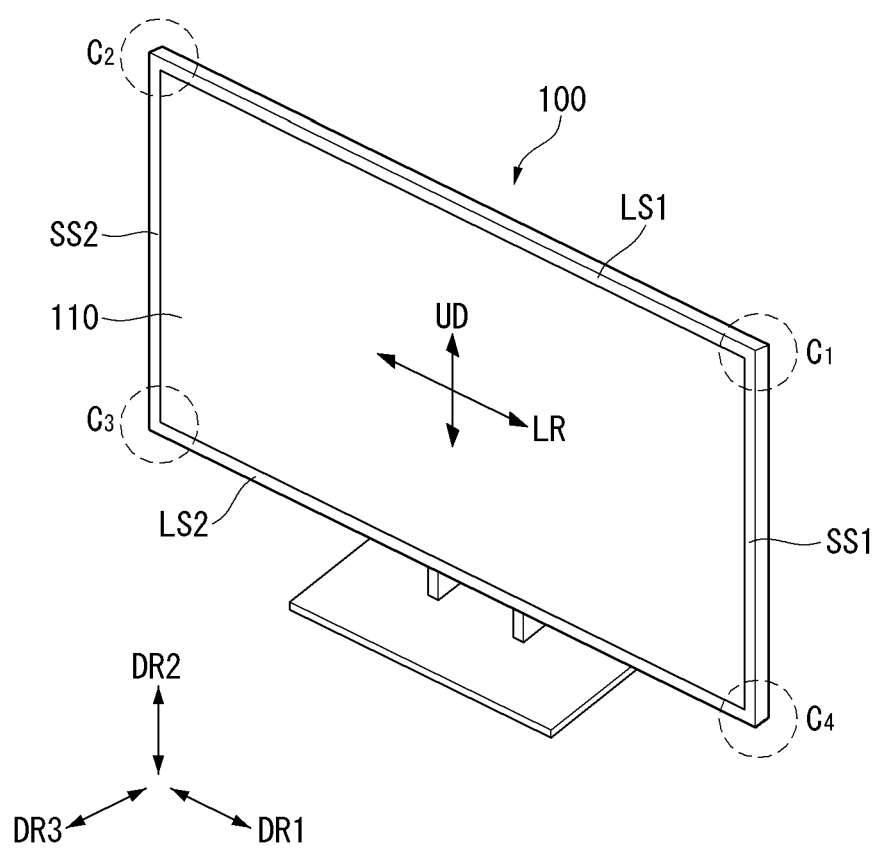
FIGS. 1 to 8 are diagrams showing the configuration of a display device related to an embodiment of the present invention.

Reference will now be made in detail embodiments of the invention examples of which are illustrated in the accompanying drawings. Since the present invention can be modified in various ways and may have various forms, specific embodiments are illustrated in the drawings and described in detail in the present specification. However, it should be understood that the present invention is not limited to the specific disclosed embodiments, but may include all modifications, equivalents and substitutes included within the spirit and technical scope of the present invention.

The terms 'first' and 'second' can be used to describe various elements, but the elements are not limited by such terms. The terms are used only for the purpose of distinguishing one element from other elements. For example, a first element can be designated as a second element without departing from the scope of the present invention. Likewise, a second element can be designated as a first element.

The term "and/or" encompasses both combinations of a plurality of related items disclosed and any item of the plurality of related items disclosed. When an arbitrary element is described as "being connected to" or "being coupled to" another element, this should be understood to mean that still another element(s) may exist between them, although the arbitrary element can be directly connected to, or coupled to, the second element. In contrast, when an arbitrary element is described as "being directly connected to" or "being directly coupled to" another element, this should be understood to mean that no element exists between them.

The terms used in the present application are used to describe only specific embodiments or examples, and are not intended to limit the present invention. A singular expression can include a plural expression as long as it does not have an apparently different meaning in context.

In the present application, it should be understood that the terms "include" and "have" are intended to designate that illustrated features, numbers, steps, operations, elements, parts or combinations thereof are present and to not exclude the presence of one or more different features, numbers, steps, operations, elements, parts or combinations thereof or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more fully. Accordingly, the shapes and sizes of elements shown in the drawings may be enlarged, for clarity.

Hereinafter, embodiments of the invention are described by taking a liquid crystal display panel as an example of a display panel. However, other display panels can be used. For example, a plasma display panel (PDP), a field emission display (FED) panel, and an organic light emitting diode (OLED) display panel can be used.

FIGS. 1 to 10 are diagrams showing the configuration of a display device related to an embodiment of the present invention. As shown in FIG. 1, in the following description, the display device 100 includes a first long side LS1, a second long side LS2 facing the first long side LS1, a first short side SS1 neighboring the first long side LS1 and the second long side LS2, and a second short side SS2 facing the first short side SS1.

The first short side SS1 can be said to be a first side area, and the second short side SS2 can be said to be a second side area facing the first side area. Also, the first long side LS1 can be said to be a third side area neighboring the first side area and the second side area and located between the first side area and the second side area. The second long side LS2 can be said to be a fourth side area neighboring the first side area and the second side area, located between the first side area and the second side area, and facing the third side area.

Furthermore, the first or second long side LS1 or LS2 has been illustrated as having a longer length than the first or second short side SS1 or SS2, for convenience of description, but the first or second long side LS1 or LS2 may have almost the same length as the first or second short side SS1 or SS2.

In the following description, a first direction DR1 can be a direction parallel to the long sides LS1 and LS2 of a display panel 110, and a second direction DR2 can be a direction parallel to the short sides SS1 and SS2 of the display panel 110. Also, a third direction DR3 can be a direction perpendicular to the first direction DR1 and/or the second direction DR2.

The first direction DR1 and the second direction DR2 can be collectively called a horizontal direction. Furthermore, the third direction DR3 can be called a vertical direction. In addition, the side on which the display device 10 displays an image can be said to be the front or the front surface. When the display device 10 displays an image, the side on which the image cannot be seen can be said to be the back or the backside. When the display device 10 is viewed at the front or the front surface, the side of the first long side LS1 can be said to be the upper side or the top. Likewise, the side of the second long side LS2 can be said to be the lower side or the bottom, the side of the first short side SS1 can be said to be the left or the left surface, and the side of the second short side SS2 can be said to be the right of the right surface.

Furthermore, the first long side LS1, the second long side LS2, the first short side SS1, and the second short side SS2 can be called the edges of the display device 10. Also, points at which the first long side LS1, the second long side LS2, the first short side SS1, and the second short side SS2 meet together can be called corners. For example, a point at which the first long side LS1 and the first short side SS1 meet can become a first corner C1, a point at which the first long side LS1 and the second short side SS2 meet can become a second corner C2, a point at which the second short side SS2 and the second long side LS2 meet can become a third corner C3, and a point at which the second long side LS2 and the first short side SS1 meet can become a fourth corner C4.

In this instance, a direction from the first short side SS1 to the second short side SS2 or a direction from the second short side SS2 to the first short side SS1 can be said to be a left right direction LR. A direction from the first long side LS1 to the second long side LS2 or a direction from the second long side LS2 the first long side LS1 can be said to be an up down direction UD.

Figure 2:
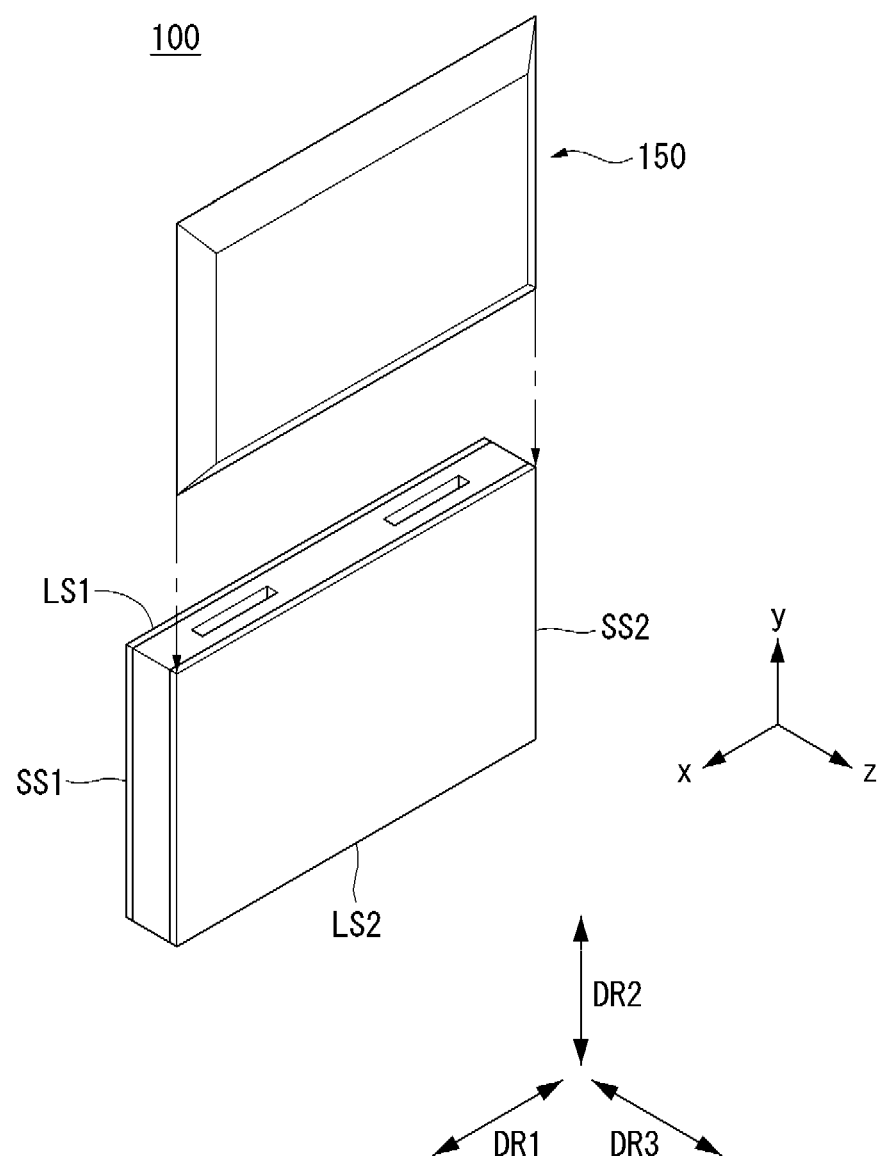

As shown in FIG. 2, the display device 100 according to an embodiment of the present invention may include a display panel 110 and a back cover 150 at the back of the display panel 110. The back cover 150 can be connected to the display panel 110 in a sliding manner in the direction from the first long side LS1 to the second long side LS2, that is, a second direction DR2. In other words, the back cover 150 can be inserted in a sliding manner from the first short side SS1 of the display panel 110, the second short side SS2 facing the first short side SS1, and the first long side LS1 neighboring the first and the second short sides SS1 and SS2 and located between the first short side SS1 and the second short side SS2. In order to connect the back cover 150 to the display panel 110 in a sliding manner, a protruding unit, a sliding unit, a coupling part, etc. can be included in the back cover 150 and/or another structure adjacent to the back cover 150.

Figure 3:
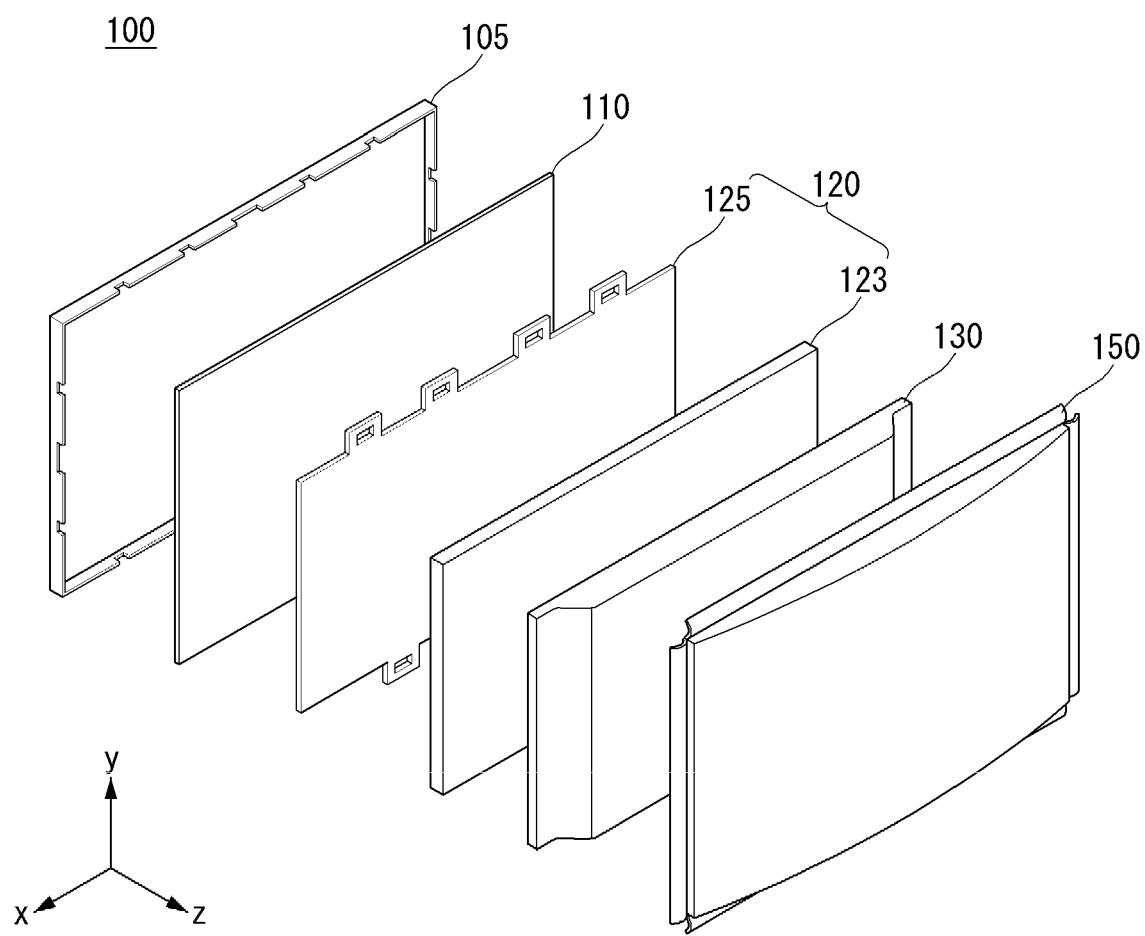

Next, FIGS. 3 to 7 are diagrams showing the configuration of the display device related to an embodiment of the present invention. As shown in FIG. 3, a display device 100 according to an embodiment of the present invention may include a front cover 105, a display panel 110, a backlight unit 120, a frame 130, and a back cover 150.

The front cover 105 may covers at least some area of the front and side of the display panel 110. The front cover 105 may have a rectangular frame shape having an empty center. Since the center of the front cover 105 is empty, an image of the display panel 110 can be displayed to the outside.

The front cover 105 can be divided into a front cover and a side cover. That is, the front cover 105 can be divided into the front cover placed on the front side of the display panel 110 and the side cover placed on the side of the display panel 110. The front cover and the side cover can be separately configured. Any one of the front cover and the side cover may be omitted. For example, the front cover is not present and only the side cover is present to enhance the beautiful of the design, etc.

The display panel 110 is provided at the front of the display device 100, and an image can be displayed on the display panel 110. The display panel 110 can divide an image into a plurality of pixels and output the image according to color, brightness, and chroma for each pixel. The display panel 110 can be divided into an active area in which an image is displayed and an inactive area in which an image is not displayed. The display panel 110 also includes a front substrate and a rear substrate facing each other with a liquid crystal layer interposed therebetween.

In particular, the front substrate includes a plurality of pixels including red (R), green (G), and blue (B) subpixels. The front substrate can generate an image corresponding to red, green or blue color in response to a control signal. The rear substrate can include switching elements. Thus, the rear substrate can switch a pixel electrode.

For example, the pixel electrode can change the arrangement of the molecules of the liquid crystal layer in response to an external control signal. The liquid crystal layer also includes a plurality of liquid crystal molecules. The arrangement of the liquid crystal molecules are changed in accordance with a voltage difference generated between the pixel electrode and a common electrode. The liquid crystal layer can also transfer light, supplied by the backlight unit 120, to the front substrate.

The backlight unit 120 is located at the back of the display panel 110 and includes a plurality of light sources. The light source of the backlight unit 120 can be disposed in a direct type or an edge type. For an edge type backlight unit 120, a light guide panel is included.

The backlight unit 120 can be coupled to the front of the frame 140. For example, the plurality of light sources can be disposed on the front side of the frame 140. In such a case, the backlight unit 120 is commonly called a direct type backlight unit.

The backlight unit 120 can be driven using a total driving method or a partial driving method, such as local dimming or impulsive. The backlight unit 120 may also include an optical sheet 125 and an optical layer 123. The optical sheet 125 enables light of the light source to be uniformly delivered to the display panel 110 and may include a plurality of layers. For example, the optical sheet 125 may include at least one prism sheet and/or at least one diffusion sheet.

In addition, the optical sheet 125 may include at least one coupling part 125d. The coupling part 125d can be coupled to the front cover 105 and/or the back cover 150. That is, the coupling part 125d can be directly coupled to the front cover 105 and/or the back cover 150. Alternatively, the coupling part 125d can be coupled to a structure coupled to the front cover 105 and/or the back cover 150. That is, the coupling part 125d can be indirectly coupled to the front cover 105 and/or the back cover 150. The optical layer 123 may include the light source and so on. The optical layer 123 is described in detail in a corresponding part.

The frame 130 functions to support elements of the display device 100. For example, an element, such as the backlight unit 120, can be coupled to the frame 130. The frame 130 can be made of a metallic material, such as an aluminum alloy. The back cover 150 can be located at the backside of the display device 100. The back cover 150 also protects internal elements from the outside. At least some of the back cover 150 can be coupled to the frame 130 and/or the front cover 105. The back cover 150 can also be an injected matter made of resin.

Figure 4:
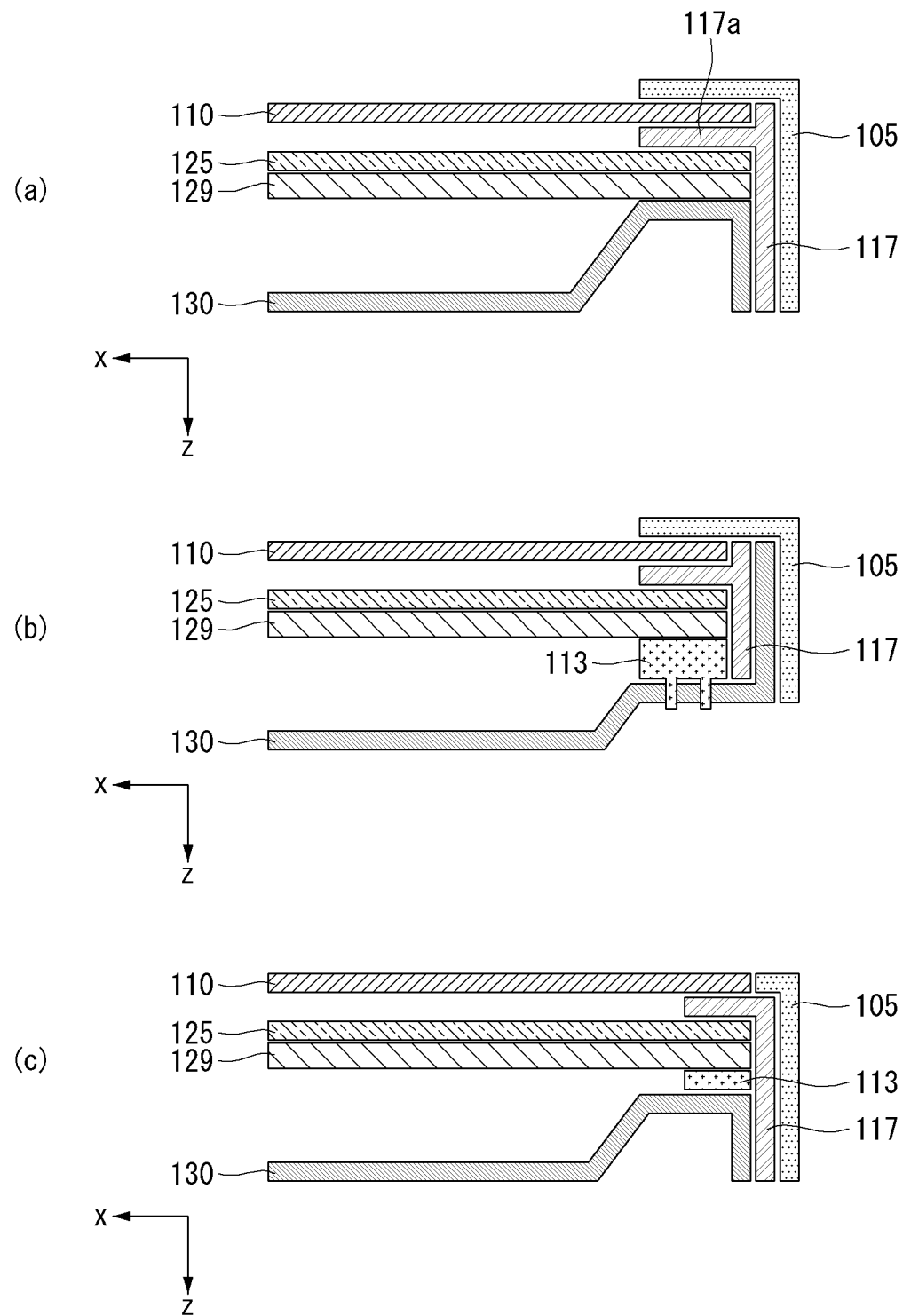

Next, FIG. 4 is a diagram showing elements, such as the optical sheet 125. As shown in FIG. 4(a), the optical sheet 125 and/or a diffusion plate 129 can be located above the frame 130. The optical sheet 125 and/or the diffusion plate 129 can be coupled to the frame 130 at the edge of the frame 130. The optical sheet 125 and/or the diffusion plate 129 can be directly seated in the edge of the frame 130. That is, the outer circumference of the optical sheet 125 and/or the diffusion plate 129 can be supported by the frame 130. The upper surface of the edge of the optical sheet 125 and/or the diffusion plate 129 can be surrounded by a first guide panel 117. For example, the optical sheet 125 and/or the diffusion plate 129 can be located between the edge of the frame 130 and the flange 117a of the first guide panel 117.

The display panel 110 can be located on the front side of the optical sheet 125, and the edge of the display panel 110 can be coupled to the first guide panel 117. That is, the display panel 110 can be supported by the first guide panel 117. In addition, the edge area of the front of the display panel 110 can be surrounded by the front cover 105. For example, the display panel 110 can be located between the first guide panel 117 and the front cover 105.

As shown in FIG. 4(b), the display device 100 according to an embodiment of the present invention may further include a second guide panel 113. The optical sheet 125 and/or the diffusion plate 129 can be coupled to the second guide panel 113. That is, the second guide panel 113 can be coupled to the frame 130 and the optical sheet 125 and/or the diffusion plate 129 can be coupled to the second guide panel 113. The second guide panel 113 can be made of a material different from that of the frame 130. The frame 130 may have a form that surrounds the first and the second guide panels 117 and 113.

As shown in FIG. 4(c), in the display device 100 according to an embodiment of the present invention, the front cover 105 may not cover the front of the display panel 110. That is, one end of the front cover 105 can be located on the side of the display panel 110.

Figure 5:
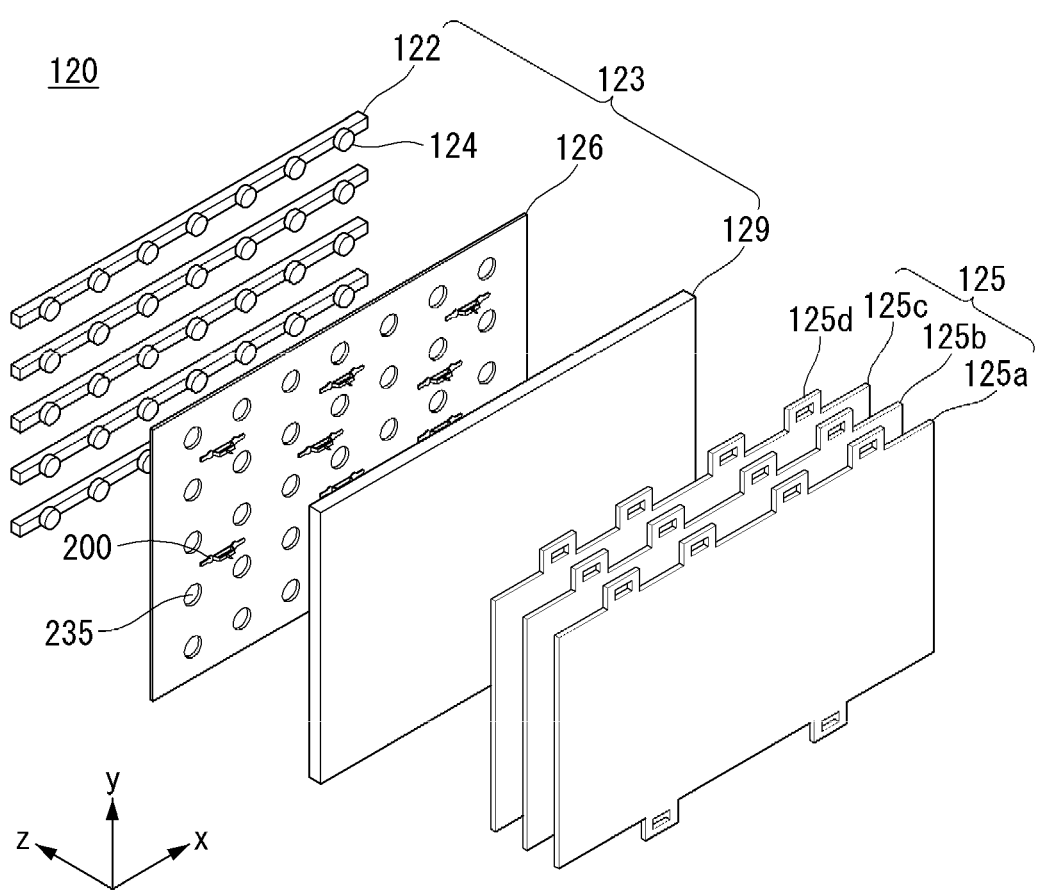
Figure 6:
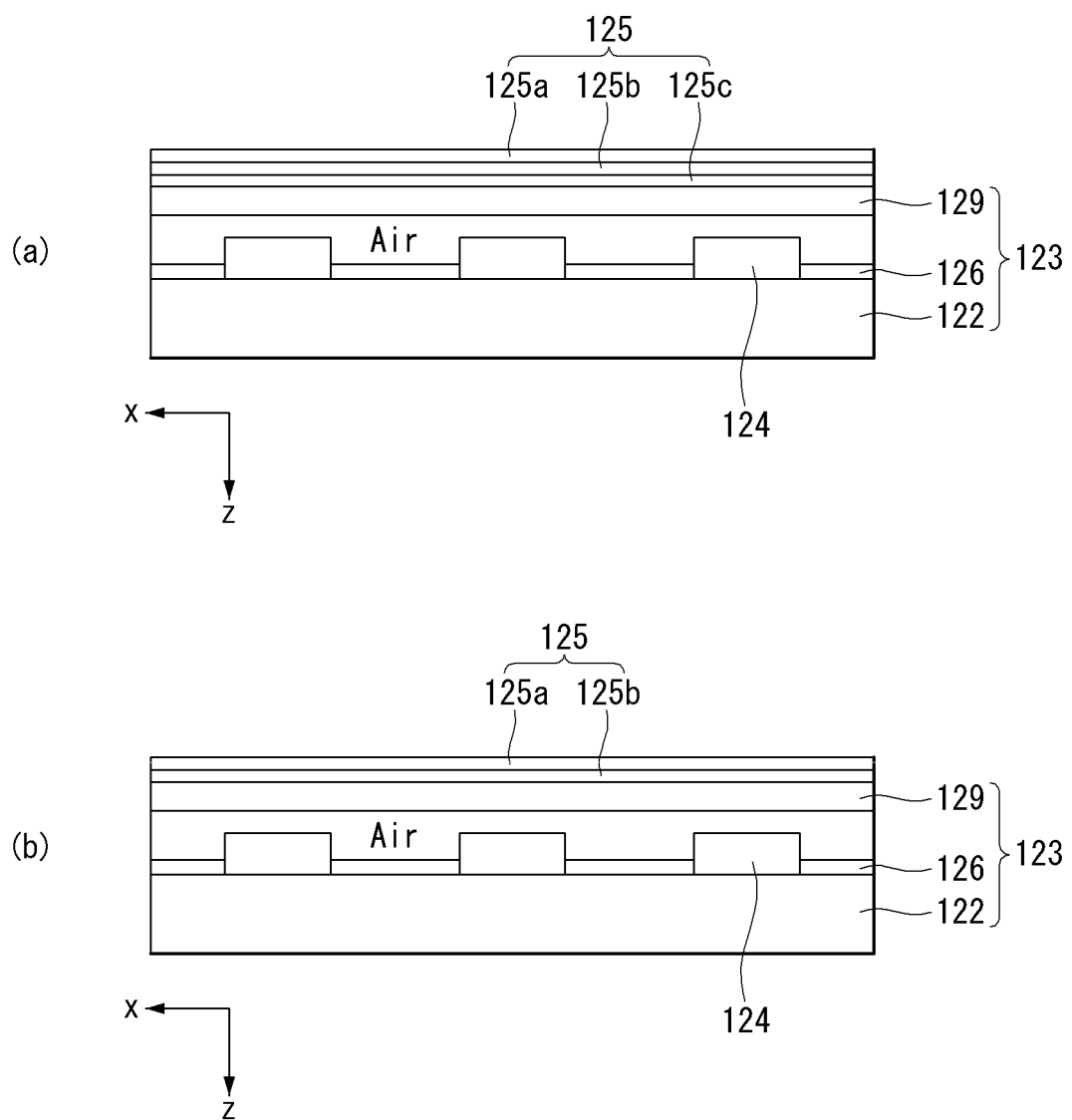
Figure 7:
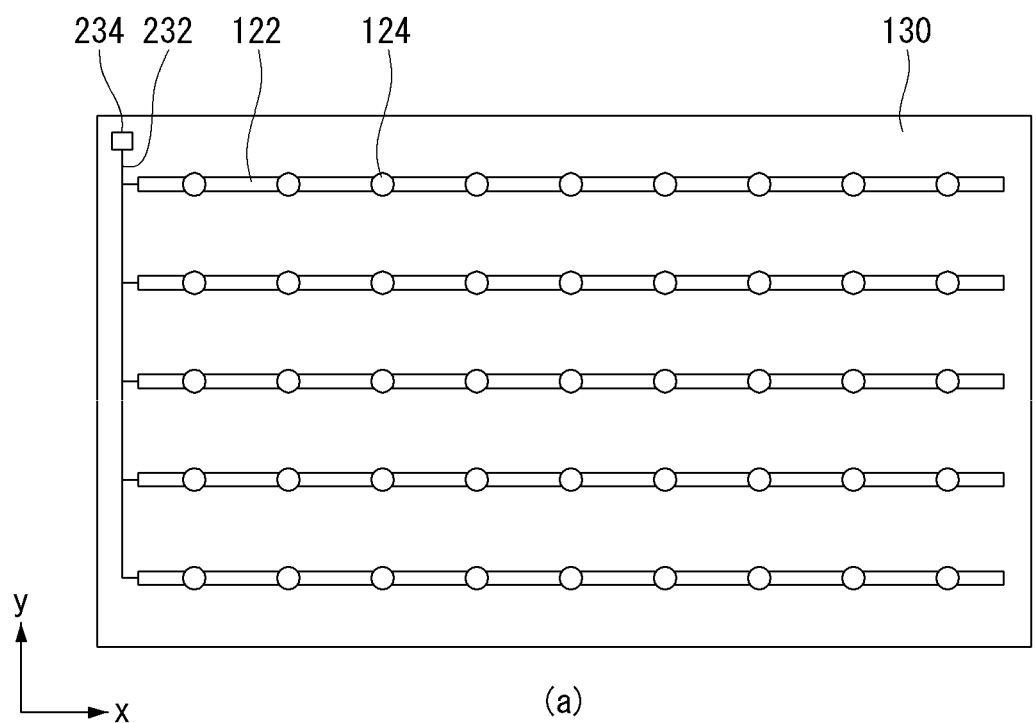
Figure 7:
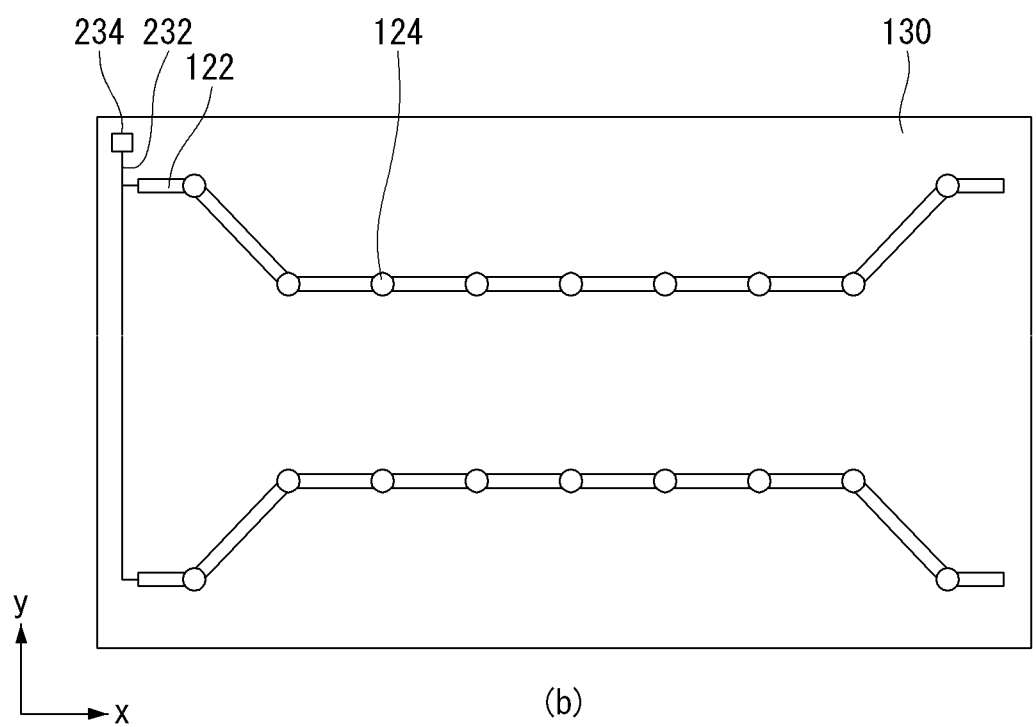

Referring to FIGS. 5 and 6, the backlight unit 120 includes a substrate 122, at least one optical assembly 124, the optical layer 123 including a reflection sheet 126 and a diffusion plate 129, and the optical sheet 125 located on the front side of the optical layer 123. The substrate 122 may have a plurality of strip forms extended in the first direction and spaced apart from each other at a specific interval in the second direction orthogonal to the first direction. At least one optical assembly 124 can be mounted on the substrate 122. An electrode pattern for connecting an adapter and the optical assembly 124 can be formed on the substrate 122. For example, a carbon nanotube pattern for connecting the optical assembly 124 and the adapter can be formed on the substrate 122.

The substrate 122 can be made of at least one of polyethylene terephthalate (PET), glass, polycarbonate (PC), and silicon. The substrate 122 can be a printed circuit board (PCB) on which at least one optical assembly 124 is mounted. In addition, the optical assembly 124 can be disposed on the substrate 122 at a specific interval in the first direction. The diameter of the optical assembly 124 can be greater than the width of the substrate 122. That is, the diameter of the optical assembly 124 can be greater than the length of the substrate 122 in the second direction.

The optical assembly 124 can be a light-emitting diode (LED) chip or a light-emitting diode package including at least one LED chip. Further, the optical assembly 124 may include a colored LED that emits at least one of red, blue, and green or a white LED. The colored LED may include at least one of a red LED, a blue LED, and a green LED.

The light source included in the optical assembly 124 can be a chip on board (COB) type. The COB type may have a form in which an LED chip, that is, a light source, has been directly coupled to the substrate 122. Accordingly, the process can be simplified. Furthermore, resistance can be lowered, thereby being capable of reducing energy lost due to heat. That is, power efficiency of the optical assembly 124 can be improved. The COB type can provide brighter lighting and can be implemented thin and light compared to a related art technology.

In addition, the reflection sheet 126 can be located on the front side of the substrate 122. The reflection sheet 126 can also be located on an area other than the area in which the optical assembly 124 of the substrate 122 has been formed. That is, a plurality of through holes 235 can be formed in the reflection sheet 126.

The reflection sheet 126 reflects light, emitted from the optical assembly 124, toward the front side. Furthermore, the reflection sheet 126 reflects light, reflected by the diffusion plate 129, again. The reflection sheet 126 may include at least one of metal and metal oxide, that is, reflection materials. For example, the reflection sheet 126 may include metal and/or metal oxide having high reflectance, such as at least one of aluminum (Al), silver (Ag), gold (Au), and titanium dioxide (TiO2).

In addition, the reflection sheet 126 can be formed by depositing and/or coating metal or metal oxide on the substrate 122. Ink including a metallic material can be printed on the reflection sheet 126. A deposition layer using a vacuum deposition method, such as a thermal deposition method, an evaporation method or a sputtering method, can be formed in the reflection sheet 126. Also, a coating layer and/or a print layer using a printing method, a gravure coating method or a silk screen method can be formed in the reflection sheet 126.

An air gap can be located between the reflection sheet 126 and the diffusion plate 129. The air gap can function as a buffer capable of widely spreading light emitted from the optical assembly 124. In order to maintain the air gap, a supporter 200 can be located between the reflection sheet 126 and the diffusion plate 129.

In addition, resin can be deposited on the optical assembly 124 and/or the reflection sheet 126. The resin functions to spread light emitted from the optical assembly 124. Also, the diffusion plate 129 spreads light emitted from the optical assembly 124 to the upper part.

The optical sheet 125 can be located on the front side of the diffusion plate 129, the backside of the optical sheet 125 can closely adhere to the diffusion plate 129, and the front surface of the optical sheet 125 can closely adhere to the backside of the display panel 110. In addition, the optical sheet 125 may include at least one or more prism sheets and/or one or more diffusion sheets. The plurality of sheets included in the optical sheet 125 can be in an adhesion and/or close adhesion state.

The optical sheet 125 may also include a plurality of sheets having different functions. For example, the optical sheet 125 may include first to third optical sheets 125a to 125c. The first optical sheet 125a may have a function of a diffusion sheet, and the second and the third optical sheets 125b and 125c may have a function of a prism sheet. The number and/or location of the diffusion sheet and the prism sheet can be changed. For example, the optical sheet 125 may include the first optical sheet 125a, that is, a diffusion sheet, and the second optical sheet 125b, that is, a prism sheet.

The diffusion sheet can make luminance of light more uniformly by preventing light emitted from the diffusion plate from being partially concentrated. The prism sheet can condense light emitted from the diffusion sheet so that the light is vertically incident on the display panel 110.

The coupling part 125d can also be formed in at least one of the edges of the optical sheet 125. The coupling part 125d can be formed in at least one of the first to the third optical sheets 125a to 125c. Further, the coupling part 125d can be formed in an edge on the long-side side of the optical sheet 125. The coupling part 125d formed on the first long-side side and the coupling part 125d formed on the second long-side side can be asymmetric. For example, the location and/or number of coupling parts 125d on the first long-side side and the location and/or number of coupling parts 125d on the second long-side side can be different.

Referring to FIG. 7(a), the substrate 122, including a plurality of strips extended in the first direction and spaced apart from each other at a specific interval in the second direction orthogonal to the first direction, can be provided on the frame 130. Ends on one side of the plurality of substrates 122 can be connected to a wiring electrode 232.

The wiring electrode 232 can be extended in the second direction and connected to the ends on one side of the substrates 122 at a specific interval in the second direction. A wiring hole 234 can be formed at an end on one side of the wiring electrode 232. The wiring hole 234 can be a minute hole penetrates the frame 130 and extended to the back of the frame 130 through the wiring hole 234. The wiring electrode 232 can be electrically connected to an adapter, located at the back of the frame 130, through the wiring hole 234.

Further, the optical assemblies 124 can be mounted on the substrate 122 at a specific interval in the first direction. The diameter of the optical assembly 124 can be greater than the width of the substrate 122 in the second direction. Accordingly, the outside area of the optical assembly 124 can be over an area in which the substrate 122 is not provided.

Referring to FIG. 7(b), a substrate 122 including a plurality of strips can be extended in a different direction other than the first direction at both ends. That is, both ends of the substrate 122 can be extended to an edge area so that the optical assemblies 124 are located in the edge area. The dark part of the edge area can be compensated for because the substrate 122 on which the optical assemblies 124 have been mounted is located in the edge area. That is, the entire area of the display device can emit light uniformly.

An end on one side of the substrate 122 located in the edge area can be connected to the wiring electrode 232. The wiring electrode 232 can be extended in the second direction, and can be electrically connected to the adapter located at the back of the frame 130 through the wiring hole 234 formed at an end on one side thereof.

Figure 8:
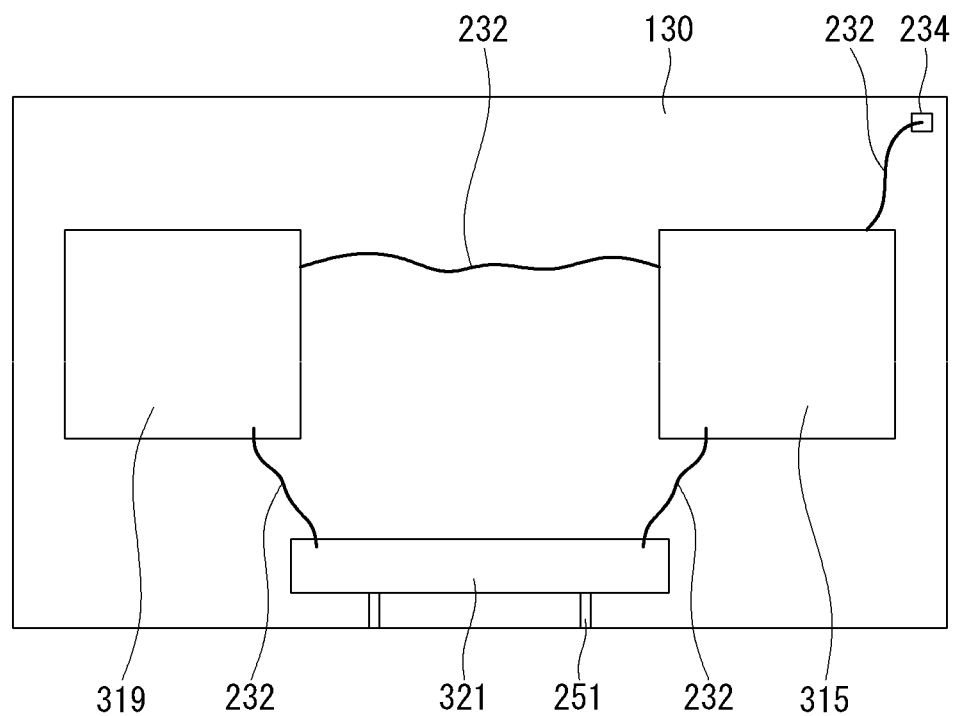

Referring to FIG. 8, the wiring electrode 232 extended from the front of the frame 130 can be connected to one side of a power supply 315 through the wiring hole 234. The power supply 315 can be a printed circuit board for supplying power to the display device 100. The power supply 315 may change an AC frequency into a DC frequency. That is, the power supply 315 can change a low frequency into a high frequency, thereby being capable of improving electrical efficiency.

The power supply 315 can enable the optical assembly 124, located at the front of the frame 130, to emit light through the wiring electrode 232. The power supply 315 can be connected to a main board 321 through the wiring electrode 232 on the other side. The main board 321 is spaced apart from the power supply 315 at a specific interval. For example, the main board 321 and the power supply 315 can be located to face each other in the second direction based on the central part of the frame 130.

The main board 321 can be a printed circuit board that provides an interface in which the display device 100 operates. Furthermore, the main board 321 can check and manage the operating state of each of the elements of the display device 100. The main board 321 and the power supply 315 can be connected to the T-CON board 319 through the wiring electrode 232. The T-CON board 319 can be a printed circuit board that transfers a signal, received from the main board 321 or the power supply 315, to the display panel 110.

The T-CON board 319 can be electrically connected to the display panel 110 at the front of the frame 130 through a flat flex cable (FFC) 251. The printed circuit boards have been illustrated as being connected, but the present invention is not limited thereto. Only at least some of the printed circuit boards can be connected.

Figure 9:
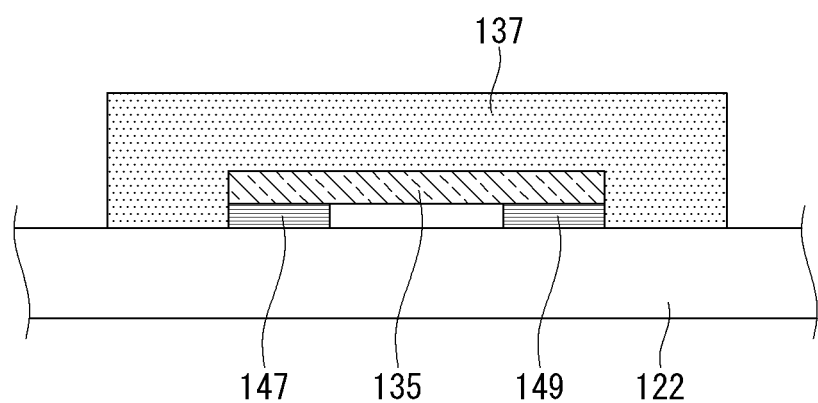
FIGS. 9 and 10 are diagrams showing a light source according to an embodiment of the present invention.
Figure 10:
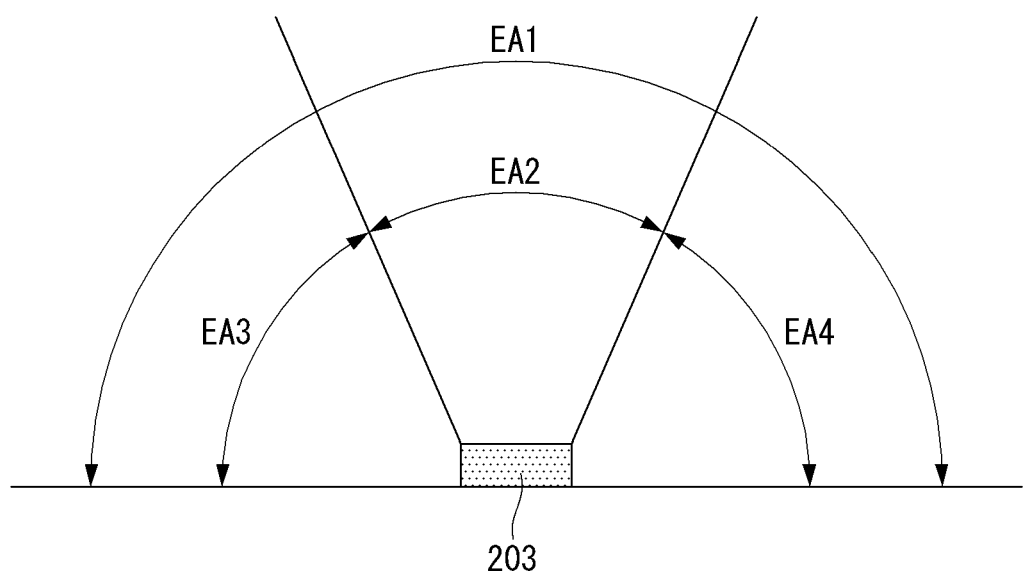

Next, FIGS. 9 and 10 are diagrams showing a light source according to an embodiment of the present invention. As shown in FIG. 9, the light source 203 can be a COB type including at least one of a light emission layer 135, first and second electrodes 147 and 149, and a fluorescent layer 137.

The light emission layer 135 can be located the substrate 122. The light emission layer 135 may emit light of any one of blue, red, and green. The light emission layer 135 may include any one of Firpic, (CF3ppy)2Ir(pic), 9, 10-di 2-naphthyl)anthracene(AND), Perylene, distyrybiphenyl, PVK, OXD-7, and UGH-3(Blue) and a combination of them. The first and the second electrodes 147 and 149 can be located on both sides of the bottom of the light emission layer 135. The first and the second electrodes 147 and 149 can transfer an external driving signal to the light emission layer 135.

The fluorescent layer 137 covers the light emission layer 135 and the first and the second electrodes 147 and 149. The fluorescent layer 137 may include a fluorescent material that converts light of a spectrum, generated by the light emission layer 135, in white light. The light emission layer 135 may have a uniform thickness on the fluorescent layer 137. The fluorescent layer 137 may have a refractive index of 1.4 to 2.0.

The light source 203 of a COB type according to an embodiment of the present invention can be directly mounted on the substrate 122. Accordingly, the size of the optical assembly 124 can be reduced. The light source 203 can be driven with a high current due to excellent radiation because it is located on the substrate 122. Accordingly, the number of light sources 203 necessary to secure the same amount of light can be reduced. A wire bonding process may also not be required because the light source 203 is mounted on the substrate 122. Accordingly, a cost can be reduced because the process is simplified.

As shown in FIG. 10, the emission of the light source 203 according to an embodiment of the present invention can be performed in a first light emission area EA1. That is, light emission can be performed in an area including a second light emission area EA2, that is, the front side, and third and fourth light emission areas EA3 and EA4, that is, the sides. Such a point is different from a point that a related art light source including the POB type emits light in the second light emission area EA2. That is, the light source 203 according to an embodiment of the present invention can be a light source of a COB type that can emit light in a wide range including the sides.

It is preferable to effectively control light in the side direction because the light source 203 of a COB type emits light in the side direction corresponding to the second light emission area EA2. The reflection sheet according to an embodiment of the present invention can control reflectance of light emitted in the side direction of the light source 203. Accordingly, the irregularity of luminosity attributable to light in the side direction can be reduced.

Figure 11:
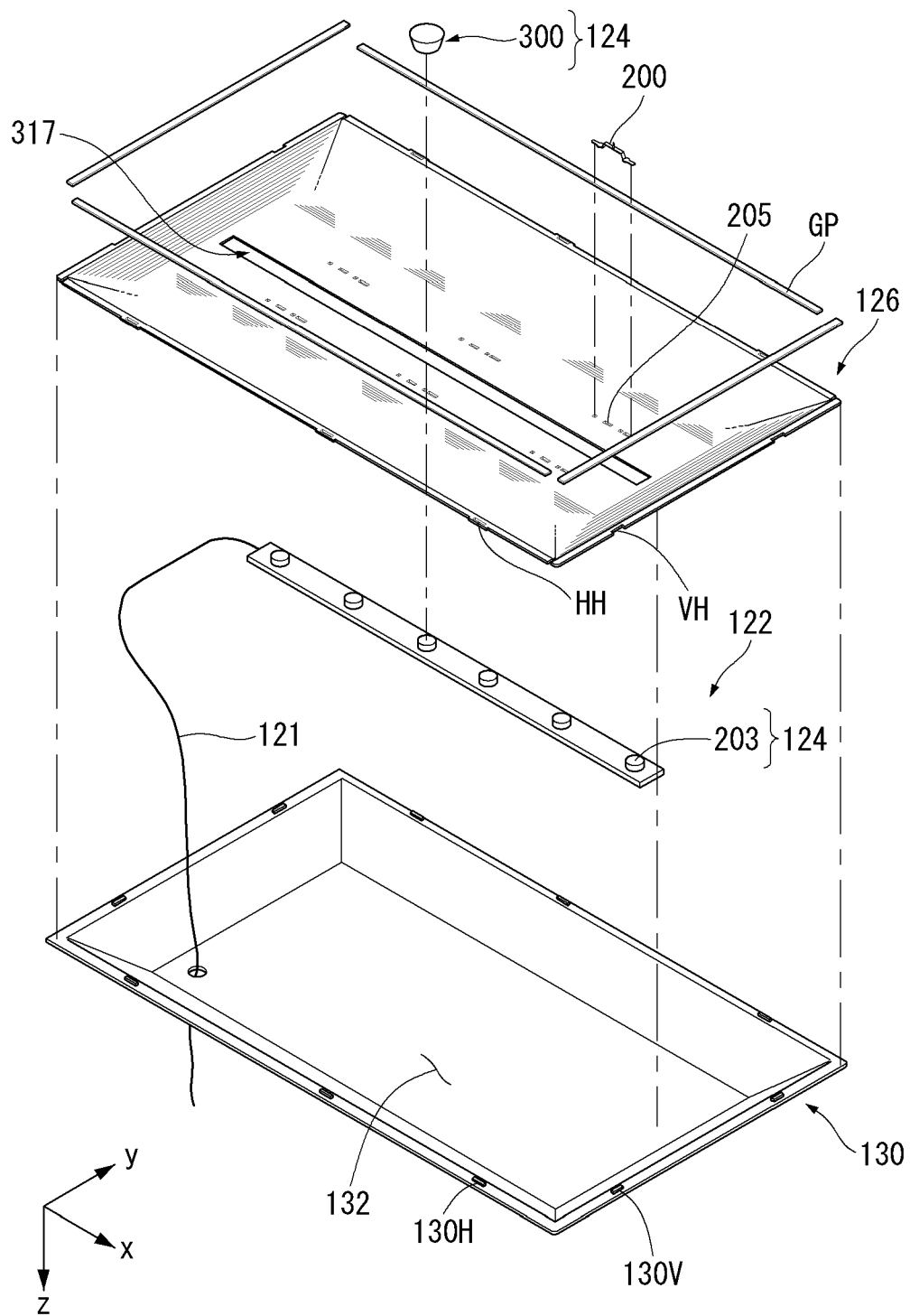
FIG. 11 is a diagram showing a coupling relation between a reflection sheet and peripheral elements according to an embodiment of the present invention.

FIG. 11 is a diagram showing a coupling relation between a reflection sheet and peripheral elements according to an embodiment of the present invention. As shown in FIG. 11, the reflection sheet 126 according to an embodiment of the present invention can be seated in the frame 130. For example, the reflection sheet 126 can be coupled to a seated part 132 formed inside the frame 130.

A horizontal coupling part HH and/or a vertical coupling part VH can be formed in the reflection sheet 126. For example, coupling holes can be formed in some areas along the long side and/or short side of the reflection sheet 126. The horizontal coupling part HH and/or the vertical coupling part VH can be inserted into a horizontal protrusion 130H and/or a vertical protrusion 130V formed in the frame 130. A guide panel GP can also be coupled to the reflection sheet 126.

The guide panel GP can be made of injected plastic or press-processed metal and be coupled to the horizontal protrusion 130H and/or the vertical protrusion 130V. When the guide panel GP is coupled to the reflection sheet 126, the reflection sheet 126 can be fixed between the frame 130 and the guide panel GP. In FIG. 11, the guide panels GP have been illustrated as being separated along the long side and the short side, but may have the long-side side and the short-side side coupled together.

The reflection sheet 126 seated in the frame 130 may have a stereoscopic shape corresponding to a shape of the seated part 132. The reflection sheet 126 according to an embodiment of the present invention can implement an optimum reflection effect although it has the stereoscopic shape. For example, light can be uniformly reflected over the entire reflection sheet 126.

The reflection sheet 126 forms part of the backlight unit (120 of FIG. 5). Further, the substrate 122 on which the light source 203 has been mounted can be formed between the reflection sheet 126 and the frame 130. In the display device according to an embodiment of the present invention, a single substrate 122 can be extended and disposed in the first direction. Since a single substrate 122 is configured, the number of optical assemblies 124 for the display device is reduced, thereby being capable of reducing a manufacturing cost. Furthermore, since a single substrate 122 is configured, the uniformity of light can be further improved compared to when a plurality of the substrates 122 is configured. The substrate 122 can be connected to a signal line 121 connected to the control unit of the display device 100. The signal line 121 can be connected to the substrate 122 through a through hole formed in the frame 130.

A coupling hole 317 can be formed in a portion that belongs to the reflection sheet 126 and that corresponds to the substrate 122. For example, the coupling hole 317 can be extended and formed in the first direction in such a way as to correspond to the substrate 122.

The reflection sheet 126 may include a plurality of supporter holes 205. The supporter 200 can be coupled to the supporter hole 205 and can support the diffusion plate 129 and/or the optical sheet 125 formed at the front of the reflection sheet 126. That is, the reflection sheet 126 and the diffusion plate 129 and/or the optical sheet 125 can be spaced apart from each other at a specific interval.

Figure 12:
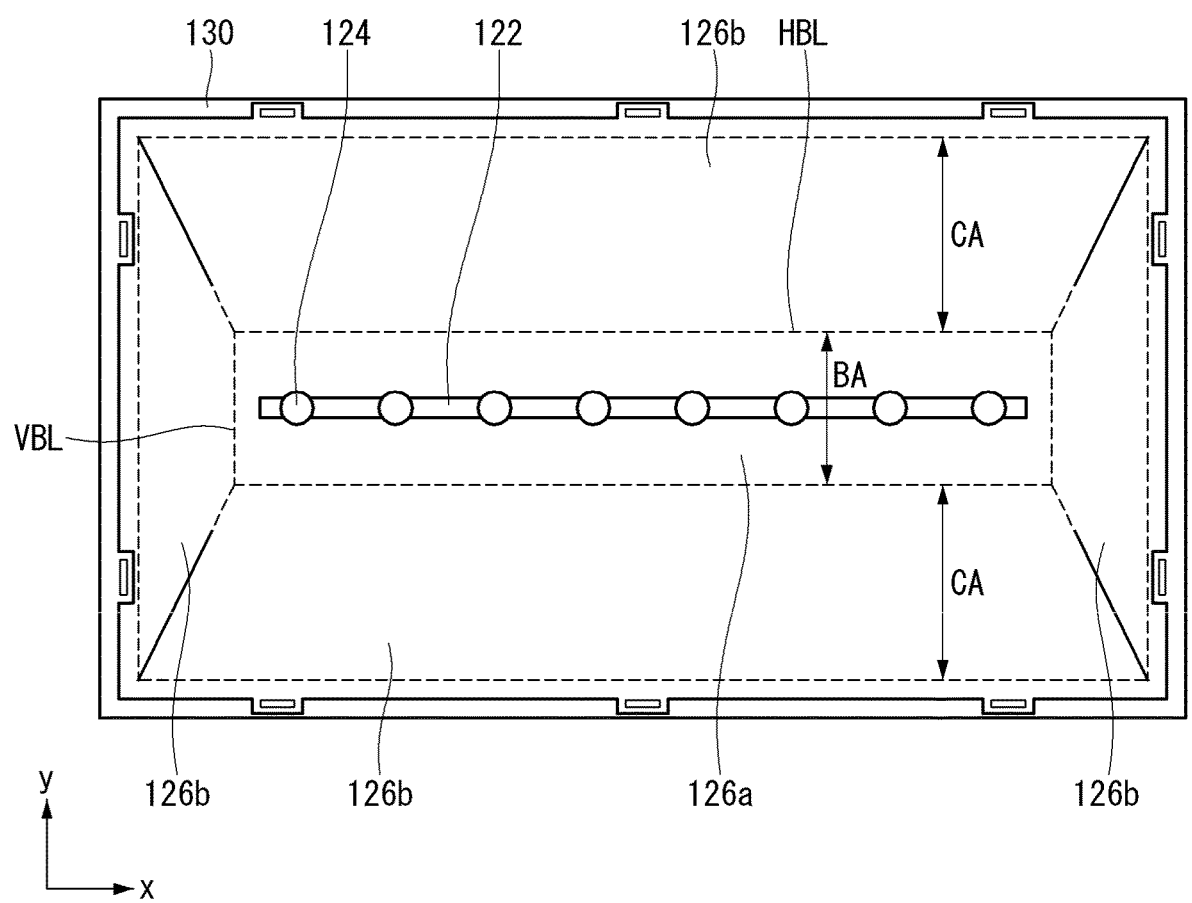
FIG. 12 is a diagram showing the configuration of a reflection sheet according to an embodiment of the present invention.

FIG. 12 is a diagram showing the configuration of a reflection sheet according to an embodiment of the present invention. As shown in FIG. 12, in the display device according to an embodiment of the present invention, the reflection sheet 126 may include a first sheet area 126a and a second sheet area 126b. The first sheet area 126a can be located in a portion corresponding to the seated part (132 of FIG. 11) within the frame 130. When coupled to the frame 130, the first sheet area 126a can be changed in accordance with a shape within the frame 130. That is, the first sheet area 126a can be extended in the horizontal direction.

The second sheet area 126b can be located in a portion corresponding to the sidewall area of the frame 130. Like the sidewall area of the frame 130, the second sheet area 126b can be formed to be parallel to the Z direction or obliquely inclined in the Z direction.

In the display device according to an embodiment of the present invention, the width of the seated part within the frame 130 having the substrate 122 located therein may not be great because a single substrate 122 is configured. Accordingly, the width BA of the first sheet area 126a in the second direction, corresponding to the seated part (132 of FIG. 11) within the frame 130, can be smaller than the second direction width CA of the second sheet area 126b.

Figure 13:
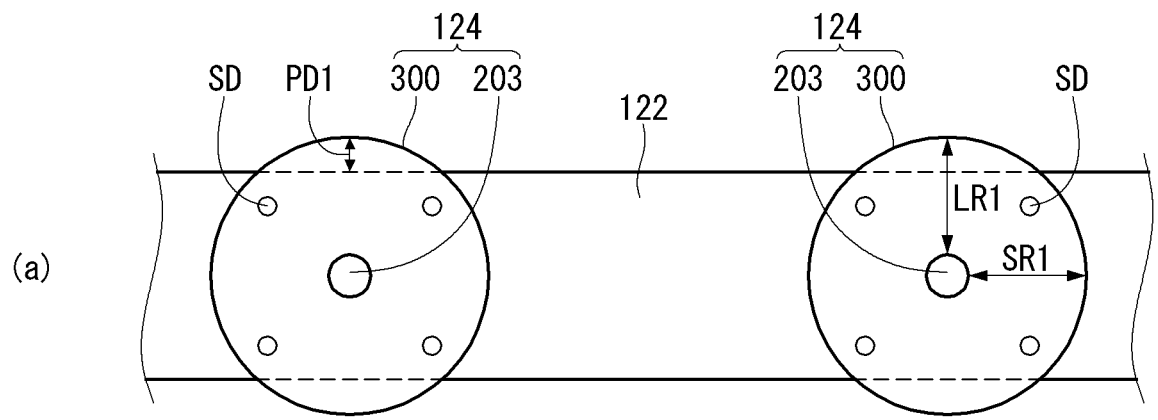
FIG. 13 is a diagram showing optical assemblies located on a substrate according to an embodiment of the present.
Figure 13:
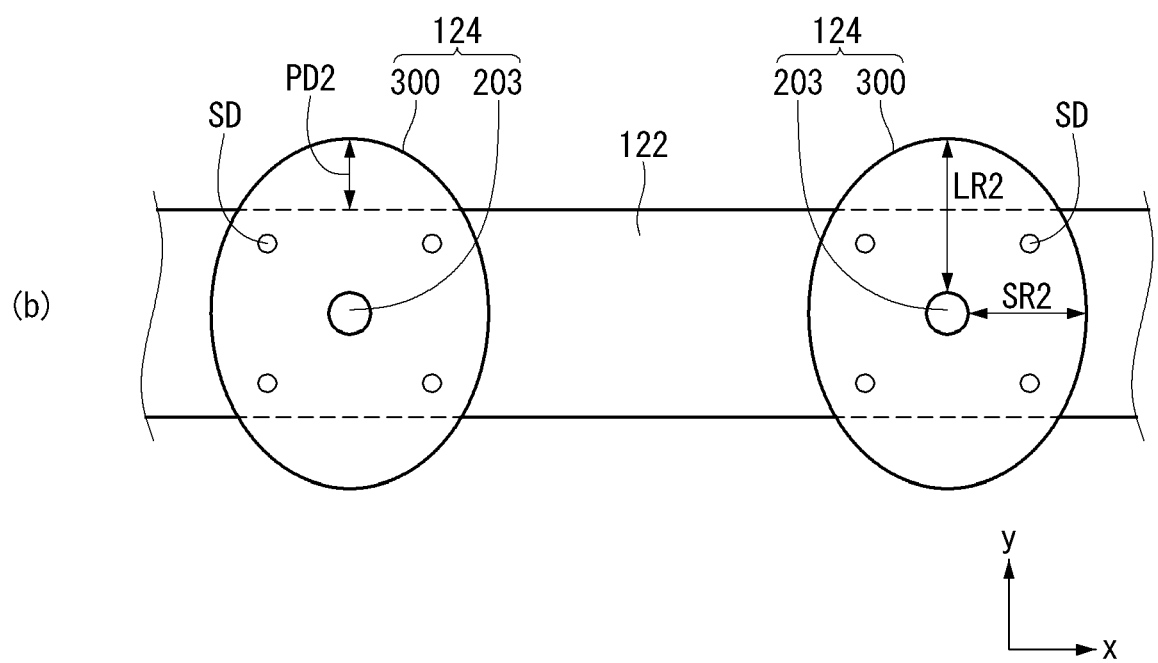

FIG. 13 is a diagram showing optical assemblies located on a substrate according to an embodiment of the present. As shown in FIG. 13, the optical assembly 124 can be disposed on the substrate 122. The optical assembly 124 includes the light source 203 and a lens 300. The lens 300 can be mounted on a substrate groove SD formed in the substrate 122.

As shown in FIG. 13(a), in the existing optical assembly 124, the lenses 300 may have the same or similar diameters in all parts. That is, in the existing lens 300, a diameter SR1 in the first direction and a diameter LR1 in the second direction can be the same or similar.

The diameter of the lens 300 can be greater than the width of the substrate 122 in the second direction. Accordingly, the lens 300 can be protruded from the substrate 122 by a first length PD1 in the second direction. In the case of a related art display device, the first length PD1 can be short because the diameter of the lens 300 is the same or similar in all of parts.

As shown in FIG. 13(b), in the display device according to an embodiment of the present invention, the diameter of the lens 300 can be different depending on a location. For example, the diameter SR2 of the lens 300 in the first direction can be shorter than the diameter LR2 of the lens 300 in the second direction. That is, the lens 300 of the display device according to an embodiment of the present invention can be oval.

In the display device according to an embodiment of the present invention, the lens 300 can be protruded from the substrate 122 by a second length PD2. The lens 300 may have a greater diameter in the second direction. Accordingly, the lens 300 can be further protruded from the substrate 122 in the second direction. Accordingly, the second length PD2 can be longer than the first length PD1.

Figure 14:
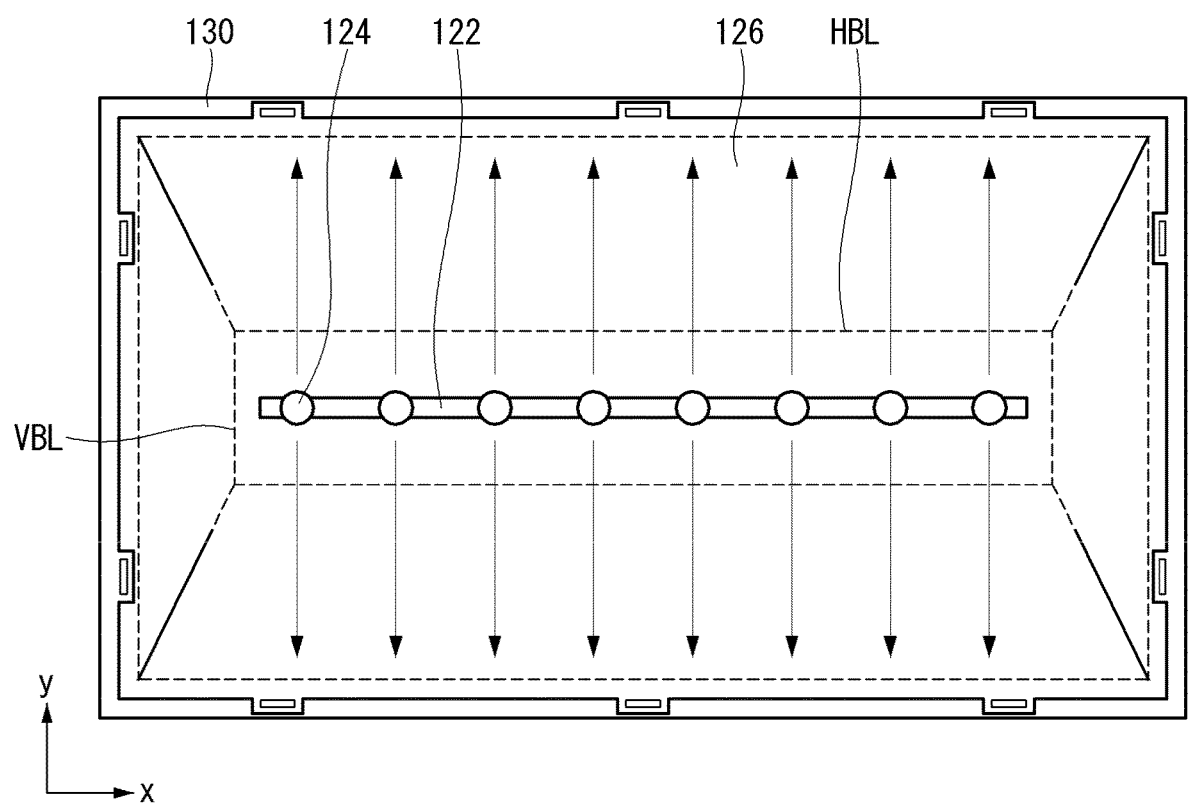
FIGS. 14 to 22 are diagrams showing the configuration of a reflection sheet according to an embodiment of the present invention.

FIGS. 14 to 22 are diagrams showing the configuration of a reflection sheet according to an embodiment of the present invention. As shown in FIG. 14, in the display device according to an embodiment of the present invention, the optical assembly 124 may have an oval shape. For example, the diameter of the optical assembly 124 in the second direction can be greater than that in the first direction. Accordingly, the range of the optical assembly 124 in which light is emitted in the second direction can be great compared to an existing optical assembly.

Accordingly, although only a single substrate 122 on which the optical assembly 124 has been mounted is configured, emitting light can reach up to the edge of the display device in the second direction stronger. Accordingly, although a single substrate 122 is configured, the display device can maintain light uniformity.

Figure 15:
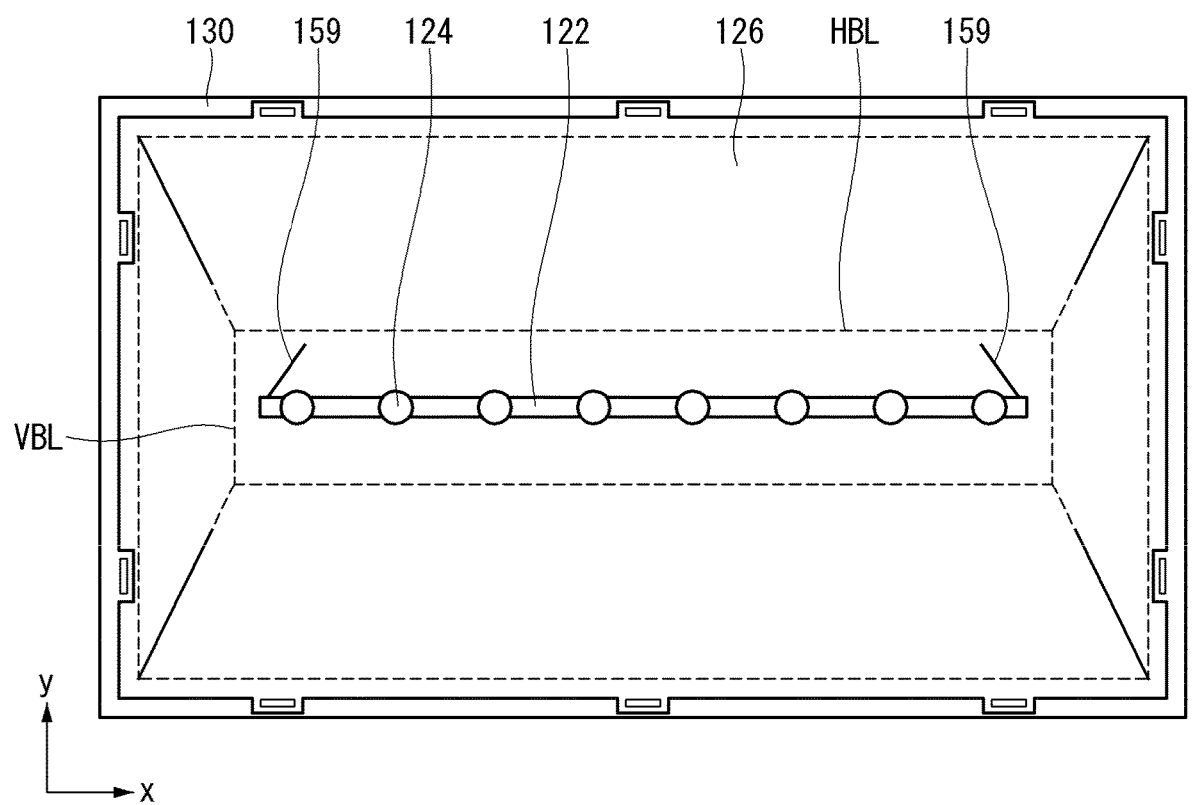

As shown in FIG. 15, in the display device according to an embodiment of the present invention, the reflection sheet 126 may include a cut portion 159. The cut portion 159 can be a portion cut from the reflection sheet 126 and located at both ends of the substrate 122 on one side thereof in the second direction. The reflection sheet 126 can be separated or brought into contact with each other using the cut portion 159.

The cut portion 159 can be located on the first sheet area 126a of the reflection sheet 126. The cut portion 159 helps the first sheet area 126a to be inserted into the substrate 126. If the cut portion 159 extends to the second sheet area 126b, the shape of a boundary portion of the first sheet area 126a and the second sheet area 126b can be modified. Accordingly, the cut portion 159 is preferably located on the first sheet area 126a only.

Figure 16:
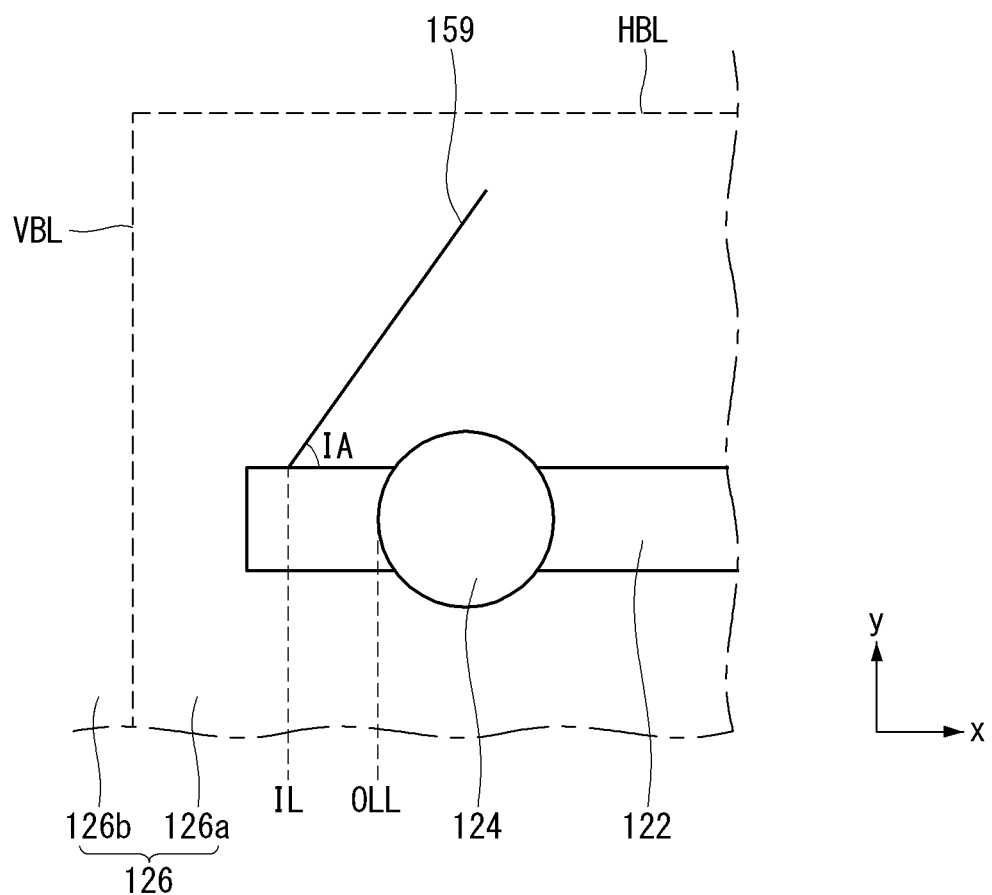
Figure 17:
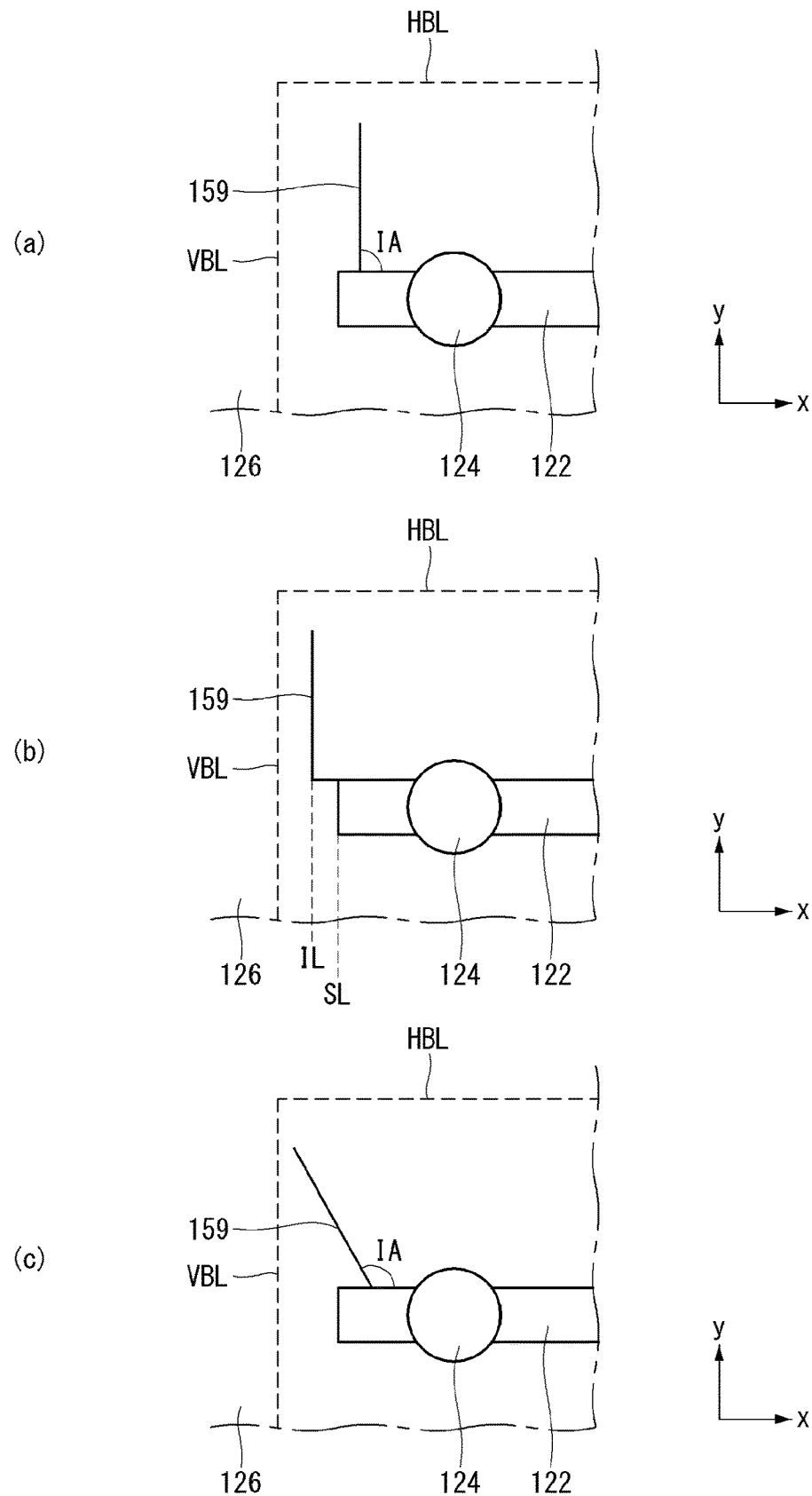

As shown in FIG. 16, the cut portion 159 can be extended in a direction inclined from the first direction at a specific angle IA. Accordingly, the distance between the cut portions 159 can be reduced as the cut portion 159 becomes distant from the substrate 122 in the second direction. In this instance, as the cut portion 159 becomes distant from the substrate 122, the cut portion 159 can be formed inside the first sheet area 126a. Accordingly, the possibility that the shape of a boundary portion between the first sheet area 126a and the second sheet area 126b may be deformed by the cut portion 159 can be reduced.

One end of the cut portion 159 can be located at an edge in the first direction compared to the optical assembly 124 located on the outmost side. More specifically, the extension line IL of a portion where the cut portion 159 and the substrate 122 come into contact with each other can be more located on the outside than the extension line OLL of the optical assembly 124 located on the outmost side.

If the portion where the cut portion 159 and the substrate 122 come into contact with each other is more located on the inside than the optical assembly 124 located on the outmost side, the reflection sheet 126 may not be inserted into the optical assembly 124 that is more located on the outside than the cut portion 159. Accordingly, the portion where the cut portion 159 and the substrate 122 come into contact with each other can be more located at an edge than the optical assembly 124 located on the outmost side.

As shown in FIG. 17(a), the cut portion 159 can be inclined at a right angle to the first direction and extended. That is, although the cut portion 159 becomes distant from the substrate 122, the distance between the cut portions 159 can be constant. In this instance, there is an advantage in that the durability of the reflection sheet can be further enhanced because the width between the cut portions 159 is constant.

As shown in FIG. 17(b), the extension line IL extended from the cut portion 159 in the second direction can be more located on the outer side than the extension line SL of one end of the substrate 122. That is, the width of the reflection sheet 126 separated by the cut portion 159 in the first direction can be greater than that of the substrate 122 in the first direction. In this instance, since the width of the reflection sheet 126 is great, the reflection sheet 126 can be further conveniently inserted into the substrate 122.

As shown in FIG. 17(c), the cut portion 159 can be inclined from the first direction at an angle of 90 degrees or more. That is, as the cut portion 159 becomes distant from the substrate 122 in the second direction, the distance between the cut portions 159 can be increased. In this instance, the reflection sheet 126 can be further conveniently inserted into the substrate 122 because the distance between the cut portions 159 is increased as the cut portion 159 becomes distant from the substrate 122.

The shape of the cut portion 159 is not limited to those shown in the drawings. The cut portion 159 may have a different shape if a line extended from the cut portion 159 in the second direction is more located on the outside than the extension line of the optical assembly 124 located on the outmost side.

Figure 18:
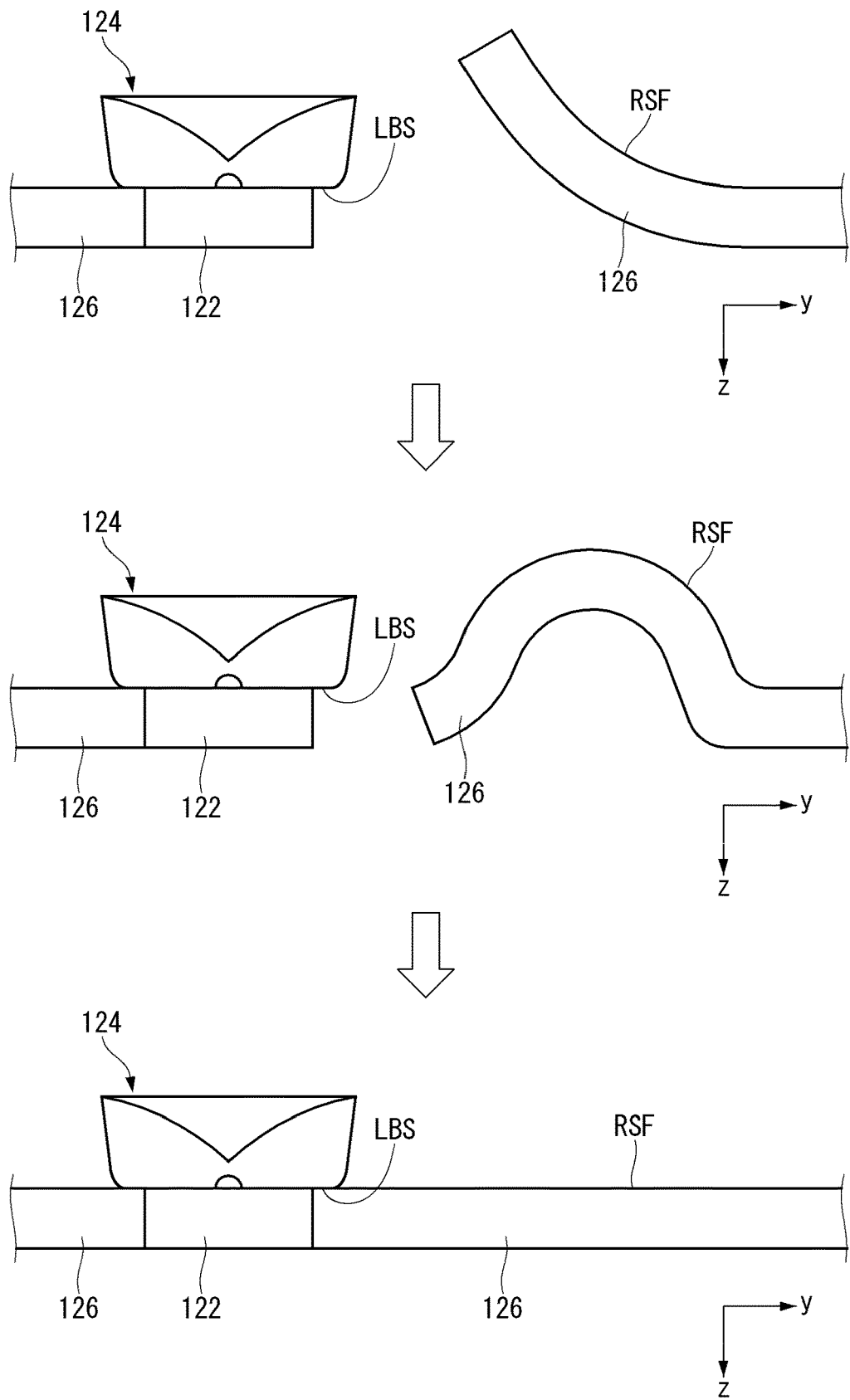
Figure 19:
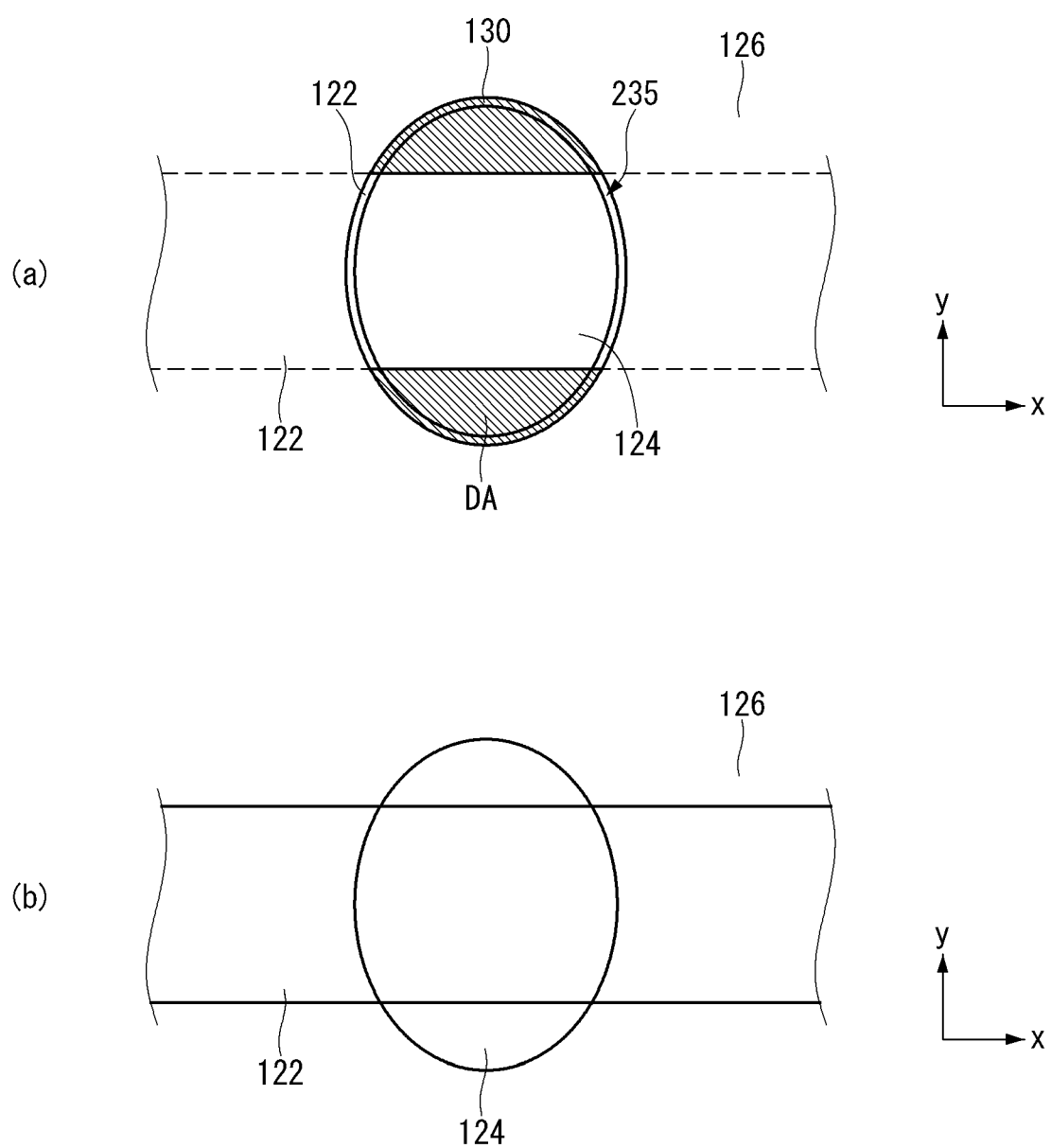

As shown in FIG. 18, in order to insert one reflection sheet 126 into the bottom of the optical assembly 124, first, the reflection sheet 126 can be inserted into the other reflection sheet 126 on the side opposite the cut portion. In this instance, one reflection sheet 126 in one part where the cut portion is located can be separated from the other reflection sheet 126 in the other part.

Next, the upper surface RSF of the reflection sheet 126 where the cut portion has been located can be inserted to come into contact with the lower surface LBS of the optical assembly 124. First, the upper surface RSF at the end of the reflection sheet 126 can be bent so that it enters under the lower surface LBS of the optical assembly 124. The bent one end of the reflection sheet 126 can be pushed in so that the lower surface LBS of the optical assembly 124 and the upper surface RSF of the reflection sheet 126 come into contact with each other. The reflection sheet 126 may not be easily separated from the optical assembly 124 after it is inserted because the lower surface LBS of the optical assembly 124 presses the upper surface RSF of the reflection sheet 126.

As shown in FIG. 19(a), an existing display device may include a lens hole 235 in a portion where the reflection sheet 126 corresponds to the optical assembly 124. In this instance, after the optical assembly 124 is made to correspond to the lens hole 235, the reflection sheet 126 can be covered and coupled.

In this instance, at least part of the optical assembly 124 can be protruded from the substrate 122 because the diameter of the optical assembly 124 is greater than the width of the substrate 122. In this instance, the protruded portion may not be covered with the reflection sheet 126 due to the lens hole 235. That is, the frame 130 can be exposed upward due to the protruded portion. Accordingly, a dark part can be formed by the exposed frame 130. In this instance, light emitted from the backlight unit may not be uniform.

In contrast, as shown in FIG. 19(b), in the display device according to an embodiment of the present invention, the reflection sheet 126 can be inserted into the lower part of the optical assembly 124. Accordingly, the frame 130 is not exposed to the outside. In this instance, a dark part is not formed because light is reflected by the reflection sheet 126 or the substrate 122 in the entire portion. That is, light emitted from the backlight unit can be uniform.

Figure 20:
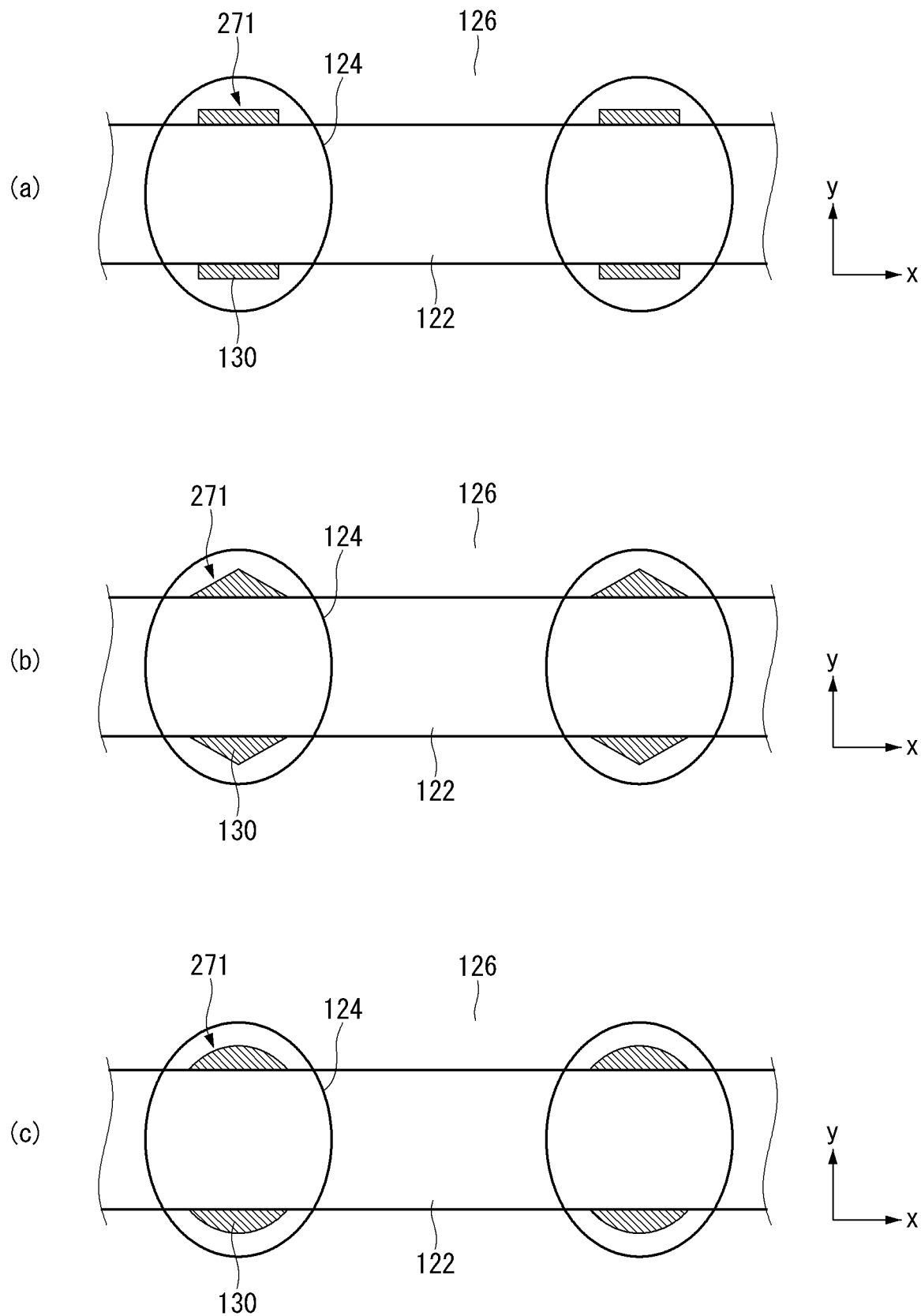

Referring to FIG. 20, since the light source is located at the central part of the optical assembly 124, a bright point can be formed at a portion where the optical assembly 124 is located. Accordingly, it is necessary to reduce the amount of light reflected from the portion where the optical assembly 124 is located. Accordingly, a compensation hole 271 can be formed in the lower surface of the optical assembly 124 protruded from the substrate 122. In the portion where the compensation hole 271 has been formed, the frame 130 can be exposed to the outside. Accordingly, the amount of reflected light can be reduced.

As shown in FIG. 20(a), the compensation hole 271 of a rectangular shape can be located at the portion where the reflection sheet 126 and the substrate 122 come into contact with each other. As shown in FIGS. 20(b) and 20(c), the compensation hole 271 is located at the portion where the reflection sheet 126 and the substrate 122, but the width of the compensation hole 271 in the second direction can be increased toward the central part of the optical assembly 124 in the first direction.

The display device according to an embodiment of the present invention can adjust the uniformity of light emitted from the backlight unit because the compensation hole 271 is formed in the lower surface of the optical assembly 124. Accordingly, a bright point or a dark point may not be formed on a display screen.

Figure 21:
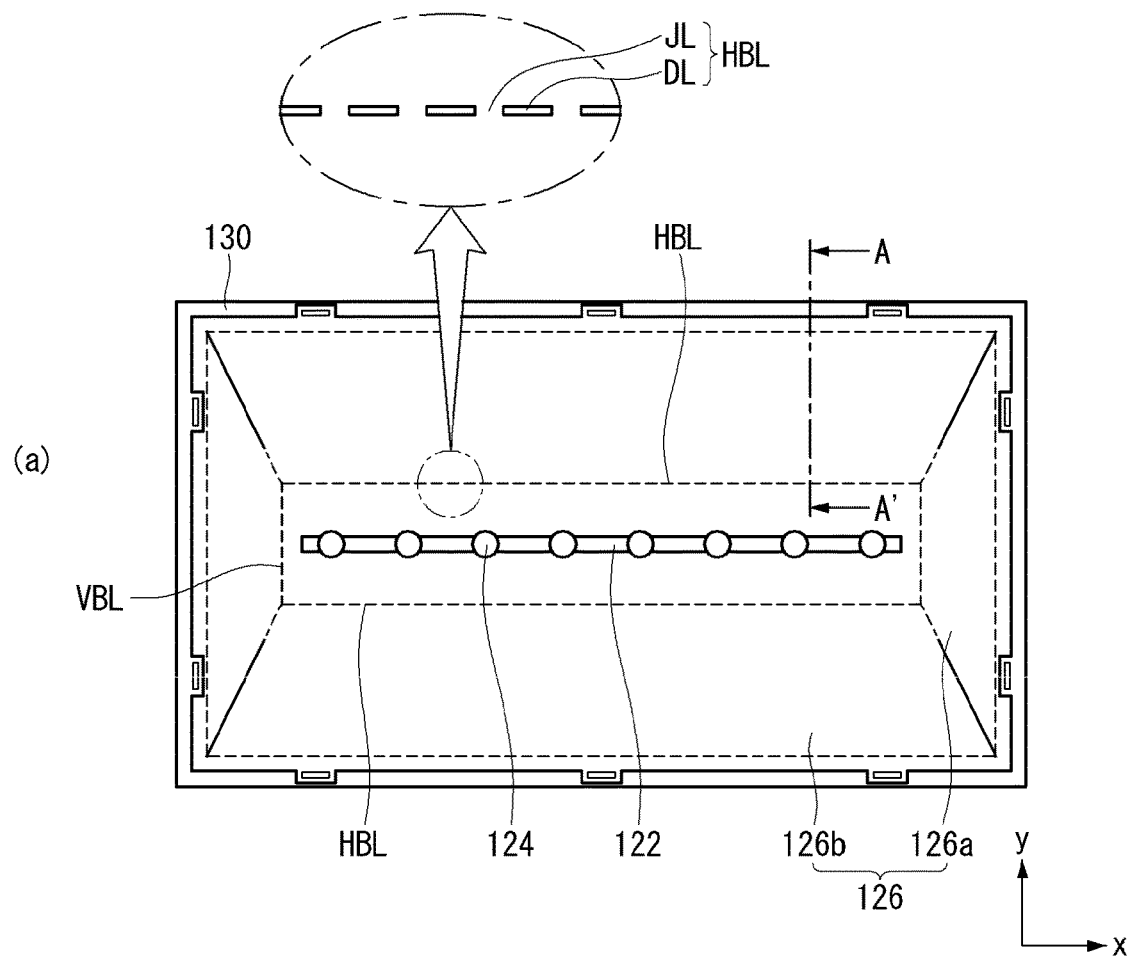
Figure 21:
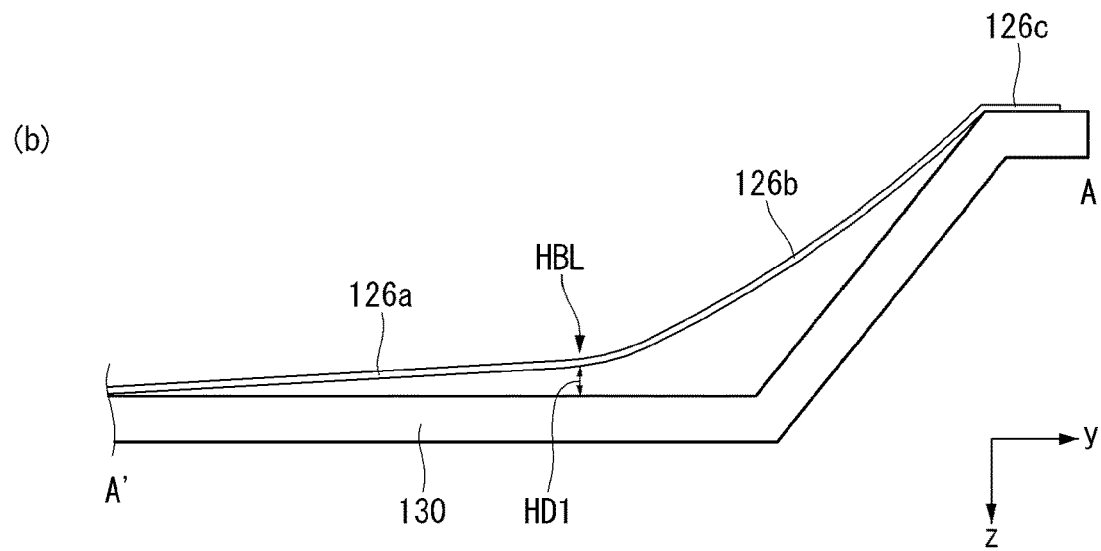

As shown in FIG. 21(*a*), a horizontal bending line HBL and a vertical bending line VBL can be located in the reflection sheet 126. The horizontal bending line HBL and the vertical bending line VBL may correspond to the boundary of the first sheet area 126*a* and the second sheet area 126*b*. When the reflection sheet 126 is coupled to the frame 130, the first sheet area 126*a* and the second sheet area 126*b* can be separated by folding the horizontal bending line HBL and the vertical bending line VBL. For example, the first sheet area 126*a* can be located inside the horizontal bending line HBL and the vertical bending line VBL, and the second sheet area 126*b* can be located outside the horizontal bending line HBL and the vertical bending line VBL.

The horizontal bending line HBL may include a dash area DL and a center area JL. The dash area DL can be an area that belongs to the horizontal bending line HBL and in which a hole has been formed. As the size of the dash area DL increases, the horizontal bending line HBL can be folded more easily. The center area JL can be an area that belongs to the horizontal bending line HBL and in which a hole has not been formed. As the size of the center area JL increases, shapes on both sides of the horizontal bending line HBL remain intact although the horizontal bending line HBL is folded.

The dash area DL and the center area JL can be alternately located. In the horizontal bending line HBL, the dash area DL and the center area JL may have a ratio of 1:1. That is, the dash areas DL may have a constant width and the center areas JL may also have a constant width. Although only the contents related to the horizontal bending line HBL have been illustrated, the vertical bending line HBL may have the same configuration as the horizontal bending line HBL.

As shown in FIG. 21(*b*), the reflection sheet 126 may include the first to third sheet areas 126*a* to 126*c*. The first sheet area 126*a* and the second sheet area 126*b* can be divided by the horizontal bending line HBL or the vertical bending line VBL. That is, the first sheet area 126*a* and the second sheet area 126*b* can be folded using the horizontal bending line HBL or the vertical bending line VBL. Accordingly, the first sheet area 126*a* and the second sheet area 126*b* can be extended in different directions.

In this instance, the second sheet area 126*b* can be naturally changed in accordance with a shape of the frame 130. That is, a naturally rounded second sheet area 126*b* can be formed. Accordingly, there is an advantage in that workability can be improved because a separate process for forming the chamfer of the reflection sheet 126 is not required.

As the ratio of the dash area DL decreases, tensile stress between the first sheet area 126*a* and the second sheet area 126*b* may further increase. In this instance, one end of the first sheet area 126*a* can be separated from the bottom area of the frame 130 at a first interval HD1 by the second sheet area 126*b*. That is, the first sheet area 126*a* can be lifted off from the bottom area of the frame 130 by the tensile force of the second sheet area 126*b*.

Figure 22:
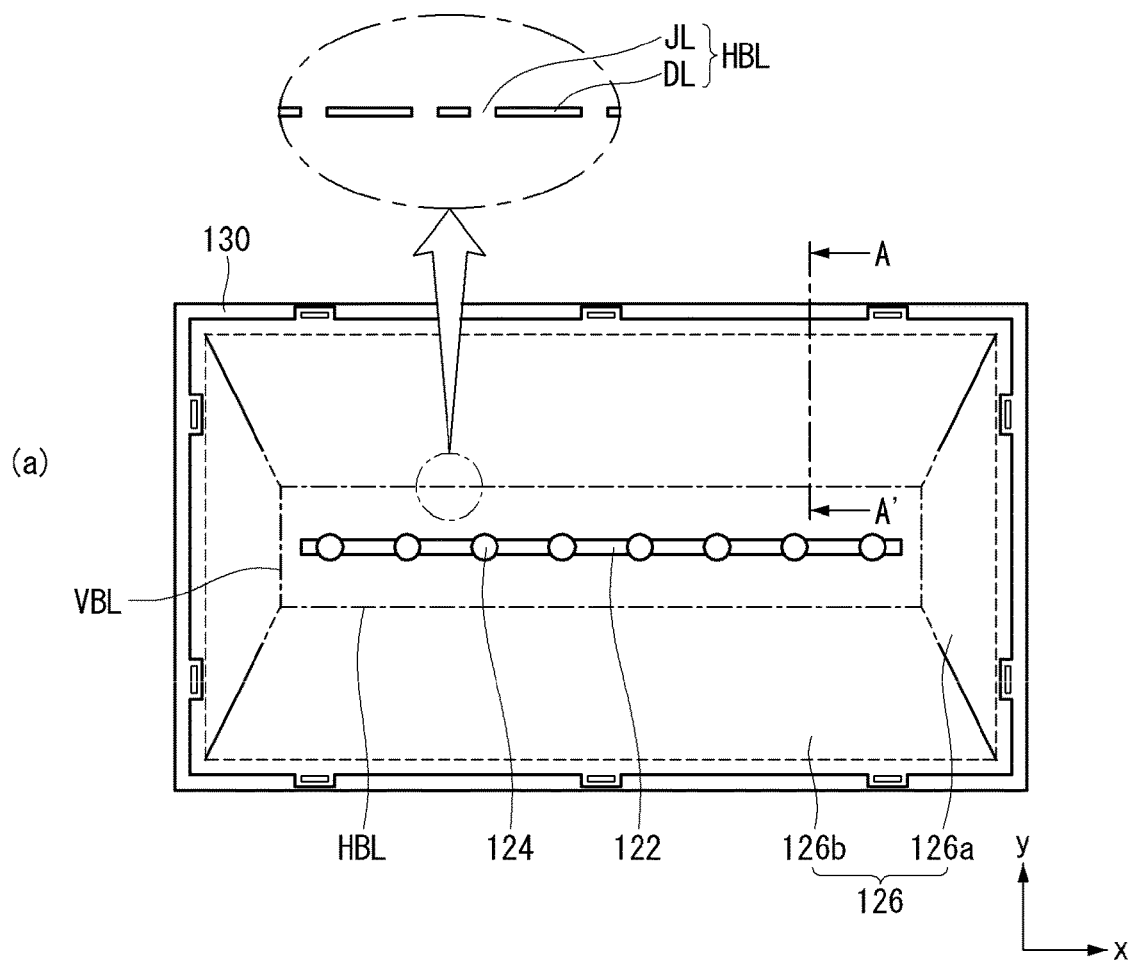
Figure 22:
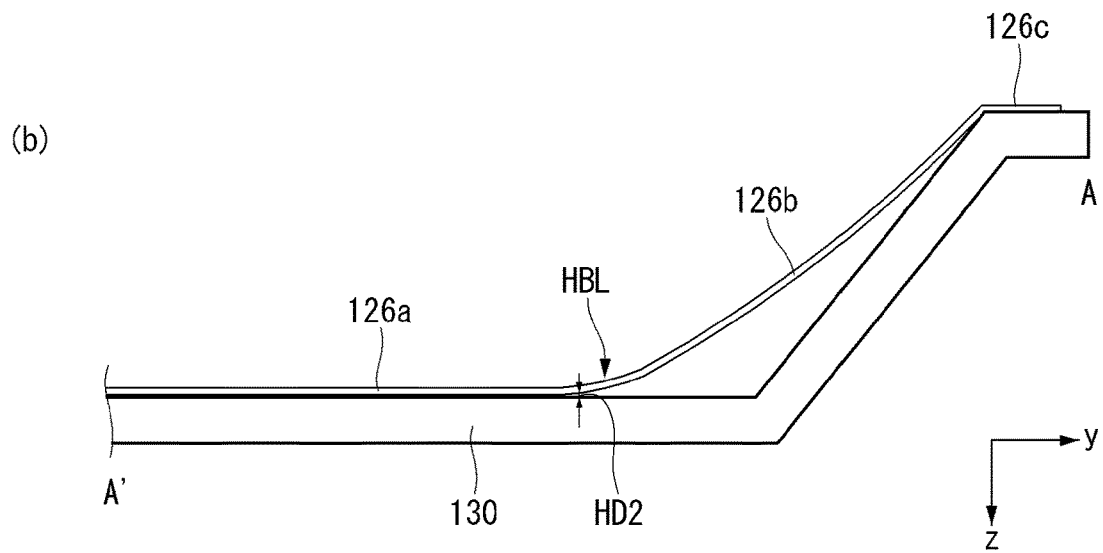

In another embodiment, as shown in FIG. 22(*a*), in the horizontal bending line HBL, a ratio of the dash area DL and the center area JL can be different. The width of the dash area DL per unit area can be greater than that of the center area JL per unit area. For example, the dash area DL can be located in a dashed dotted line form. That is, the dash area DL having a great width and the dash area DL having a small width can be alternately located.

As shown in FIG. 22(*b*), since the width of the dash area DL per unit area is greater than that of the center area JL, one end of the first sheet area 126*a* can be separated from the bottom area of the frame 130 at a second interval HD2 by the second sheet area 126*b*. The second interval HD2 can be smaller than the first interval (HD1 of FIG. 21). That is, the degree to which the first sheet area 126*a* is lifted off from the bottom area of the frame 130 can be smaller. The backlight unit can emit light more uniformly because the degree to which the first sheet area 126*a* of the reflection sheet 126 is lifted off is small.

Figure 23:
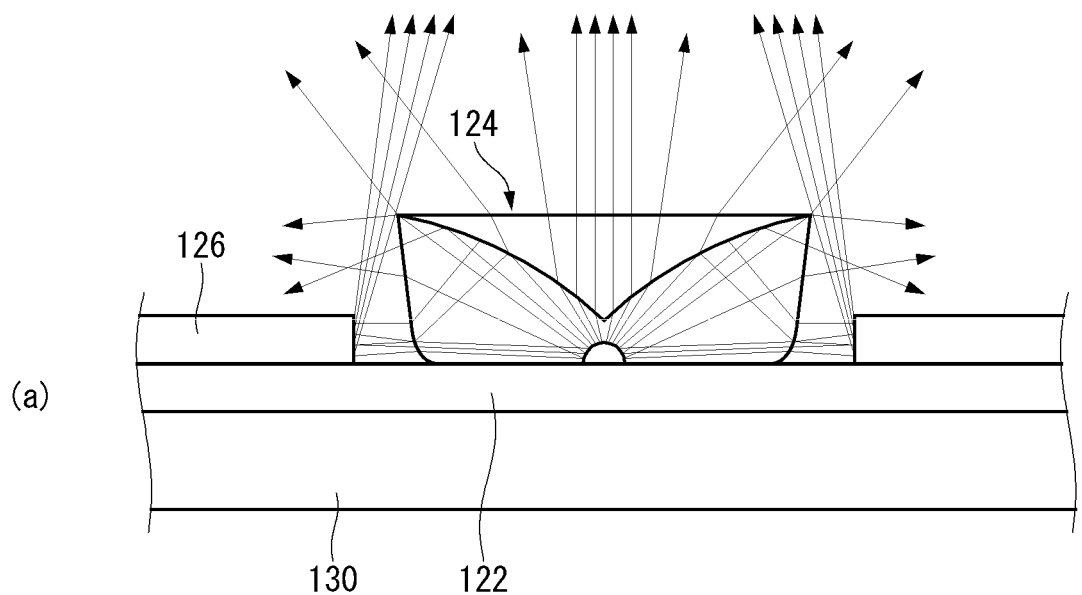
FIGS. 23 and 24 are diagrams showing a position relation between a reflection sheet and peripheral elements according to an embodiment of the present invention.
Figure 23:
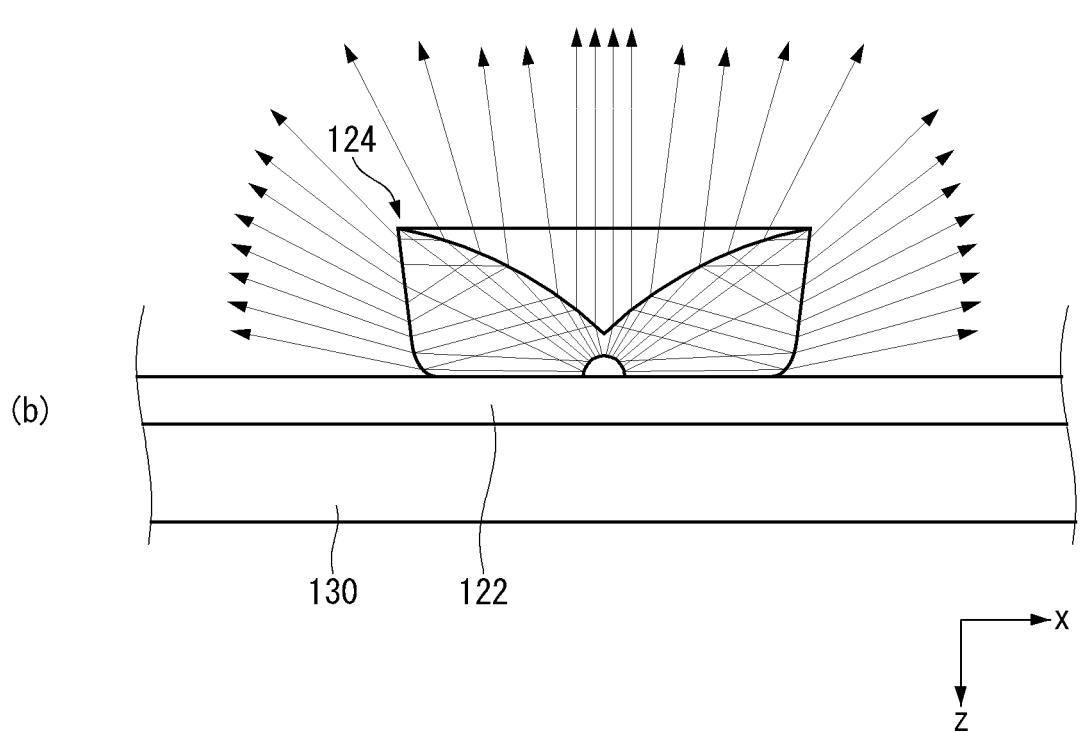
Figure 24:
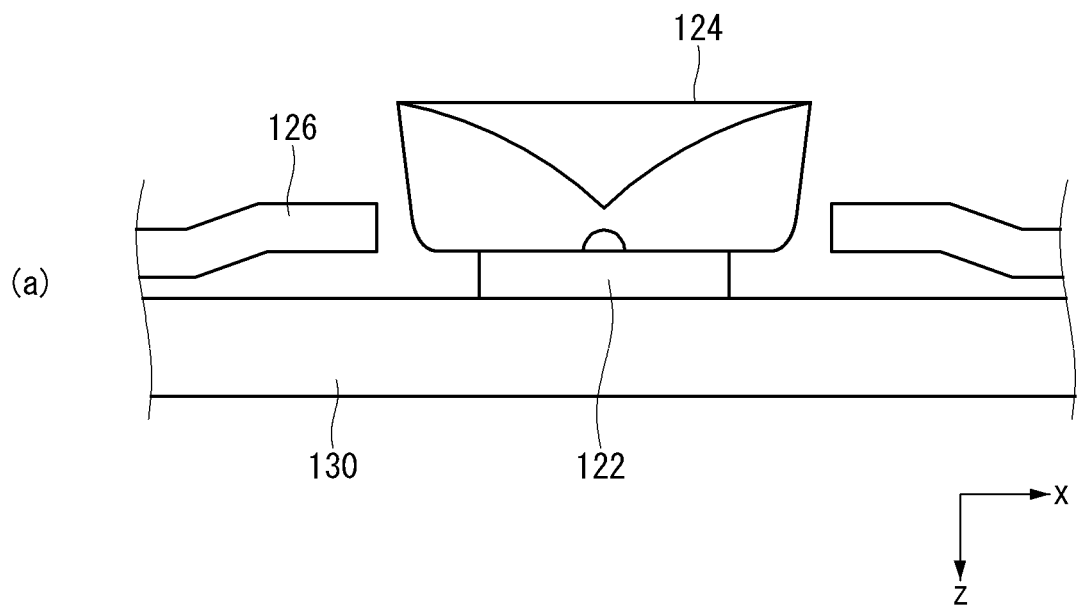
Figure 24:
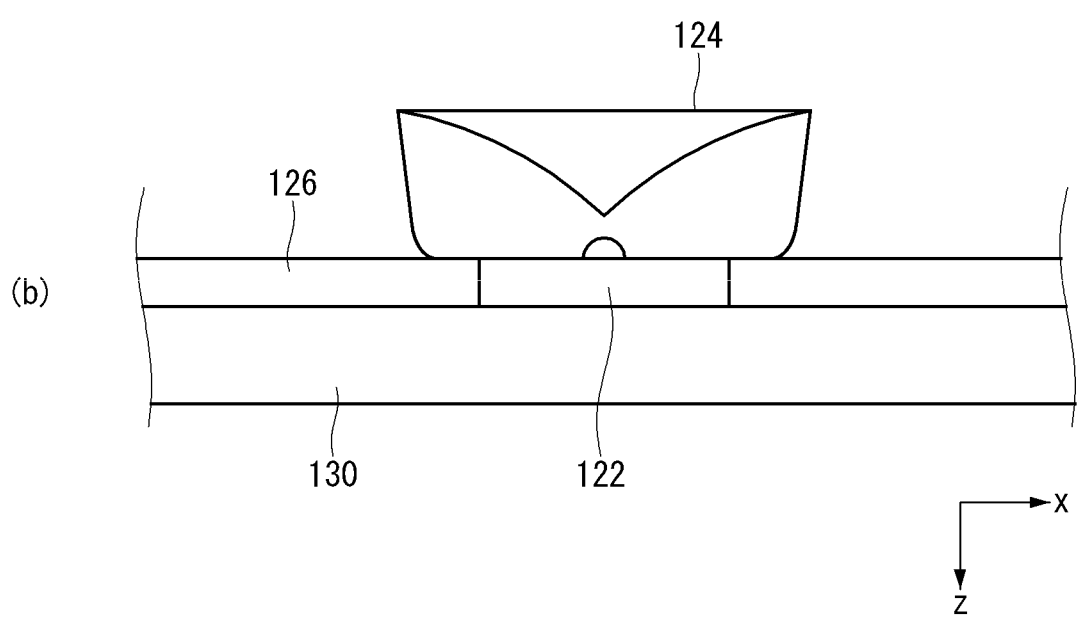

Next, FIGS. 23 and 24 are diagrams showing a position relation between a reflection sheet and peripheral elements according to an embodiment of the present invention. As shown in FIG. 23(*a*), an existing display device has a structure in which the substrate 122 is covered with the reflection sheet 126. Accordingly, the height of a portion to which the optical assembly 124 is adjacent is different. That is, at least some of light emitted to the side of the optical assembly 124 is reflected by the side of the reflection sheet 126.

Accordingly, as shown in FIG. 23(*a*), a bright point can be formed at a portion where the optical assembly 124 is located due to light reflected by the side of the reflection sheet 126. In contrast, as shown in FIG. 23(*b*), the display device according to an embodiment of the present invention has a structure in which the reflection sheet 126 is inserted into the side of the substrate 122. Accordingly, the height of the bottom area can be constant in any portion. In this instance, as shown in FIG. 23(*b*), light emitted to the side of the optical assembly 124 can be spread without being hindered. Accordingly, the backlight unit can emit light more uniformly.

As shown in FIG. 24(*a*), the existing display device has a structure in which the substrate 122 is covered with the reflection sheet 126. Accordingly, in a portion where the substrate 122 is not located, the reflection sheet 126 can be lifted off from the frame 130. In this instance, the reflection sheet 126 can be subsided toward the frame 130 as it becomes distant from the substrate 122. That is, the height of the reflection sheet 126 can be decreased as it becomes distant from the substrate 122. Accordingly, the backlight unit may not emit light uniformly because the reflection sheet 126 does not emit light uniformly.

In contrast, as shown in FIG. 24(*b*), the display device according to an embodiment of the present invention has a structure in which the reflection sheet 126 is inserted into the side of the substrate 122. Accordingly, the reflection sheet 126 can come into contact with the frame 130. That is, the height of the reflection sheet 126 can be the same regardless of a location. Accordingly, the backlight unit can emit light uniformly because the reflection sheet 126 reflects light uniformly.

Figure 25:
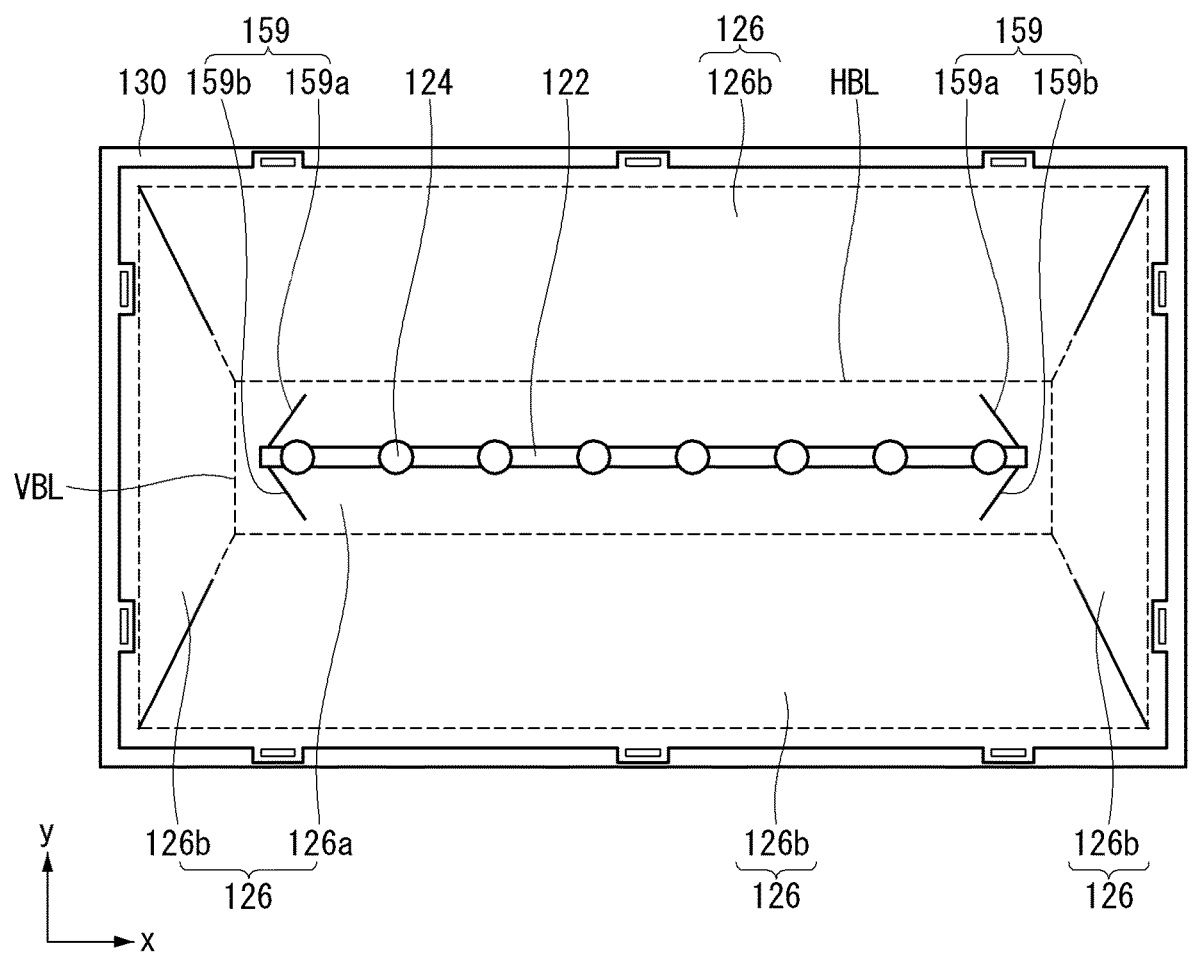
FIG. 25 is a diagram showing the configuration of a reflection sheet according to another embodiment of the present invention.

FIG. 25 is a diagram showing the configuration of a reflection sheet according to another embodiment of the present invention. As shown in FIG. 25, in the display device according to an embodiment of the present invention, the cut portions 159 can be located on both sides of the substrate 122 in the second direction. The cut portion 159 may include a first cut portion 159*a* located on the upper side of the substrate in the second direction and a second cut portion 159*b* located on the lower side of the substrate in the second direction. The first cut portion 159*a* and the second cut portion 159*b* have been illustrated as having a symmetrical shape based on the substrate 122, but are not limited thereto. The first cut portion 159a and the second cut portion 159b may have different shapes.

In the display device according to an embodiment of the present invention, the cut portions 159 can be located on both sides of the substrate 122 in the second direction. Accordingly, both the first and the second cut portions 159a and 159b can be open and the reflection sheet 126 can be inserted into the side of the substrate 122. Accordingly, the reflection sheet 126 can be assembled more easily.

Figure 26:
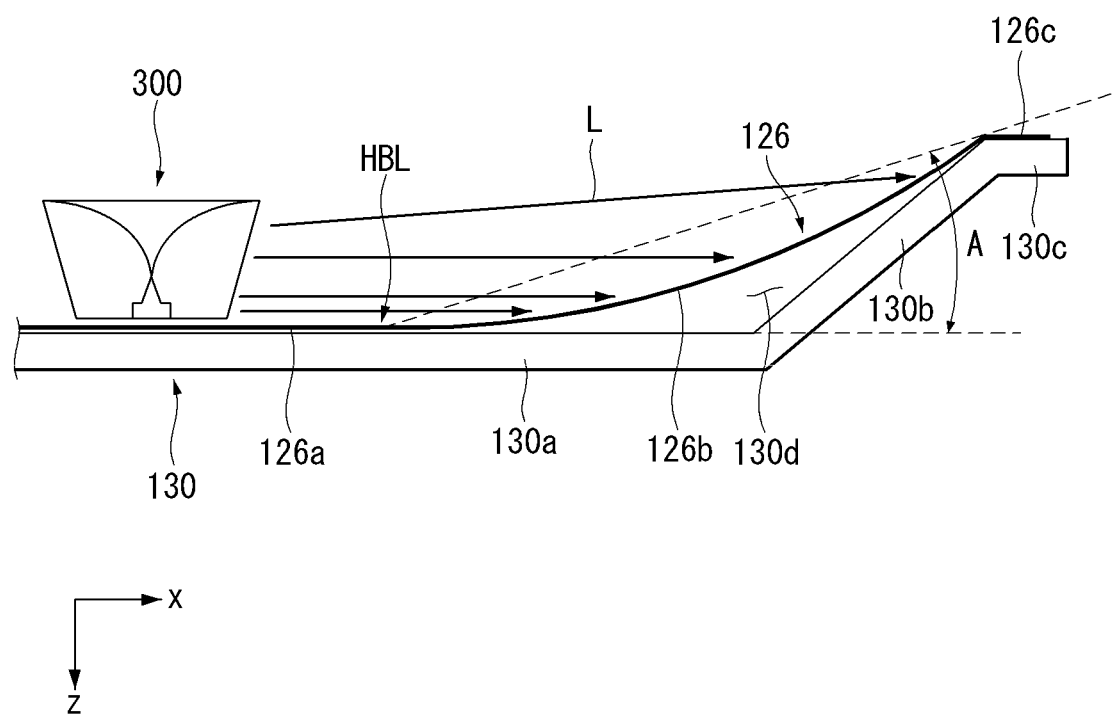
FIGS. 26 to 32 are diagrams showing a dot distribution or strip distribution of a reflection sheet according to an embodiment of the present invention.

FIGS. 26 to 32 are diagrams showing a dot distribution or strip distribution of a reflection sheet according to an embodiment of the present invention. As shown in FIG. 26, the frame 130 may include first to third frame areas 130a to 130c. The first frame area 130a can be the bottom area of the frame 130, and can be substantially flat. That is, the first frame area 130a can be a surface located on the X-Y plane of the display device 100.

The second frame area 130b can be a sidewall area extended upward from the first frame area 130a. The second frame area 130b may have a direction parallel to the Z direction or a direction obliquely inclined with respect to the Z direction. Further, the seated part (132 of FIG. 10) can be formed within the frame 130 by the second frame area 130b that functions as the sidewall of the frame 130.

The third frame area 130c can be an area extended from the second frame area 130b in the X direction and can be substantially parallel to the first frame area 130a. That is, the third frame area 130c has height different from that of the first frame area 130a due to the second frame area 130b, but may have a flat surface like the first frame area 130a.

A protruded area can be present in the third frame area 130c. A protrusion formed by a separate process can be coupled to the third frame area 130c. The reflection sheet 126 can be coupled to the protruded area and/or protrusion of the third frame 130c. For example, the third sheet area 130c of the reflection sheet 126 can be coupled to the protruded area and/or protrusion. The optical sheet (215 of FIG. 5) can be coupled to the protruded area and/or protrusion of the third frame 130c.

The reflection sheet 126 can be coupled to the area formed by the first to the third frame areas 130a to 130c. When the reflection sheet 126 and the frame 130 are coupled together, the shape of the reflection sheet 126 can be naturally changed in accordance with a shape of the frame 130. That is, a naturally rounded second sheet area 126b can be formed. Accordingly, there is an advantage in that workability can be improved because a separate process for forming the chamfer of the reflection sheet 126 is not required.

The reflection sheet 126 may include the first to the third frame areas 126a to 126c. That is, the area of the reflection sheet 126 can be divided depending on whether the reflection sheet 126 and the frame 130 come into contact with each other or not. For example, the reflection sheet 126 is divided into a contact area where the reflection sheet 126 and the frame 130 come into contact with each other and a non-contact area where the reflection sheet 126 and the frame 130 do not come into contact with each other.

The first and the second sheet areas 126a and 126b can be divided by the horizontal bending line HBL. In other words, the second sheet area 126b can be an area coming into contact with the third frame area 130c in the horizontal bending line HBL. The first and the second sheet areas 126a and 126b can be divided depending on whether they come into contact with the first region 130a of the frame 130.

The second sheet area 126b can be naturally spaced apart from the frame 130 due to the physical properties or elasticity of the reflection sheet 126 itself. That is, when the sheet area 126b is coupled to the frame 130, it naturally forms a curved surface by its self-weight and can be spaced apart from the frame 130. An isolated space 130d can be formed between the second sheet area 126b and the frame 130. In the second sheet area 126b, an angle formed by the reflection sheet 126 and the bottom area of the frame 130 can be gradually increased. That is, the reflection sheet 126 can be located in a two-dimensional curved line form within the non-contact area. The same is true if the second sheet area 126b is spaced apart from the frame 130 at a specific angle.

The third sheet area 126c can be seated in the third frame area 130c. The third sheet area 126c can be coupled to the third frame area 130c. Alternatively, the third sheet area 126c can be naturally laid on the third frame area 130c. That is, the third sheet area 126c may come into contact with the third frame area 130c due to an elastic force in the Z direction attributable to the second sheet area 126c forming a curved surface.

In addition, light L can be emanated through the lens 300. That is, light generated by the light source can be externally emanated through the lens 300. The light L emanated through the lens 300 may have various paths. For example, some of the light L may form a path in the side direction of the lens 300.

Some of the light L in the side direction path can be directed toward the second sheet area 126b. At least some of light generated by the light source can be subjected to total reflection within the lens 300 and directed toward the second sheet area 126b. In such a case, light L directed toward the upper unit area of the second sheet area 126b can be greater than light L directed toward the lower area thereof. In other words, the amount and/or density of light L transferred to the reflection sheet 126 may not be uniform. If the amount and/or density of light L is irregular, a user who watches the display device 100 may notice such a difference. For example, if more light L is incident on the upper unit area of the second sheet area 126b than on the lower area, a corresponding area may look brighter than other areas due to light L reflected by the upper unit area.

Figure 27:
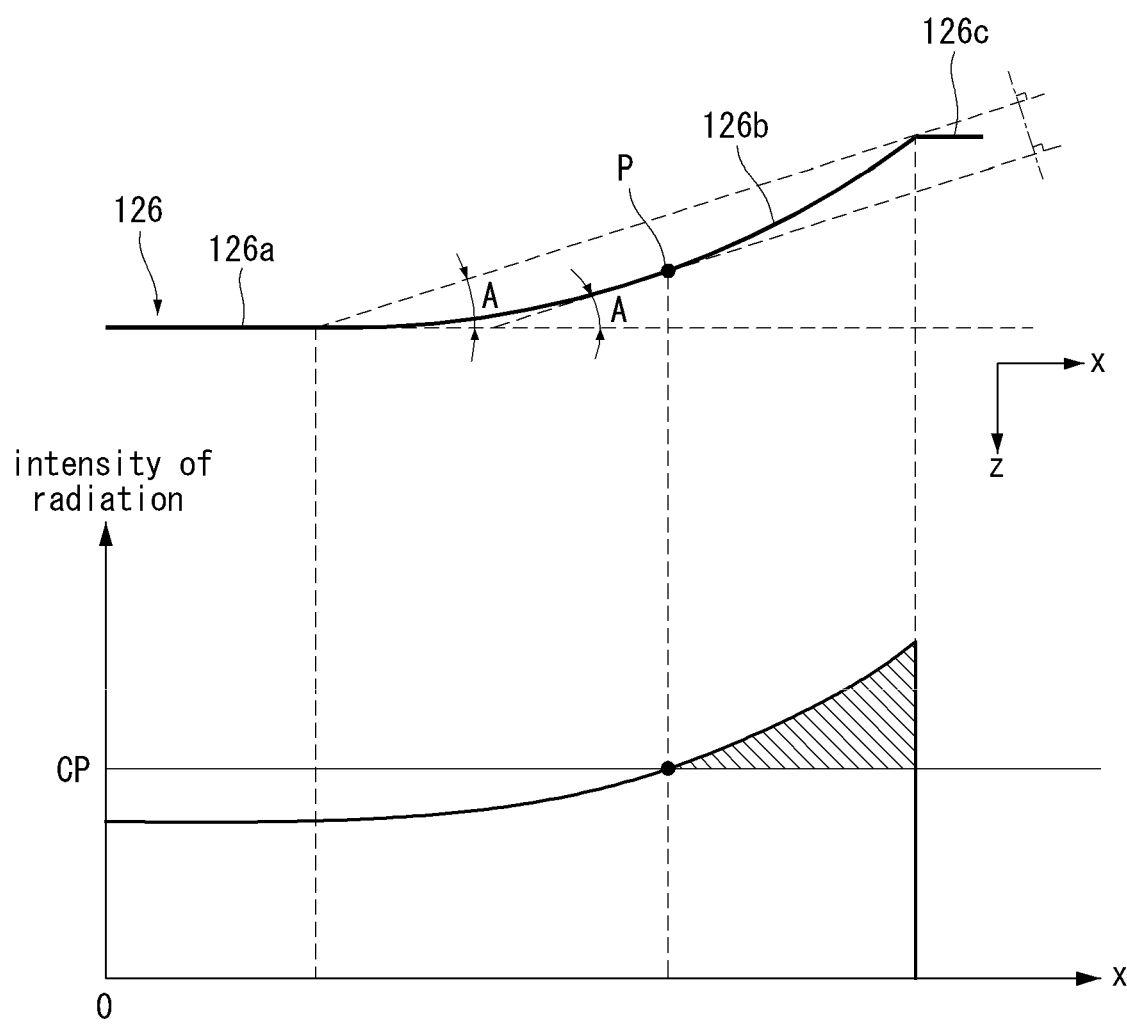

As shown in FIG. 27, an angle between two straight lines parallel to an extension line from the boundary of the first sheet area 126a and the second sheet area 126b to the boundary of the second sheet area 126b and the third sheet area 126c and the X direction can be said to be A. The tilted angle of the second sheet area 126b can be increased with P, that is, an intersection point between the second sheet area 126b and the straight line of the angle A, as its starting point. That is, the angle between the second sheet area 126b and the X direction may sharply increase after the second sheet area 126b passes through the intersection point P.

Since the angle of the second sheet area 126b increases after the second sheet area 126b passes through the intersection point P, density of light L emanated from the lens (124b of FIG. 11) per unit area can be further increased. Accordingly, a corresponding portion may look brighter than other portions. Thus, a user may feel that light is irregular. In the display device 100 according to an embodiment of the present invention, the reflection sheet 126 can uniformly reflect light. Accordingly, a user does not feel or feels less the irregularity of light.

Figure 28:
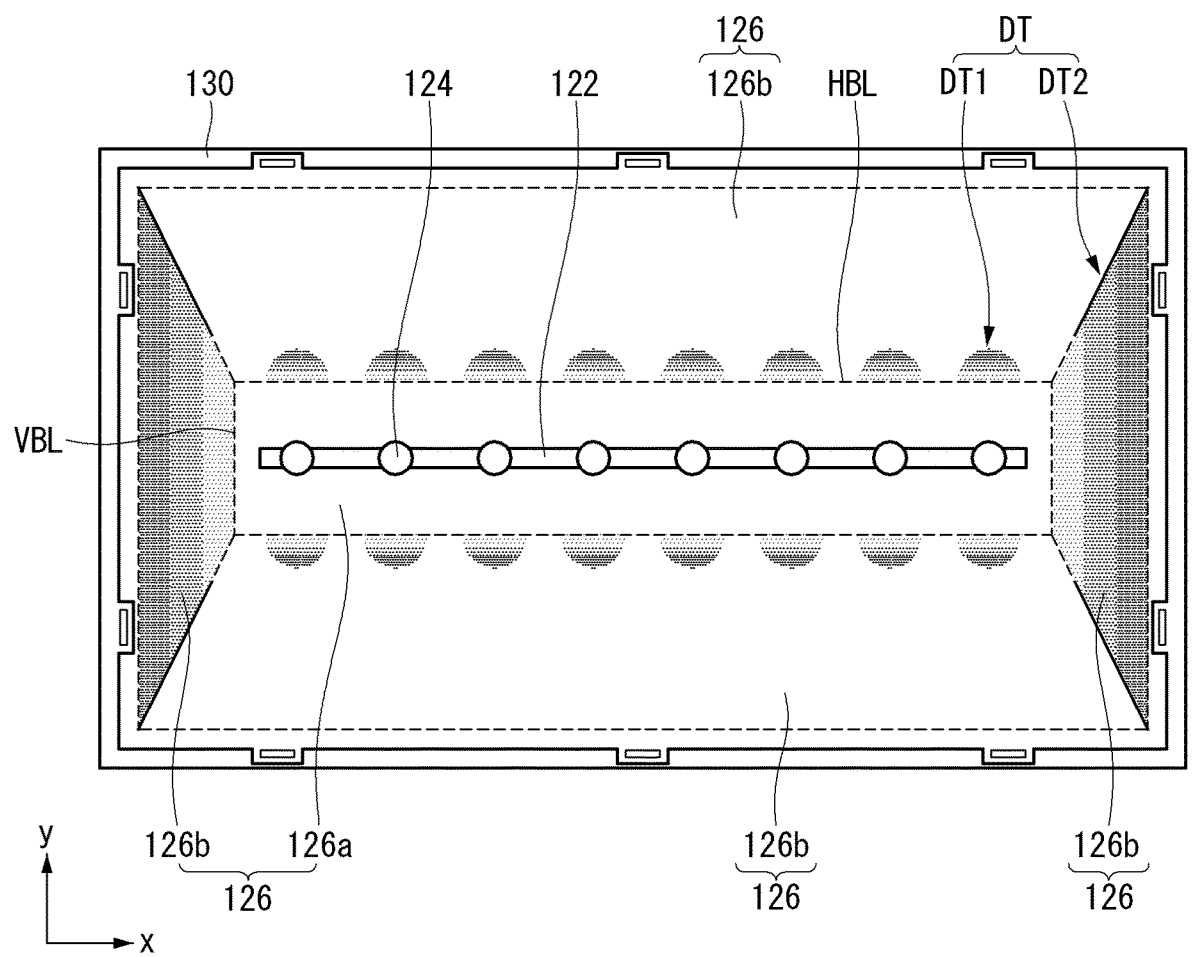

As shown in FIG. 28, a dot area DT can be located in at least some area of the reflection sheet 126 according to an embodiment of the present invention. A dot can be an area to which a pattern different from that of another area has been added. The dot can be an uneven portion (or concave-convex) portion) area formed on the reflection sheet 126.

The dot can be an area in which at least some area on the reflection sheet 126 has been colored. For example, the dot can be an area having relatively dark color such as a black or gray area. The dot can be an area in which an uneven portion and coloring have been mixed. The dot can also have a geometric shape in which at least one of a shape, a size, a location, and color is different. For example, the dot can be any one of various shapes, such as a circle, an ellipse, a quadrangle, a pole form, and a triangle formed on the reflection sheet 126, and/or a combination of various shapes.

The dot has an influence on reflectance of a corresponding area. That is, the dot changes reflectance of light. For example, the dot reduces reflectance of light depending on at least one of its size, shape, location, and color. A plurality of dots can be configured in the form of the dot area DT.

The dot area DT can be a set of dots. That is, the dot area DT can be a specific area in which a plurality of dots having at least one of its shape, size, location, and color different or identical has been formed. For example, the dot area DT can be formed in at least some area of the second sheet area 126b. As described above, the second sheet area 126b can have high density of light per unit area in terms of its inclined form. The dot area DT can change reflectance of light incident on the second sheet area 126b. In other words, the dot area DT can increase density of incident light per unit area, but may decrease density of reflected light per unit area.

Accordingly, a phenomenon in which light and darkness in a portion corresponding to the second sheet area 126b is different from that in other portions can be prevented. That is, light can be regularly reflected by the entire reflection sheet 126 due to the presence of the dot area DT.

The dot area DT may include a first dot area DT1 and a second dot area DT2. The first dot area DT1 can be a dot area DT located on the long-side side of the reflection sheet 126. In other words, the first dot area DT1 can be a dot area DT located between the optical assembly 124 and the long side of the reflection sheet 126. The first dot area DT1 can be located in the second sheet area 126b. That is, the optical assembly 124 can be located inside the horizontal bending line HBL and the first dot area DT1 can be located outside the horizontal bending line HBL.

The first dot area DT1 can be located in a portion corresponding to the lens. That is, at least one first dot area DT1 can be spaced apart from another adjacent first dot area DT1 at a specific interval. The first dot area DT1 may have a semicircle. Accordingly, the width of the first dot area DT1 in the first direction can be reduced toward the edge of the reflection sheet 126.

The second dot area DT2 can be a dot area DT located on the short-side side of the reflection sheet 126. The second dot area DT2 can be located in the second sheet area 126b. That is, the optical assembly 124 can be located inside the vertical bending line VBL and the second dot area DT2 can be located outside the vertical bending line VBL.

At least one of the attributes of the size, density, and color of dots in the first and the second dot areas DT1 and DT2 can be gradually changed. For example, the size of the dots in the first and the second dot areas DT1 and DT2 may gradually increase toward the edge of the reflection sheet 126. Accordingly, light reflected by the reflection sheet 126 can become regular.

Figure 29:
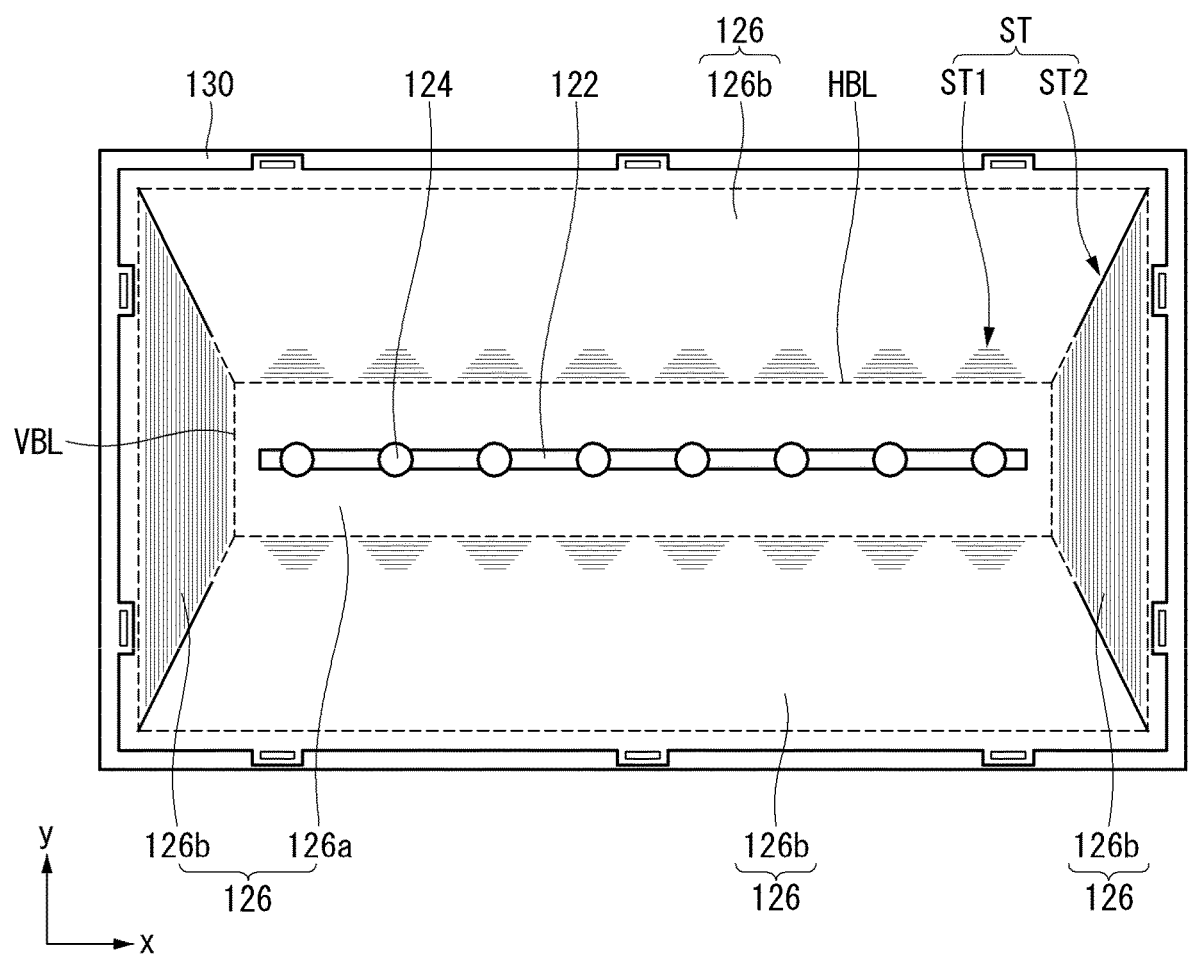

As shown in FIG. 29, a strip area ST can be located in at least some area of the reflection sheet 126 according to an embodiment of the present invention. The strip area ST may have a line form. The strip area ST can be formed to have a specific width or height or more. The strip area ST can be continuously formed. The strip area ST can be a set of continuous lines. A set of lines forming the strip area ST can be different from another set of lines forming the strip area ST. For example, at least one of the thickness, length, color, and distance of a line can be different.

The strip area ST may include a first strip area ST1 and a second strip area ST2. The first and the second strip areas ST1 and ST2 can be located in the same portions as the first and the second dot area (DT1 and DT2 of FIG. 28). For example, the first strip area ST1 can be located between the optical assembly 124 and the long side of the reflection sheet 126, and the second strip area ST2 can be located between the optical assembly 124 and the short side of the reflection sheet 126.

The first strip area ST1 can be located in a portion corresponding to the optical assembly 124. The first strip area ST1 may have a semicircle. Accordingly, the width of the first strip area ST1 in the first direction may decrease toward the edge of the reflection sheet 126. The strip area ST can be located in the reflection sheet 126 according to an embodiment of the present invention instead of the dot area DT. Accordingly, overall luminance of the backlight unit can become uniform because reflectance of the second sheet area 126b is further reduced.

Figure 30:
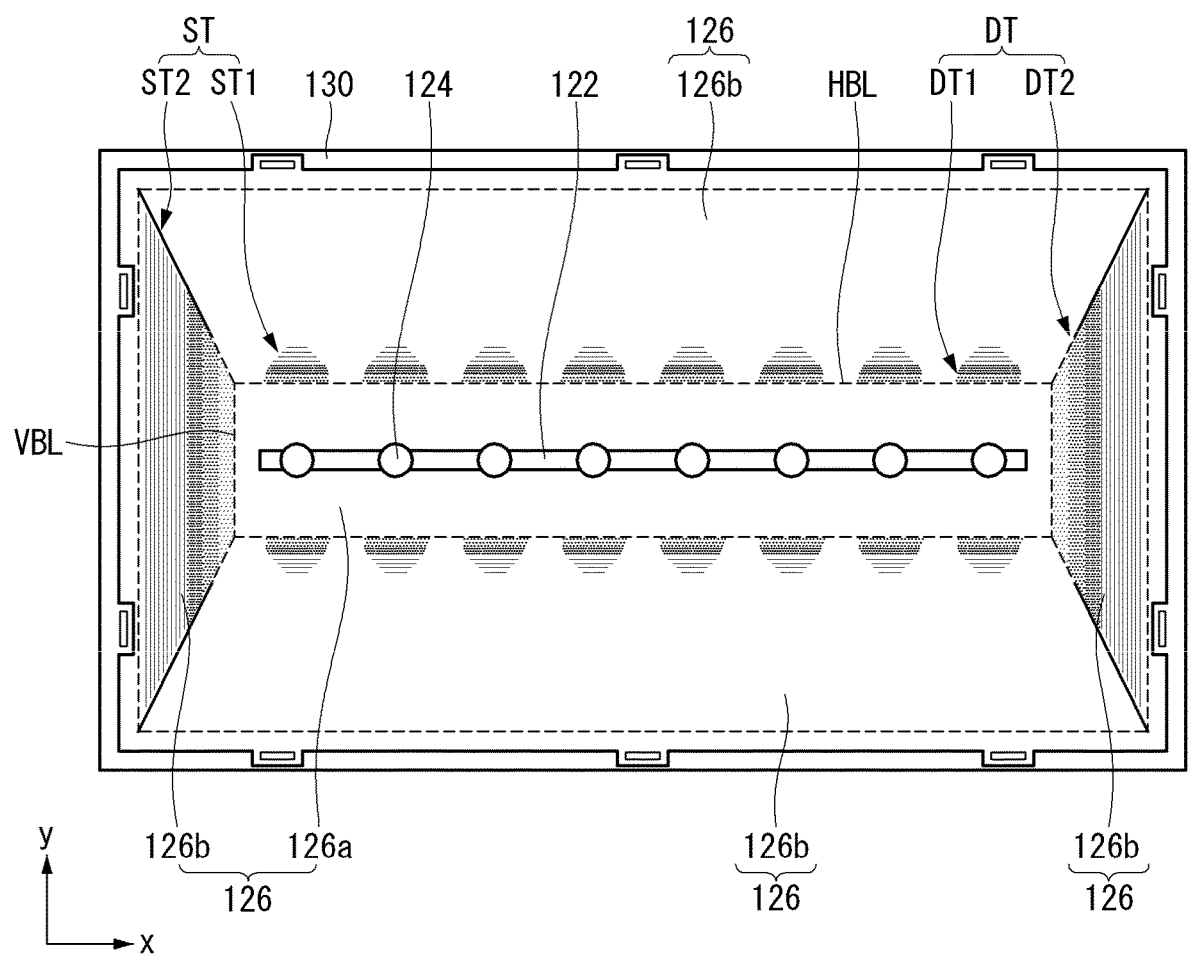

As shown in FIG. 30, both the strip area ST and the dot area DT can be located in the reflection sheet 126. The strip area ST can be located adjacent to the edge of the reflection sheet 126. That is, the strip area ST can be disposed farther from the optical assembly 124 than from the dot area DT. The dot area DT can be located between the optical assembly 124 and the strip area ST.

Reflectance of light incident on the light source can be different in the dot area DT and the strip area ST. For example, reflectance in the dot area DT can be greater than reflectance in the strip area ST. In other words, reflectance in the strip area ST can be smaller than reflectance in the dot area DT. As described above, an area close to the edge of the reflection sheet 126 can be located close to a right angle to the first sheet area 126a due to the shape of the reflection sheet 126.

Figure 31:
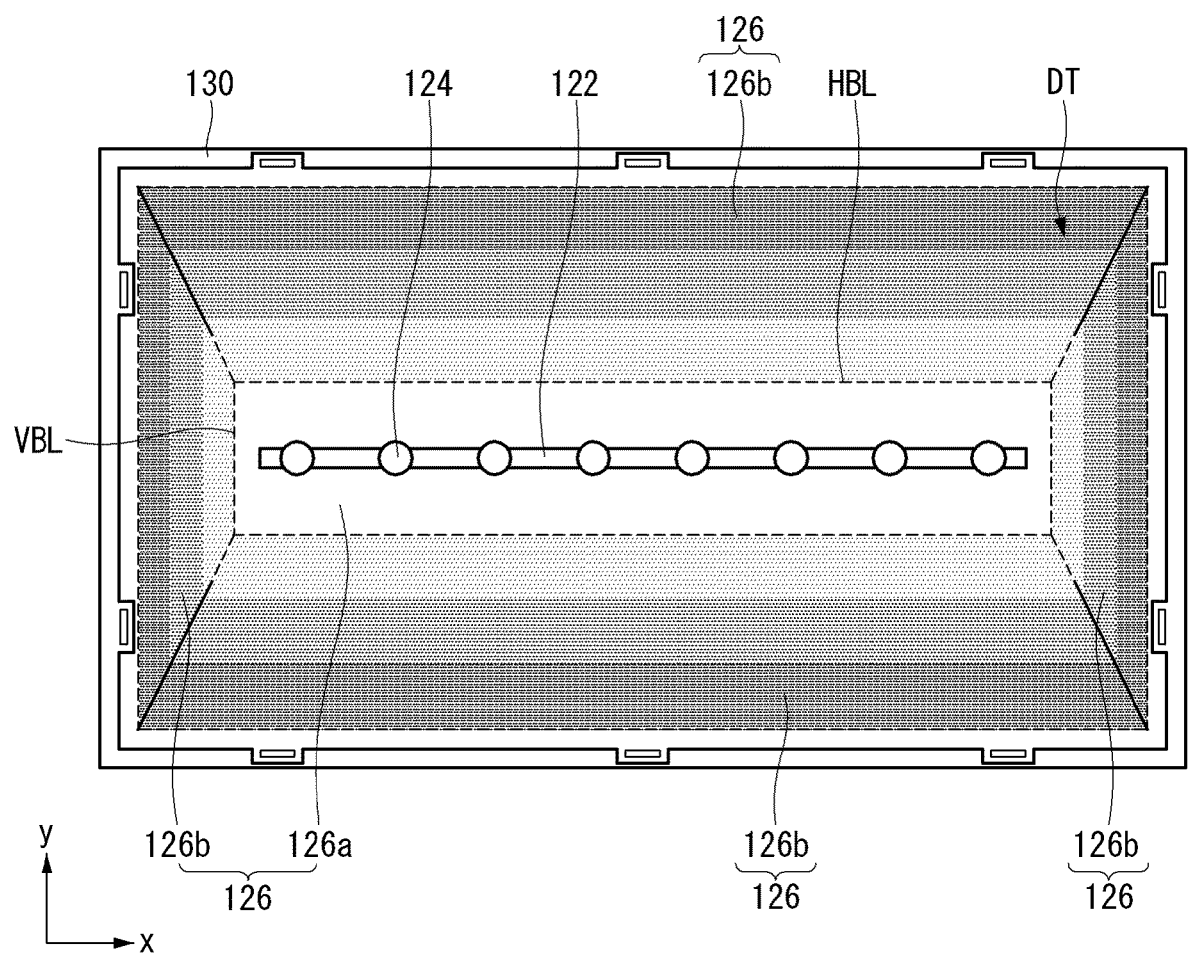

Accordingly, more light can be incident on a corresponding area than other portions. The strip area ST formed in the corresponding area can reduce reflectance of the corresponding area, thereby being capable of making uniform overall luminance. As shown in FIG. 31, the dot area DT can be located in the entire portion of the second sheet area 126b. That is, dots can be distributed in the entire part of the second sheet area 126b.

As described above, at least one of the size, shape, location, and color of the dots can be changed depending on the amount and/or density of light that reaches the dots. For example, the size of the dots may gradually increase toward the edge portion of the second sheet area 126b, but the present invention is not limited thereto. The dot can be changed in various manners.

In this instance, the dot area DT can be located in another portion in addition to a portion corresponding to the optical assembly 124. Accordingly, the amount and/or density of light incident on another portion other than a portion corresponding to the optical assembly 124 can also be controlled. Accordingly, light reflected by the reflection sheet 126 can become further uniform.

Figure 32:
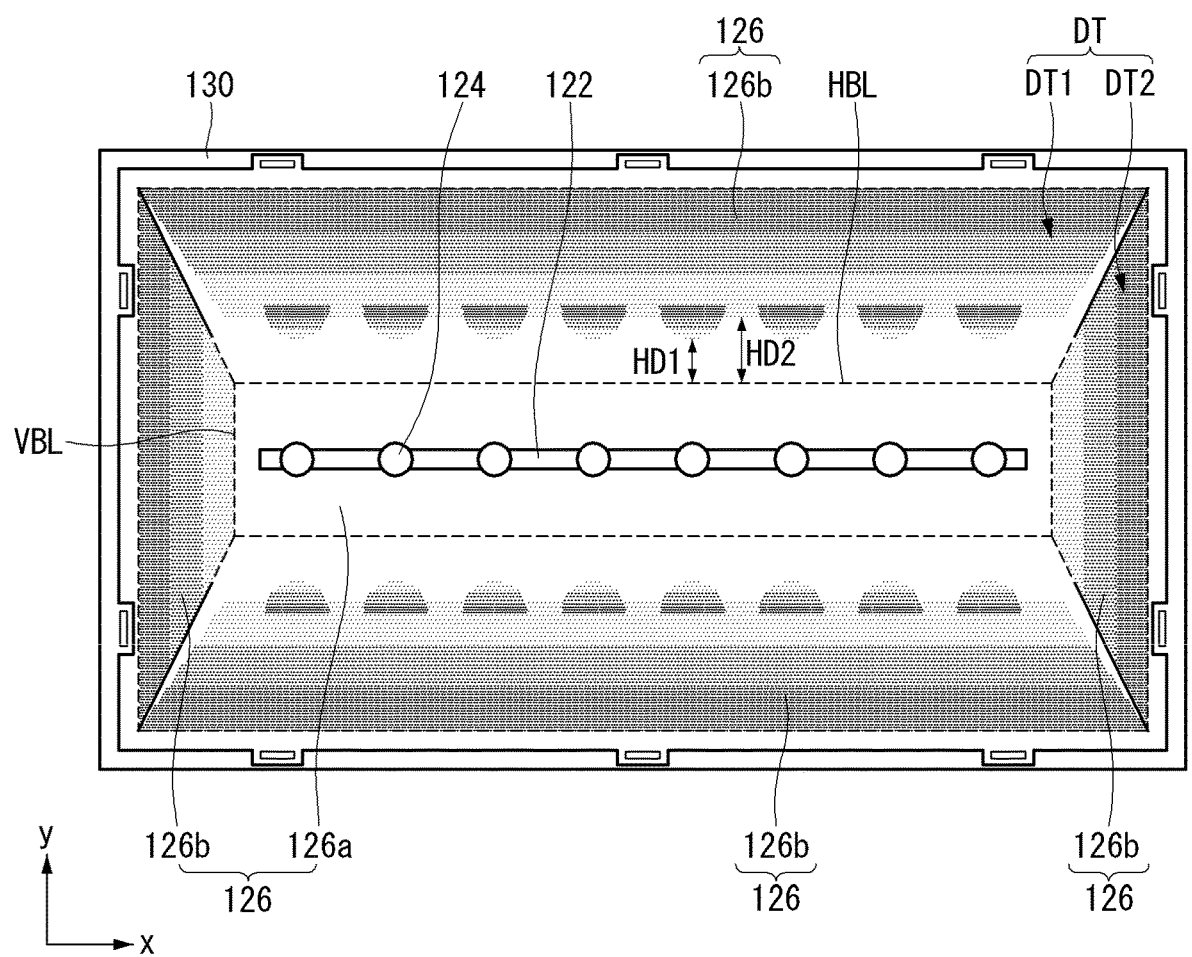

As shown in FIG. 32, the second dot area DT2 can be spaced apart from the horizontal bending line HBL. A portion that belongs to the second dot area DT2 and that corresponds to the optical assembly 124 can be more protruded toward the optical assembly 124 than another portion. A portion that belongs to the second dot area DT2 and that corresponds to the optical assembly can be spaced apart from the horizontal bending line HBL at a first dot interval HD1, and another portion can be spaced apart from the horizontal bending line HBL at a second dot interval HD2. The first dot interval HD1 can be shorter than the second dot interval HD2.

At least one of the attributes of the size, density, and color of the protruding unit that belongs to the second dot area DT2 and that corresponds to the optical assembly 124 can be different from that of another portion. For example, the size of a dot in the protruding unit that belongs to the second dot area DT2 and that corresponds to the optical assembly 124 can be greater than that in another portion. Accordingly, light reflected by the reflection sheet 126 can become uniform.

In the following description, a display panel 420' may include a first long side LS1', a second long side LS2' facing the first long side LS1', a first short side SS1' neighboring the first long side LS1' and the second long side LS2', and a second short side SS2' facing the first short side SS1'.

In this instance, the first short side SS1' can be said to be a first side area, and the second short side SS2' can be said to be a second side area facing the first side area. The first long side LS1' can be said to be a third side area neighboring the first side area and the second side area and located between the first side area and the second side area. In addition, the second long side LS2' can be said to be a fourth side area neighboring the first side area and the second side area, located between the first side area and the second side area, and facing the third side area.

Furthermore, the first or second long side LS1' or LS2' has been illustrated as having a longer length than the first or second short side SS1' or SS2', for convenience of description, but the first or second long side LS1' or LS2' may have almost the same length as the first or second short side SS1' or SS2'.

In the following description, a first direction DR1 can be a direction parallel to the long sides LS1' and LS2' of a display panel 110', and a second direction DR2 can be a direction parallel to the short sides SS1' and SS2' of the display panel 110'. A third direction DR3 can be a direction perpendicular to the first direction DR1 and/or the second direction DR2. The first direction DR1 and the second direction DR2 can be collectively called a horizontal direction. Furthermore, the third direction DR3 can be called a vertical direction.

Figure 33:
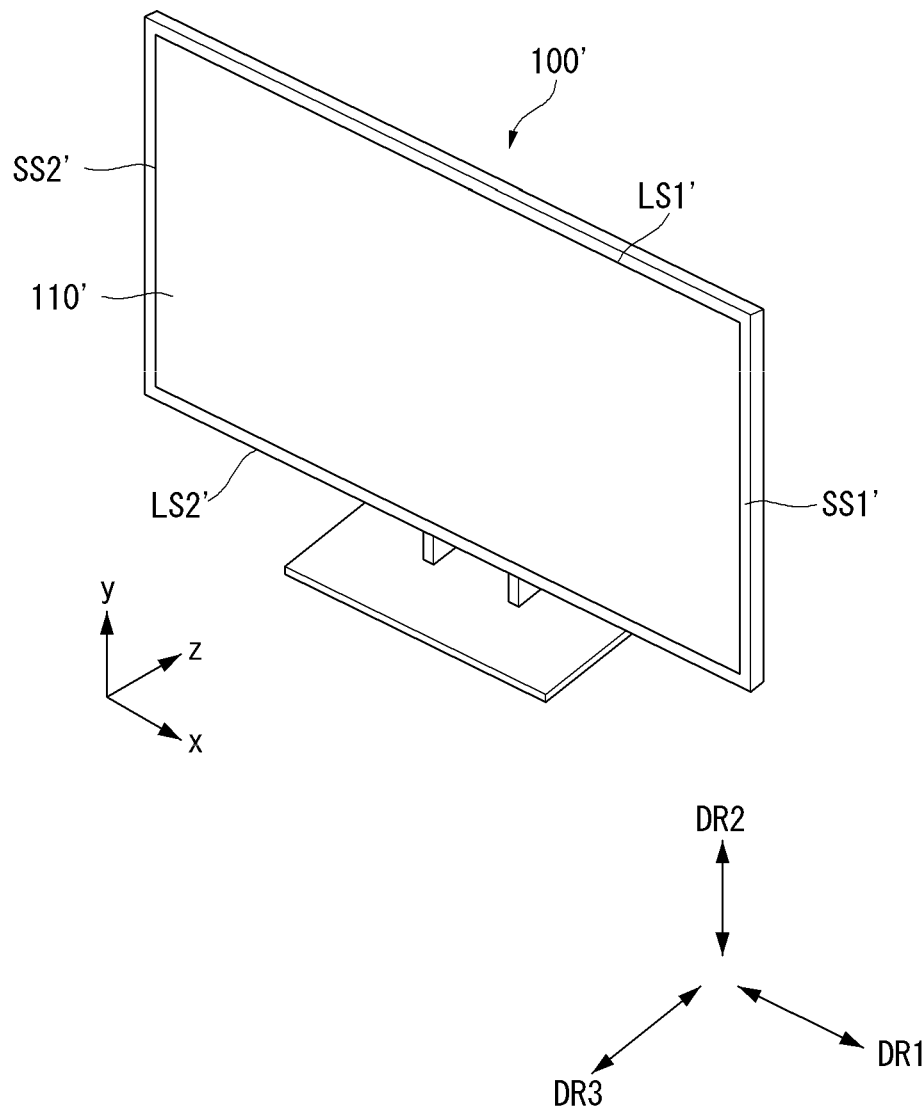
FIGS. 33 and 34 are diagrams showing a display device according to an embodiment of the present invention.
Figure 34:
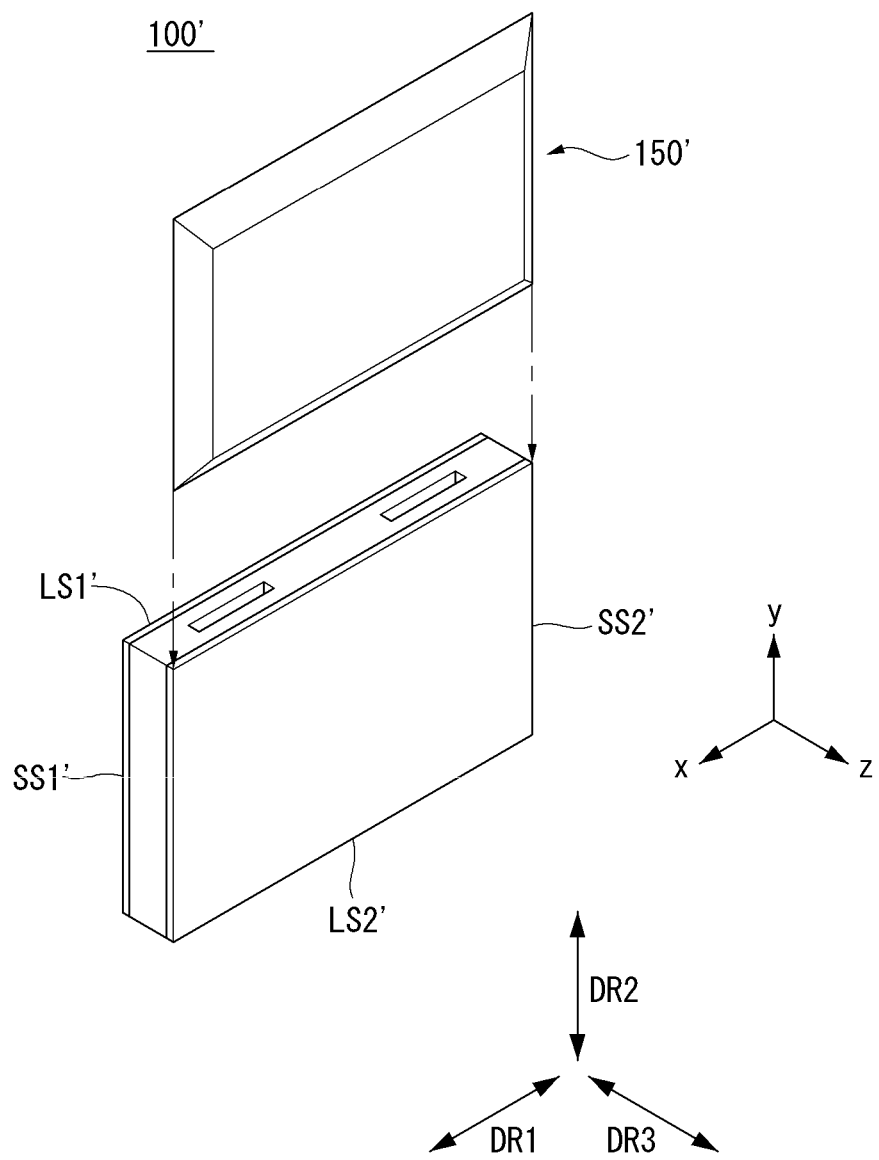

Next, FIGS. 33 and 34 are diagrams showing a display device according to an embodiment of the present invention. As shown in FIGS. 33 and 34, the display device 100' according to an embodiment of the present invention includes a display panel 110' and a back cover 150' at the back of the display panel 110'.

The back cover 150' can be connected to the display panel 110' in a sliding manner in the direction from the first long side LS1' to the second long side LS2', that is, a second direction DR2. In other words, the back cover 150' can be inserted in a sliding manner from the first short side SS1' of the display panel 110', the second short side SS2' facing the first short side SS1', and the first long side LS1' neighboring the first and the second short sides SS1' and SS2' and located between the first short side SS1' and the second short side SS2'. In order to connect the back cover 150' to the display panel 110' in a sliding manner, a protruding unit, a sliding unit, a coupling part, etc. can be included in the back cover 150' and/or another structure adjacent to the back cover 150'.

Figure 35:
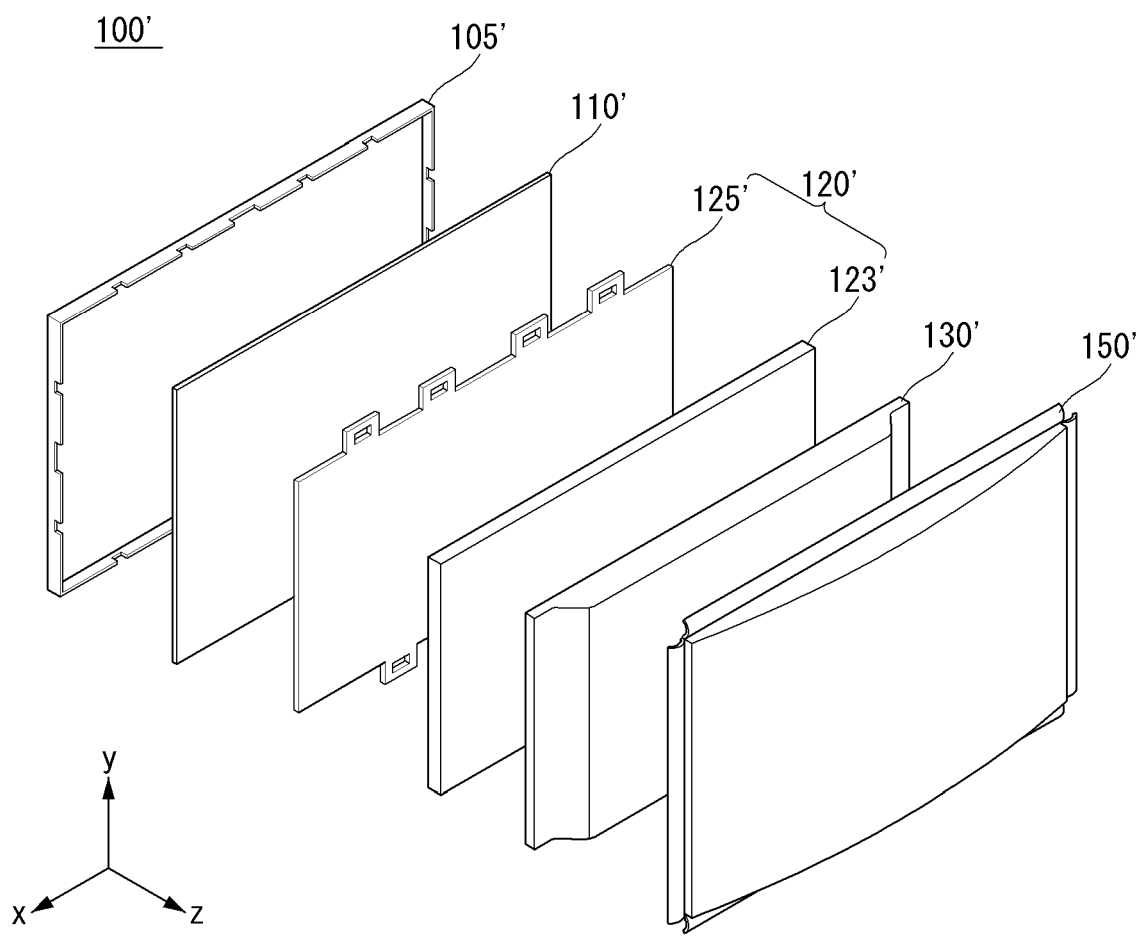
FIGS. 35 to 39 are diagrams showing the configuration of a display device related to an embodiment of the present invention.

FIGS. 35 to 39 are diagrams showing the configuration of a display device related to an embodiment of the present invention. As shown in FIG. 35, the display device 100' according to an embodiment of the present invention includes a front cover 105', a display panel 110', a backlight unit 120', a frame 130', and a back cover 150'.

The front cover 105' covers at least some area of the front and side of the display panel 110', and the front cover 105' has a rectangular frame shape having an empty center. Since the center of the front cover 105' is empty, an image of the display panel 110' can be displayed to the outside.

The front cover 105' can be divided into a front cover and a side cover. That is, the front cover 105' can be divided into the front cover placed on the front side of the display panel 110' and the side cover placed on the side of the display panel 110'. The front cover and the side cover can be separately configured. Any one of the front cover and the side cover can be omitted. For example, the front cover is not present and only the side cover is present for the purpose of an aesthetic design, etc.

The display panel 110' is provided at the front of the display device 100', and an image is displayed on the display panel 110'. The display panel 110' can divide an image into a plurality of pixels and output the image according to color, brightness, and chroma for each pixel. The display panel 110' can be divided into an active area in which an image is displayed and an inactive area in which an image is not displayed. The display panel 110' also includes a front substrate and a rear substrate facing each other with a liquid crystal layer interposed therebetween.

The front substrate may include a plurality of pixels including red (R), green (G), and blue (B) subpixels and can generate an image corresponding to red, green or blue color in response to a control signal. The rear substrate may include switching elements and can switch a pixel electrode. For example, the pixel electrode can change the arrangement of the molecules of the liquid crystal layer in response to an external control signal.

The liquid crystal layer includes a plurality of liquid crystal molecules. The arrangement of the liquid crystal molecules can be changed in accordance with a voltage difference generated between the pixel electrode and a common electrode. In addition, the liquid crystal layer can transfer light, supplied by the backlight unit 120', to the front substrate.

The backlight unit 120' is located at the back of the display panel 110' and includes a plurality of light sources. The light source of the backlight unit 120' can be disposed in a direct type or an edge type. For an edge type backlight unit 120', a light guide panel is further included.

In addition, the backlight unit 120' can be coupled to the front of a frame 140'. For example, the plurality of light sources can be disposed on the front side of the frame 140'. In such a case, the backlight unit 120' can be commonly called a direct type backlight unit.

The backlight unit 120' can be driven using a total driving method or a partial driving method, such as local dimming or impulsive. The backlight unit 120' may also include an optical sheet 125' and an optical layer 123'. The optical sheet 125' enables light of the light source to be uniformly delivered to the display panel 110'. The optical sheet 125' may include a plurality of layers. For example, the optical sheet 125' may include at least one prism sheet and/or at least one diffusion sheet.

The optical sheet 125' may include at least one coupling part 125*d'*. The coupling part 125*d'* can be coupled to the front cover 105' and/or the back cover 150'. That is, the coupling part 125*d'* can be directly coupled to the front cover 105' and/or the back cover 150'. Alternatively, the coupling part 125*d'* can be coupled to a structure coupled to the front cover 105' and/or the back cover 150'. That is, the coupling part 125*d'* can be indirectly coupled to the front cover 105' and/or the back cover 150'.

The optical layer 123' may include the light source and so on. The optical layer 123' is described in detail in a corresponding part. The frame 130' functions to support elements of the display device 100'. For example, an element, such as the backlight unit 120', can be coupled to the frame 130'. The frame 130' can be made of a metallic material, such as an aluminum alloy.

The back cover 150' can be located at the backside of the display device 100' and protects internal elements from the outside. At least some of the back cover 150' can be coupled to the frame 130' and/or the front cover 105'. The back cover 150' can be an injected matter made of resin.

Figure 36:
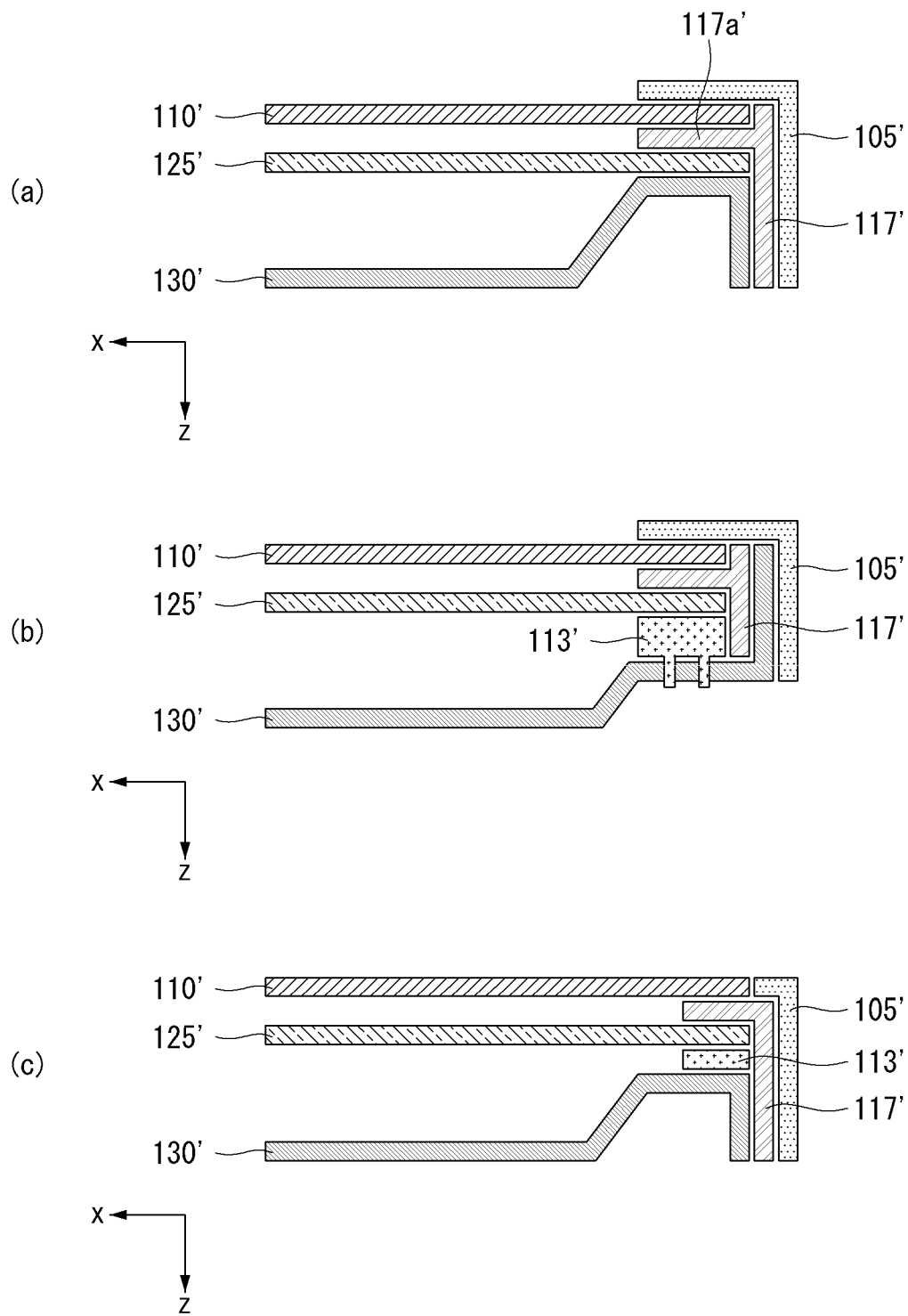

Next, FIG. 36 is a diagram showing elements, such as the optical sheet 125'. As shown in FIG. 36(*a*), the optical sheet 125' can be located above the frame 130'. The optical sheet 125' can be coupled to the frame 130' at the edge of the frame 130'.

The optical sheet 125' can be directly seated in the edge of the frame 130'. That is, the outer circumference of the optical sheet 125' can be supported by the frame 130'. The upper surface of the edge of the optical sheet 125' can be surrounded by a first guide panel 117'. For example, the optical sheet 125' can be located between the edge of the frame 130' and the flange 117'*a* of the first guide panel 117'.

The display panel 110' can be located on the front side of the optical sheet 125'. The edge of the display panel 110' can be coupled to the first guide panel 117'. That is, the display panel 110' can be supported by the first guide panel 117'. The edge area of the front of the display panel 110' can be surrounded by the front cover 105'. For example, the display panel 110' can be located between the first guide panel 117' and the front cover 105'.

As shown in FIG. 36(*b*), the display device 100' according to an embodiment of the present invention may further include a second guide panel 113'. The optical sheet 125' can be coupled to the second guide panel 113'. That is, the second guide panel 113' can be coupled to the frame 130' and the optical sheet 125' can be coupled to the second guide panel 113'. The second guide panel 113' can be made of a material different from that of the frame 130'. The frame 130' may have a form that surrounds the first and the second guide panels 117' and 113'.

As shown in FIG. 36(*c*), in the display device 100' according to an embodiment of the present invention, the front cover 105' may not cover the front of the display panel 110'. That is, one end of the front cover 105' can be located on the side of the display panel 110'.

Figure 37:
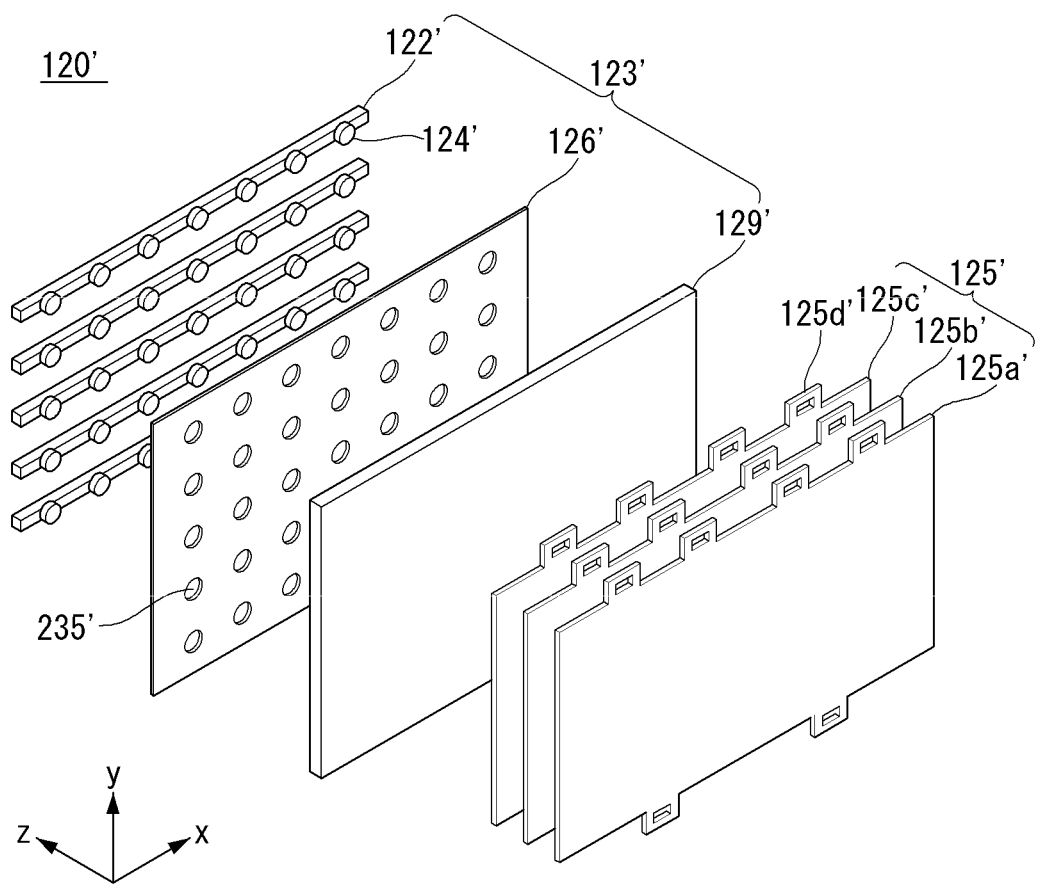
Figure 38:
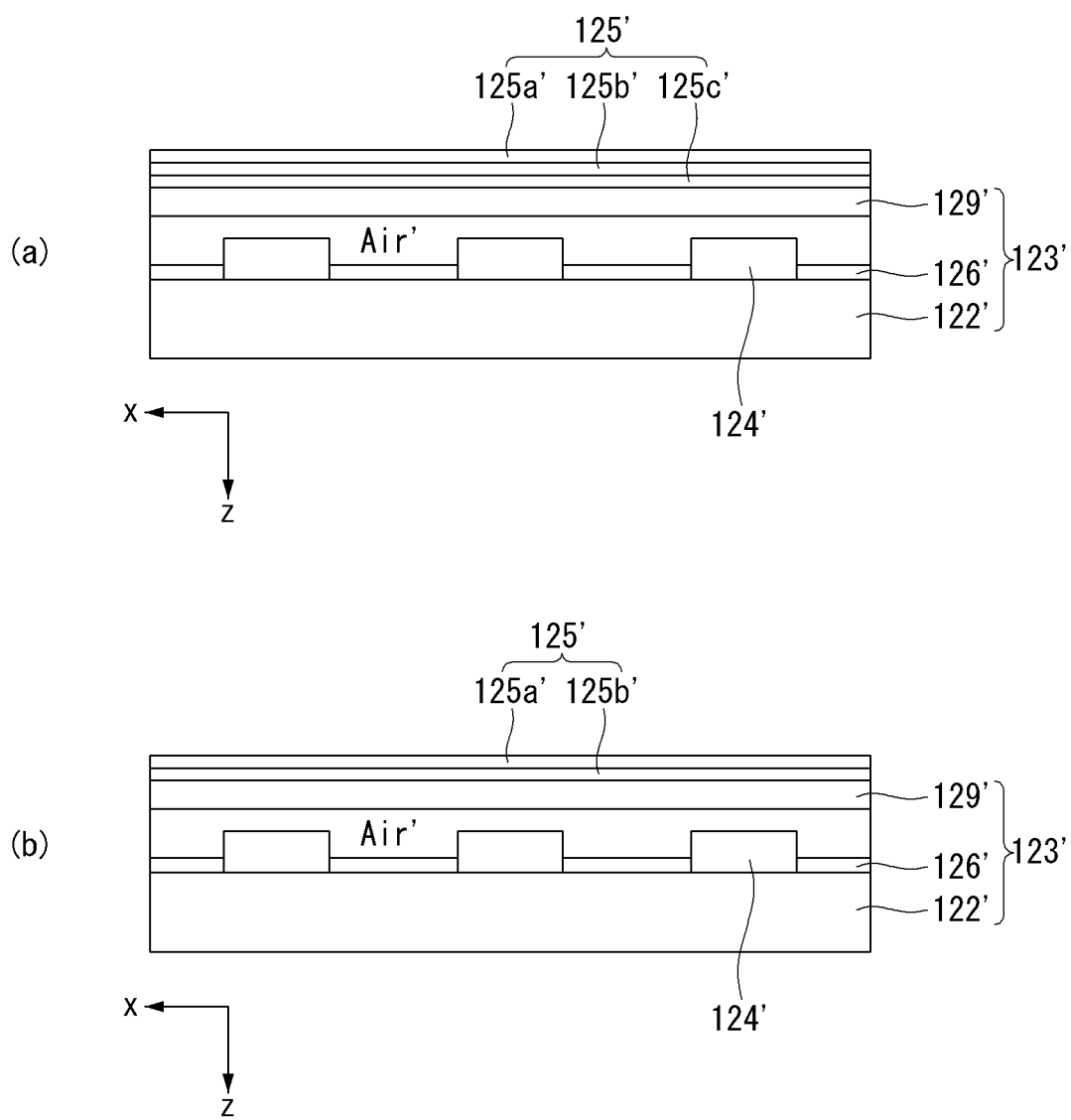

Referring to FIGS. 37 and 38, the backlight unit 120' may include a substrate 122', at least one optical assembly 124', the optical layer 123' including a reflection sheet 126' and a diffusion plate 129', and the optical sheet 125' located on the front side of the optical layer 123'. The substrate 122' may have a plurality of strip forms extended in the first direction and spaced apart from each other at a specific interval in the second direction orthogonal to the first direction.

At least one optical assembly 124' can be mounted on the substrate 122'. An electrode pattern for connecting an adapter and the optical assembly 124' can be formed on the substrate 122'. For example, a carbon nanotube pattern for connecting the optical assembly 124' and the adapter can be formed on the substrate 122'.

The substrate 122' can be made of at least one of polyethylene terephthalate (PET), glass, polycarbonate (PC), and silicon. The substrate 122' can be a printed circuit board (PCB) on which at least one optical assembly 124' is mounted.

The optical assembly 124' can be disposed on the substrate 122' at a specific interval in the first direction. The diameter of the optical assembly 124' can be greater than the width of the substrate 122'. That is, the diameter of the optical assembly 124' can be greater than the length of the substrate 122' in the second direction.

The optical assembly 124' can be a light-emitting diode (LED) chip or a light-emitting diode package including at least one LED chip. The optical assembly 124' may include a colored LED that emits at least one of red, blue, and green or a white LED. The colored LED may include at least one of a red LED, a blue LED, and a green LED.

The light source included in the optical assembly 124' can be a chip on board (COB) type. The COB type may have a form in which an LED chip, that is, a light source, has been directly coupled to the substrate 122'. Accordingly, the process can be simplified. Furthermore, resistance can be lowered, thereby being capable of reducing energy lost due to heat. That is, power efficiency of the optical assembly 124' can be improved. The COB type can provide brighter lighting. The COB type can be implemented thin and light compared to a related art technology.

The reflection sheet 126' can be located on the front side of the substrate 122'. The reflection sheet 126' can be located on an area other than the area in which the optical assembly 124' of the substrate 122' has been formed. That is, a plurality of through holes 235' can be formed in the reflection sheet 126'.

The reflection sheet 126' reflects light, emitted from the optical assembly 124', toward the front side. Furthermore, the reflection sheet 126' can reflect light, reflected by the diffusion plate 129', again. The reflection sheet 126' includes at least one of metal and metal oxide, that is, reflection materials. For example, the reflection sheet 126' may include metal and/or metal oxide having high reflectance, such as at least one of aluminum (Al), silver (Ag), gold (Au), and titanium dioxide (TiO2).

The reflection sheet 126' can be formed by depositing and/or coating metal or metal oxide on the substrate 122'. Ink including a metallic material can be printed on the reflection sheet 126'. A deposition layer using a vacuum deposition method, such as a thermal deposition method, an evaporation method or a sputtering method, can be formed in the reflection sheet 126'. A coating layer and/or a print layer using a printing method, a gravure coating method or a silk screen method can be formed in the reflection sheet 126'.

An air gap can be located between the reflection sheet 126' and the diffusion plate 129'. The air gap can function as a buffer capable of widely spreading light emitted from the optical assembly 124'. Resin can be deposited on the optical assembly 124' and/or the reflection sheet 126'. The resin can function to spread light emitted from the optical assembly 124'.

The diffusion plate 129' spreads light emitted from the optical assembly 124' to the upper part. The optical sheet 125' can be located on the front side of the diffusion plate 129'. The backside of the optical sheet 125' may closely adhere to the diffusion plate 129', and the front surface of the optical sheet 125' may closely adhere to the backside of the display panel 110'.

The optical sheet 125' may include at least one sheet such as one or more prism sheets and/or one or more diffusion sheets. The plurality of sheets included in the optical sheet 125' can be in an adhesion and/or close adhesion state.

The optical sheet 125' may include a plurality of sheets having different functions. For example, the optical sheet 125' can include first to third optical sheets 125a' to 125c'. The first optical sheet 125a' can have a function of a diffusion sheet, and the second and the third optical sheets 125b' and 125c' can have a function of a prism sheet. The number and/or location of the diffusion sheet and the prism sheet can be changed. For example, the optical sheet 125' may include the first optical sheet 125a', that is, a diffusion sheet, and the second optical sheet 125b', that is, a prism sheet.

The diffusion sheet can make luminance of light more uniformly by preventing light emitted from the diffusion plate from being partially concentrated. The prism sheet can condense light emitted from the diffusion sheet so that the light is vertically incident on the display panel 110'. The coupling part 125d' can be formed in at least one of the edges of the optical sheet 125'. The coupling part 125d' can be formed in at least one of the first to the third optical sheets 125a' to 125c'.

The coupling part 125d' can be formed in an edge on the long-side side of the optical sheet 125'. The coupling part 125d' formed on the first long-side side and the coupling part 125d' formed on the second long-side side can be asymmetric. For example, the location and/or number of coupling parts 125d' on the first long-side side and the location and/or number of coupling parts 125d' on the second long-side side can be different.

Figure 39:
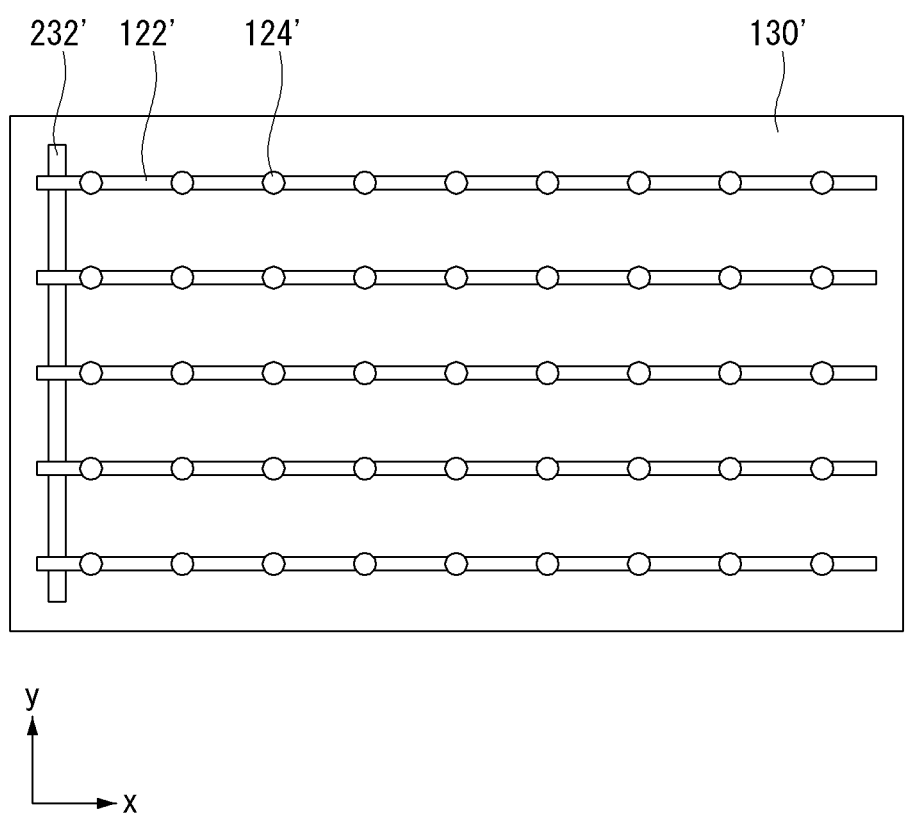

Referring to FIG. 39, the substrate 122', including a plurality of strips extended in the first direction and spaced apart from each other at a specific interval in the second direction orthogonal to the first direction, can be provided on the frame 130'. Ends on one side of the plurality of substrates 122' can be connected to a wiring electrode 232'.

The wiring electrode 232' can be extended in the second direction. The wiring electrode 232' can be connected to the ends on one side of the substrates 122' at a specific interval in the second direction. The substrate 122' can be electrically connected to an adapter through the wiring electrode 232'.

The optical assemblies 124' can be mounted on the substrate 122' at a specific interval in the first direction. The diameter of the optical assembly 124' can be greater than the width of the substrate 122' in the second direction. Accordingly, the outside area of the optical assembly 124' can be over an area in which the substrate 122' is not provided.

Figure 40:
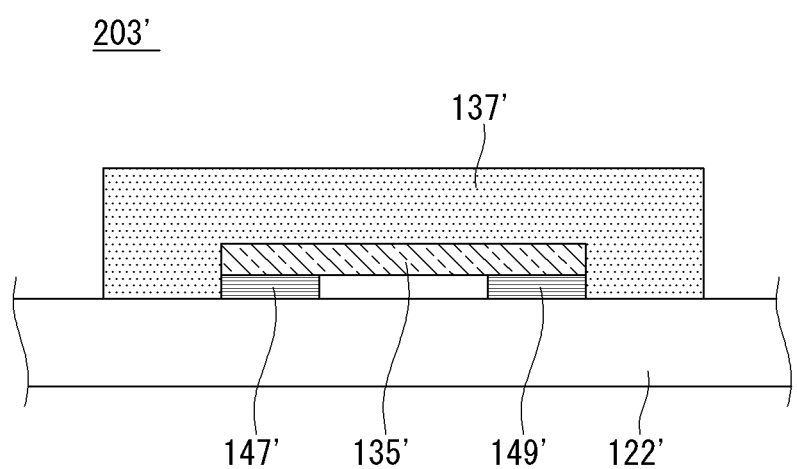
FIGS. 40 and 41 are diagrams showing a light source according to an embodiment of the present invention.
Figure 41:
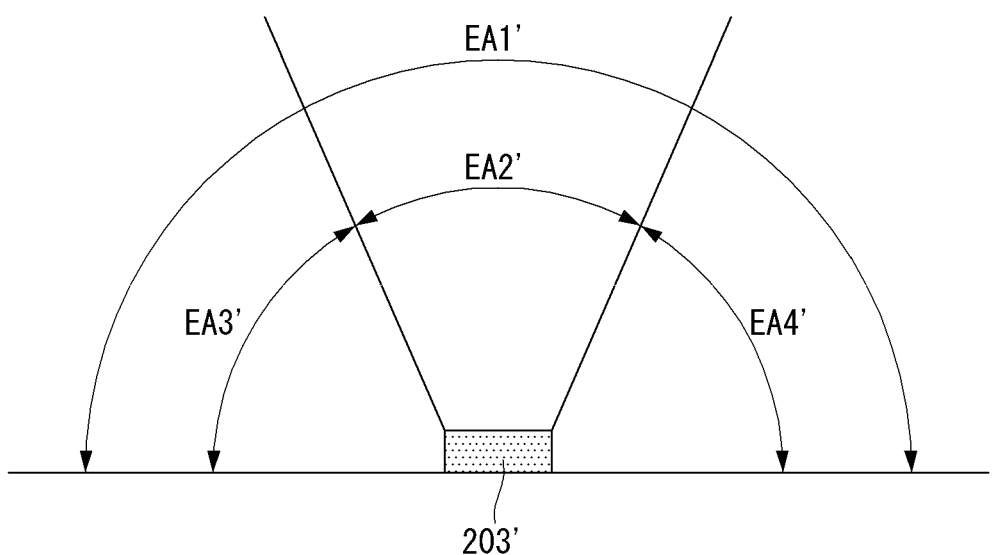

FIGS. 40 and 41 are diagrams showing a light source according to an embodiment of the present invention. As shown in FIG. 40, the light source 203' can be a COB type. The light source 203' of a COB type may include at least one of a light emission layer 135', first and second electrodes 147' and 149', and a fluorescent layer 137'.

The light emission layer 135' can be located the substrate 122' and can emit light of any one of blue, red, and green. The light emission layer 135' may include any one of Firpic, (CF3ppy)2Ir(pic), 9, 10-di 2-naphthyl)anthracene(AND), Perylene, distyrybiphenyl, PVK, OXD-7, and UGH-3(Blue) and a combination of them.

The first and the second electrodes 147' and 149' can be located on both sides of the bottom of the light emission layer 135'. The first and the second electrodes 147' and 149' can transfer an external driving signal to the light emission layer 135'. The fluorescent layer 137' can cover the light emission layer 135' and the first and the second electrodes 147' and 149'. The fluorescent layer 137' includes a fluorescent material that converts light of a spectrum, generated by the light emission layer 135', in white light. The light emission layer 135' may have a uniform thickness on the fluorescent layer 137'. The fluorescent layer 137' may have a refractive index of 1.4 to 2.0.

The light source 203' of a COB type according to an embodiment of the present invention can be directly mounted on the substrate 122'. Accordingly, the size of the optical assembly 124' can be reduced. The light source 203' can be driven with a high current due to excellent radiation because it is located on the substrate 122'. Accordingly, the number of light sources 203' used to secure the same amount of light can be reduced. A wire bonding process is not required because the light source 203' is mounted on the substrate 122'. Accordingly, a cost can be reduced because the process is simplified.

As shown in FIG. 41, the emission of the light source 203' according to an embodiment of the present invention can be performed in a first light emission area EA1'. That is, light emission can be performed in an area including a second light emission area EA2', that is, the front side, and third and fourth light emission areas EA3' and EA4', that is, the sides. Such a point is different from a point that a related art light source including the POB type emits light in the second light emission area EA2'. That is, the light source 203' according to an embodiment of the present invention can emit light in a wide range including the sides of the light source 203'.

Figure 42:
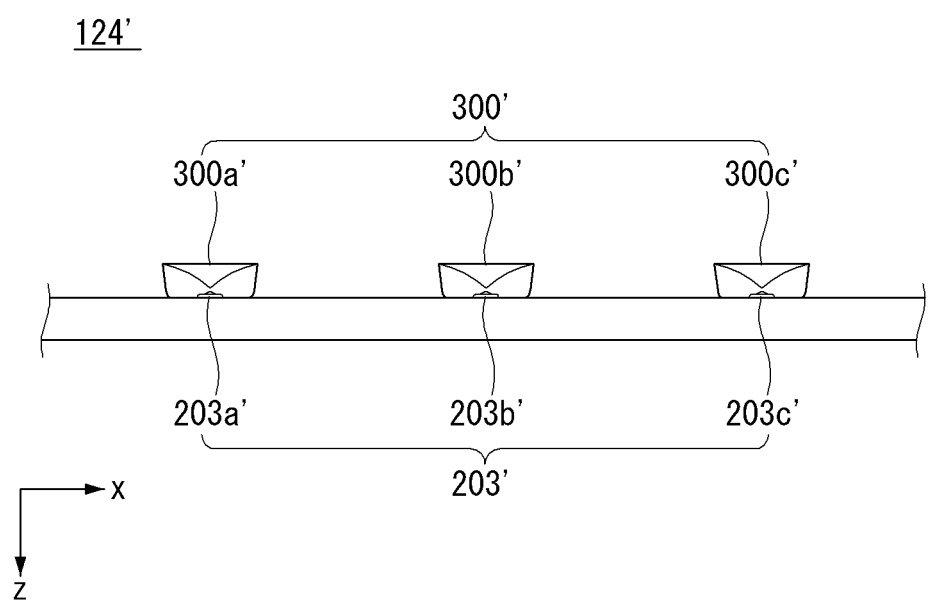
FIG. 42 is a diagram showing an optical assembly including the light sources of FIG. 41.

FIG. 42 is a diagram showing an optical assembly including the light sources of FIG. 41. As shown in FIG. 42, according to an embodiment of the present invention, a plurality of the optical assemblies 124' can be spaced apart from each other and disposed along the substrate 122'. The optical assembly 124' includes a light source 203' and a lens 300' located on one side of the light source 203'.

The light source 203' may include various sources that emit light. For example, the light source 203' can be an LED of a COB type, such as that described above. The lens 300' can be located on the light source 203'. At least some area of the light source 203' overlaps the lens 300'. For example, the light source 203' can be inserted into a groove within the lens 300'. Alternatively, an area that belongs to the light source 203' and from which light is substantially emitted can be inserted into the lower part of the lens 300'. For example, if a leg structure is present in the lens 300', part of the upper side of the light source 203' can be inserted into the lower side of the lens 300'.

The lens 300' may have a form in which some of light emitted from the light source 203' is reflected and some of the light is refracted. For example, the lens 300' can be a reflection/refraction type lens or a reflection type lens. Light from the light source 203' can be uniformly spread in all directions by reflection in some areas of the lens 300' and/or refraction in some areas of the lens 300'.

The light source 203' inserted into the lens 300' can be closely adhered to the lens 300'. For example, the lens 300' and the light source 203' can be bonded together by adhesives. Each lens 300' may correspond to each light source 203'. For example, first to third lenses 300a' to 300c' can be located over first to third light sources 203a' to 203c', respectively.

The lens 300' controls the path of light emitted from the light source 203'. That is, the lens 300' can prevent light from the light source 203' from being concentrated on a specific point. In other words, the lens 300' can uniformly diffuse light from the light source 203'. The lens 300' according to an embodiment of the present invention can effectively control the path of light from the light source 230' and effectively control side light of the light source 203'.

Figure 43:
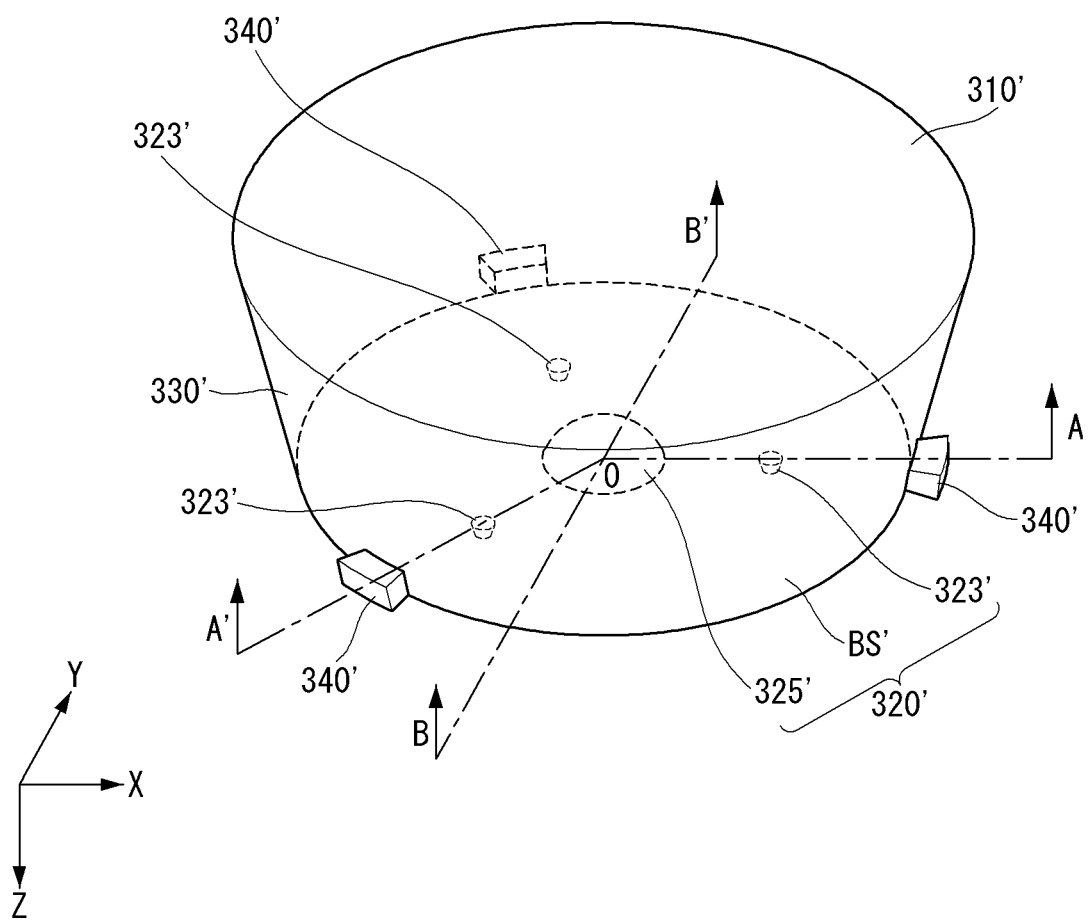
FIGS. 43 and 44 are diagrams showing a difference according to a lens forming an optical assembly.

FIG. 43 is a perspective view of a lens according to an embodiment of the present invention. The lens 300' according to an embodiment of the present invention includes a first surface 310', a second surface 320', a third surface 330', and a lens extension part 340'. The lens 300' generally has a cylinder or truncated cone shape. The lens 300' according to an embodiment of the present invention, together with the light source 203', forms the optical assembly 124'. The lens 300' can form the backlight unit 120' along with the frame 130', the substrate 122', the reflection sheet 125', and the light source 203'. In addition, the lens 300' can form the display device 100' along with the frame 130', the substrate 122', the reflection sheet 125', the light source 203', and the display panel 110'.

The first surface 310' has a circular section shape. The first surface 310' forms the upper part of the lens 300'. The upper part of the lens 300' can be located in a negative Z-axis direction, as shown in FIG. 43. In FIG. 43, the XYZ coordinate system is the Cartesian coordinates and can be set in the left-handed direction. The first surface 310' can be substantially the same as or can be parallel to an XY plane.

The second surface 320' can be opposite the first surface 310' and can form the lower part of the lens 300'. The second surface 320' may have a circular section shape. The lower part of the lens 300' can be located in a positive Z-axis direction, as shown in FIG. 43. At least some of the second surface 320' forms a bottom BS' parallel to the first surface 310'. The bottom BS' can be substantially the same as or can be parallel to the XY plane.

A mounting part 323' connected to the substrate 122' can be formed in the second surface 320' and have a protrusion shape. The mounting part 323' can be directed toward the positive Z axis. A concave part 325' facing the light source 203' and having a shape convex with respect to the first surface 310' can be formed in the second surface 320'.

The third surface 330' may connect the first surface 310' and the second surface 320'. The third surface 330' can also be unfolded. That is, the third surface 330' can be unfolded on a plane using a segment, connecting one point coming into contact with the first surface 310' and one point coming into contact with the second surface 320', as a cutting-plane line.

The lens extension part 340' can be formed in some area of the third surface 330'. In addition, the lens extension part 340' extends toward the outer side in the radius direction of the second surface 320'. The lens extension part 340' and the third surface 330' can be formed to be integrated. Further, the lens extension part 340' can be formed as a segment in the direction parallel to the outer circumference of the second surface 320' and can closely attach the reflection sheet 125' to the frame 130'. When the lens extension part 340' is formed as a segment, the lens extension part 340' can be formed in accordance with the height of the reflection sheet 125' although the height of the reflection sheet 125' is changed in the direction parallel to the outer circumference. Accordingly, the lens extension part 340' can efficiently attach the reflection sheet 125' to the frame 130'.

Alternatively, a plurality of the lens extension parts 340' can be connected to one in the direction parallel to the outer circumference of the second surface 320', and thus have substantially the same shape as an annular shape. If the lens extension parts 340' are connected to one in the direction parallel to the outer circumference of the second surface 320', the lens extension part 340' can be isomorphic with a doughnut. From a standpoint of topology, the lens extension part 340' according to an embodiment of the present invention is isomorphic with a sphere. Thus, a plurality of the lens extension parts 340' can be provided.

The boundary of the lens extension part 340' and the third surface 330' can be virtually formed. The lens extension part 340' can effectively prevent the reflection sheet 126' from being lifted off. The number of pins that closely attach the reflection sheet 126' to the frame 130' can be reduced and overall process efficiency can be improved because the lens extension part 340' prevents the reflection sheet 126' from being lifted off from the frame 130'.

Figure 44:
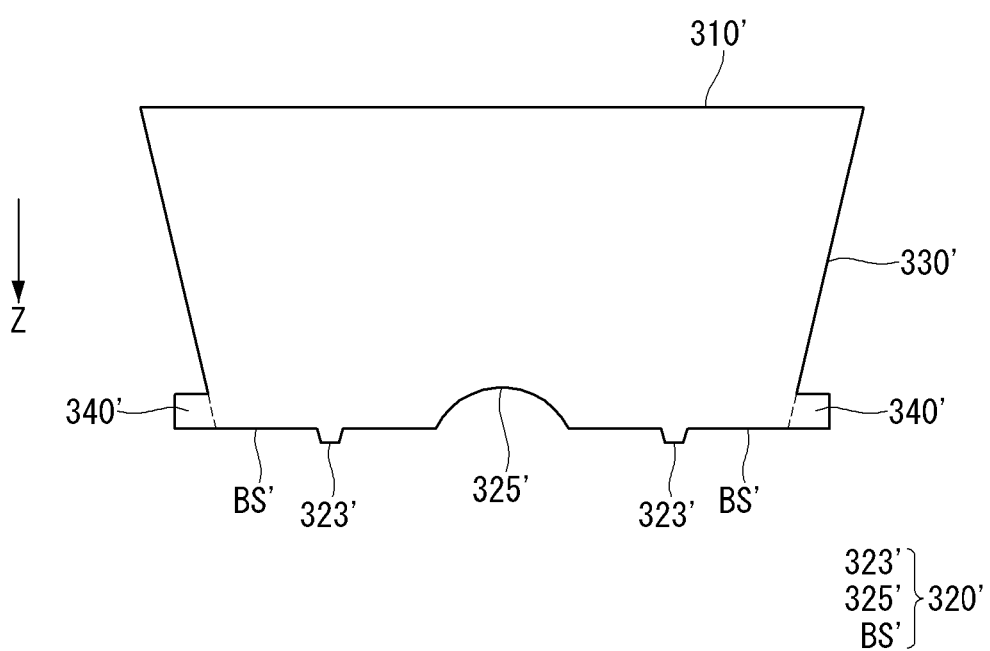

FIG. 44 is a diagram showing a cross section of FIG. 43 taken along line A-O-A'. As shown in FIG. 44, the bottom BS' can be substantially parallel to the first surface 310'. As shown in FIG. 44, the mounting part 323' can be formed in the second surface 320'. The mounting part 323' and the bottom BS' can be integrated and thus the mounting part 323', together with the bottom BS', may have a virtual boundary.

As shown in FIG. 44, the lens extension part 340' can be extended from the third surface 330'. The lens extension part 340', together with the third surface 330' forms a virtual boundary surface. In this instance, the virtual boundary surface of the third surface 330' and the lens extension part 340' is not an actually formed boundary surface, but can be present in a virtual or ideational viewpoint. A ray of light that passes through the concave part 325' and travels to the inside of the lens 300' may describe the boundary surface of the third surface 330' and the lens extension part 340'.

It can be assumed that a ray of light passing through the concave part 325' and traveling to the inside of the lens 300' has reached the boundary surface of the third surface 330' and the lens extension part 340'. If a boundary surface is actually present between the third surface 330' and the lens extension part 340', the path of a ray of light passing through the boundary surface can be bent at the boundary surface. In an embodiment of the present invention, however, the path of a ray of light passing through the boundary surface may not be bent at the boundary surface of the lens extension part 340' and the third surface 330' because the boundary surface is a virtual boundary surface.

Figure 45:
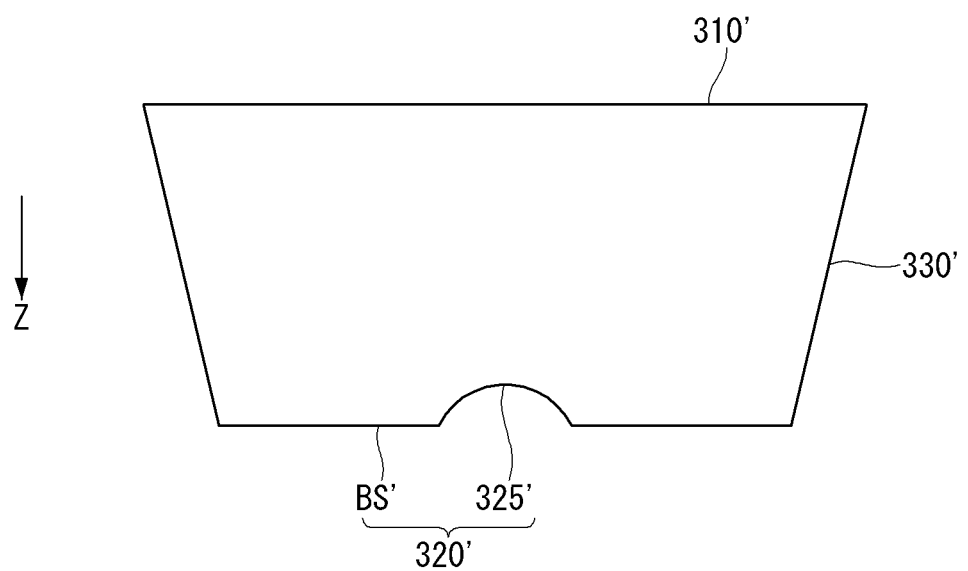
FIGS. 45 and 46 are diagrams showing a lens according to an embodiment of the present invention.

FIG. 45 is a diagram showing a cross section of FIG. 43 taken along line B-O-B'. As shown in FIG. 45, the lens 300' includes the first surface 310', the second surface 320', and the third surface 330'. The first surface 310' forms the upper part of the lens 300', and the second surface 320' forms the lower part of the lens 300'. The second surface 320' also includes the bottom BS' substantially parallel to the first surface 310' and the concave part 325'. The third surface 330' also connects the first surface 310' and the second surface 320'.

Figure 46:
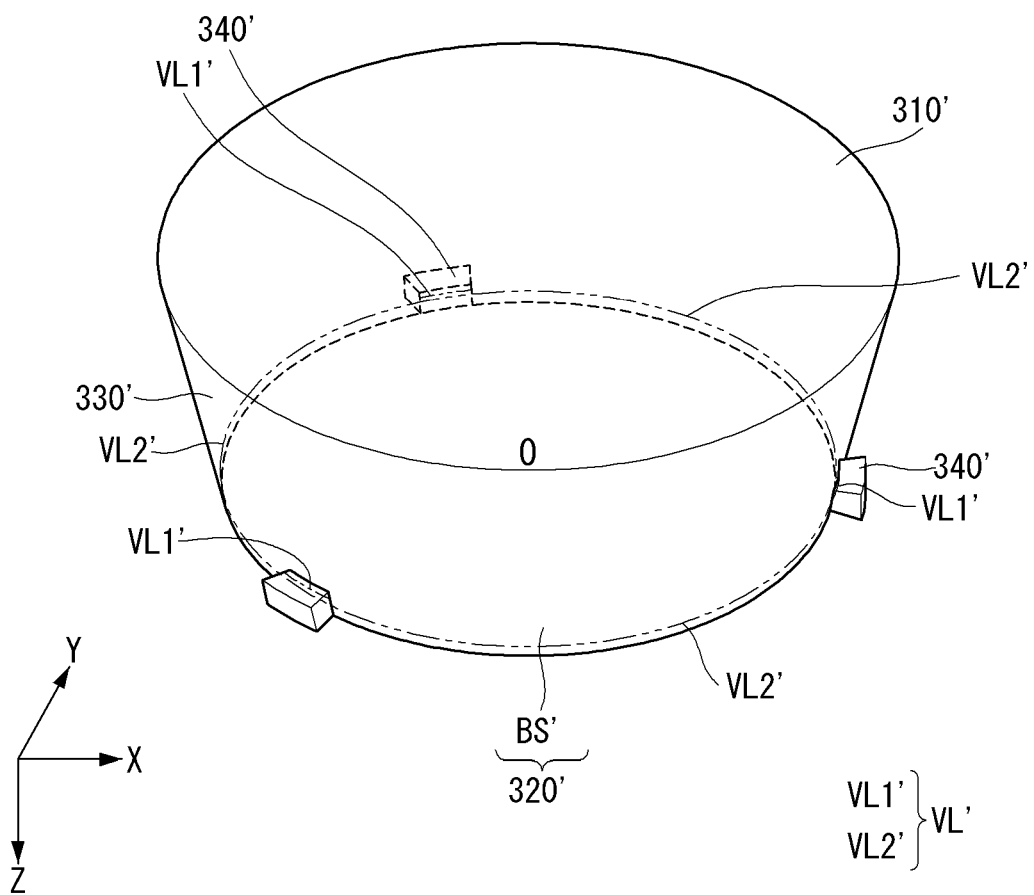

FIG. 46 is a diagram showing the lens in which the lens extension part has been disposed in accordance with an embodiment of the present invention. In FIG. 46, the mounting part, the concave part, etc. are omitted. In FIG. 46, a virtual line VL' is a virtual line located on the third surface 330' and is not a line actually indicated on the third surface 330'. The virtual line VL' is introduced to easily describe the deployment of the lens extension part 340'.

The virtual line VL' can maintain a specific interval at the boundary of the second surface 320' and the third surface 330'. That is, the virtual line VL' can be spaced apart from the bottom BS' at a specific interval. In other words, the virtual line VL' can be located on a single plane. The plane including the virtual line VL' can be substantially parallel to the bottom BS'. The virtual line VL' may include a first virtual line piece VL1' and a second virtual line piece VL2'.

The virtual line VL' according to an embodiment of the present invention has a configuration in which the first virtual line piece VL1' and the second virtual line piece VL2' are alternately disposed.

The first virtual line piece VL1' can be covered with the lens extension part 340'. If the lens extension part 340' has constant height from the bottom BS' or has an annular shape extended from the bottom BS', the virtual line VL' can be formed of a single first virtual line piece VL1'. The first virtual line piece VL1' can be located on the virtual boundary surface of the third surface 330' and the lens extension part 340'. Both ends of the first virtual line piece VL1' can be connected to the second virtual line pieces VL2', respectively. In FIG. 46, the first virtual line piece VL1' has been indicated by a chain-dashed line and has been indicated by a double line for convenience.

The second virtual line piece VL2' can be externally exposed. If the lens extension part 340' is not included in the lens 300', a specific virtual line VL' may include a single second virtual line piece VL2'. Both ends of the second virtual line piece VL2' can be connected to the first virtual line pieces VL1', respectively. That is, the second virtual line piece VL2' and the first virtual line piece VL1' can be alternately disposed. In FIG. 46, the second virtual line piece VL2' has been indicated by a two-dot chain line.

Figure 47:
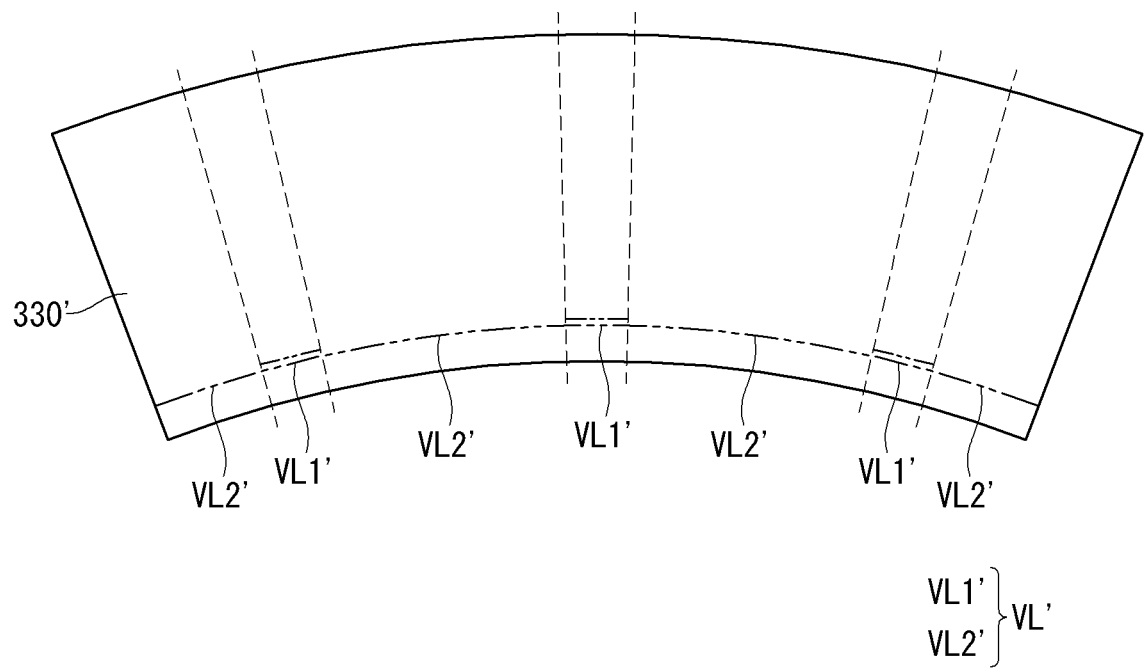
FIGS. 47 to 51 are diagrams showing the second region of the lens shown in FIG. 45.

FIG. 47 is an unfolded view of the third surface of FIG. 46. In FIG. 47, the leftmost second virtual line piece VL2' and the rightmost second virtual line piece VL2' can be the same and can be cut for unfolding. The virtual line VL' is placed on the third surface 330', and may include the first virtual line piece VL1' and the second virtual line piece VL2'. A single virtual line VL' can be formed as shown in FIG. 47. Alternatively, a plurality of the virtual lines VL' can be formed. For example, if a plurality of the lens extension parts 340' is formed and has different height from the bottom BS', a plurality of different virtual lines VL' can be formed.

As shown in FIG. 47, the first virtual line piece VL1' and the second virtual line piece VL2' can be alternately disposed. That is, the first virtual line piece VL1' and the second virtual line piece VL2' can be alternately disposed on the third surface 330'. Since the first virtual line piece VL1' is covered with the lens extension part 340', the lens extension part 340' can be located at the place where the first virtual line piece VL1' is located.

Figure 48:
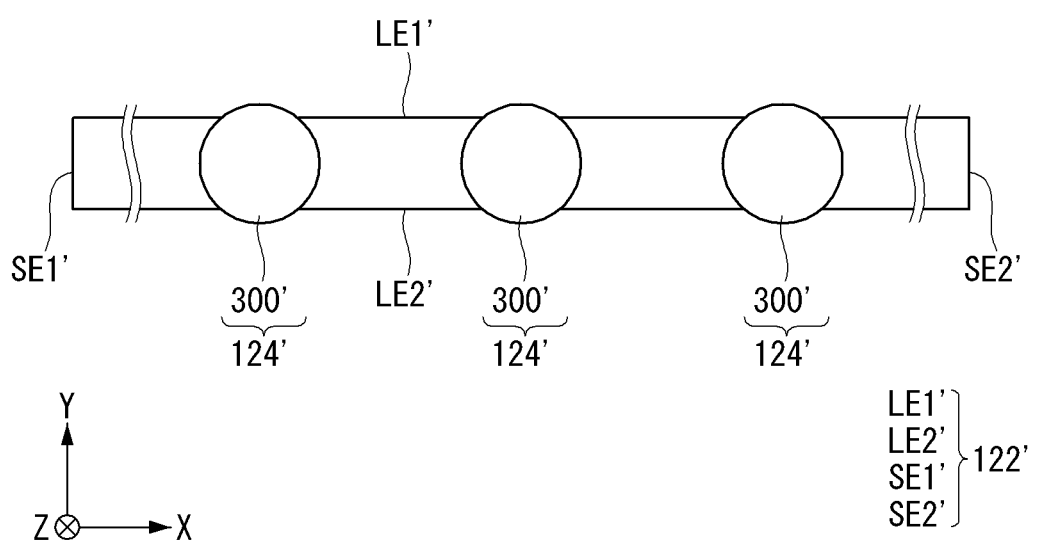

FIG. 48 is a diagram showing the substrate in which the optical assembly is disposed in accordance with an embodiment of the present invention. In particular, FIG. 48 is a diagram seen from the top of the optical assembly 124'. That is, the first surface 310' of the lens 300' is shown in FIG. 48.

The substrate 122' includes a first long side LE1', a second long side LE2', a first short side SE1', and a second short side SE2'. The first long side LE1' and the second long side LE2' are parallel to each other and can be the length direction of the substrate 122'. The first short side SE1' and the second short side SE2' connects the first long side LE1' and the second long side LE2'. The first long side LE1', the first short side SE1', the second long side LE2', and the second short side SE2' are sequentially connected, and form a quadrangle or rectangle.

The optical assembly 124' includes the lens 300' and the light source 203'. In FIG. 48, the light source 203' is not shown. The optical assembly 124' can be disposed on the substrate 122' in a direction parallel to the first long side LE1'. That is, the optical assembly 124' can be disposed on the substrate 122' in a direction parallel to the second long side LE2'. In other words, the optical assembly 124' can be disposed on the substrate 122' in the length direction of the substrate 122'. In FIG. 48, the length direction of the substrate 122' is the X-axis direction.

The lens 300' included in the optical assembly 124' includes the lens extension part 340'. As shown in FIG. 48, the diameter of the lens 300' can be greater than the width of the substrate 122'. In other words, at least one of the diameter of the first surface 310' of the lens 300' and the diameter of the second surface 320' can be greater than the width of the substrate 122'.

Figure 49:
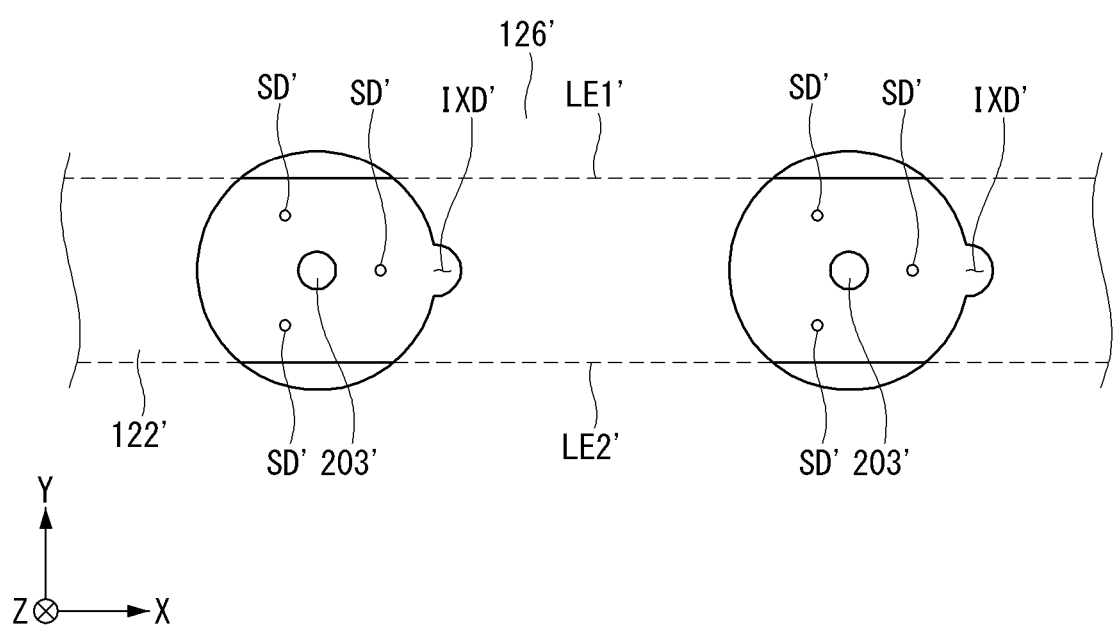

FIG. 49 is a diagram showing the deployment of the reflection sheet and the substrate according to an embodiment of the present invention. The reflection sheet 126' covers part of the substrate 122'. The light source 203' can be disposed in an area that belongs to the substrate 122' and that is not covered with the reflection sheet 126'. Furthermore, a substrate groove SD' can be located in an area that belongs to the substrate 122' and that is not covered with the reflection sheet 126'. The substrate 122' covered with the reflection sheet 126' is indicated by a dotted line in FIG. 49. In FIG. 49, the length direction of the substrate 122' can be the X axis.

The light source 203' can be connected to the substrate 122' and supplied with power to generate light. The substrate groove SD' can be formed in the substrate 122' and be connected to the mounting part 323' of the lens 300'. The substrate groove SD' can be disposed in the substrate 122' in accordance with the location of the mounting part 323'. Since the substrate groove SD' is formed, the lens 300' can be easily mounted on the substrate 122'.

The reflection sheet 126' covers the substrate 122' other than an area on which the lens 300' will be mounted. An area that belongs to the area of the reflection sheet 126' and that corresponds to a shape of the lens 300' mounted on the substrate 122' may not include the reflection sheet 126'. In other words, an area that belongs to the area of the reflection sheet 126' and that corresponds to a shape of the lens 300' mounted on the substrate 122' may not be included in the entire area of the reflection sheet 126'.

An indication groove IXD' can be formed in addition to the area that belongs to the area of the reflection sheet 126' and that corresponds to a shape of the lens 300' mounted on the substrate 122'. The indication groove IXD' can be formed to abut on the area that belongs to the area of the reflection sheet 126' and that corresponds to a shape of the lens 300' mounted on the substrate 122'. The indication groove IXD' may indicate the direction in which the lens 300' is mounted when the lens 300' is mounted on the substrate 122'.

Figure 50:
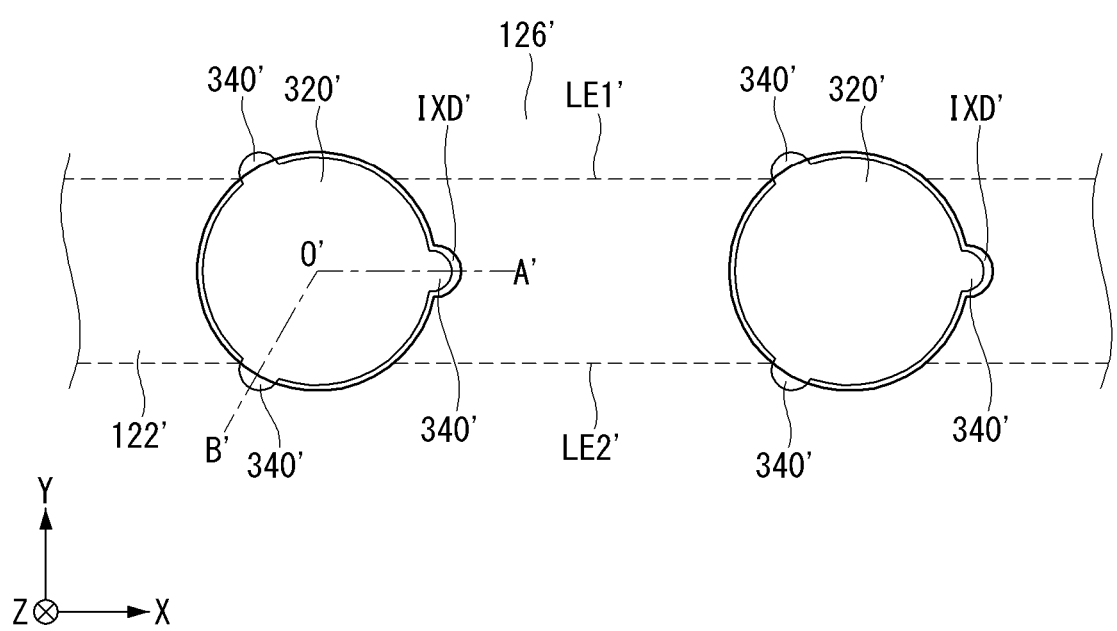

FIG. 50 is a diagram showing the state in which the lens has been mounted on the substrate of FIG. 49. In FIG. 50, the first long side LE1' is the X-axis direction. In FIG. 50, the first surface 310' and the third surface 330' have been omitted from the lens 300'. That is, FIG. 50 shows the state in which the lens 300' has been mounted on the substrate 122' covered with the reflection sheet 126'. A shape of the lens 300' mounted on the substrate 122' can be effectively expressed using the second surface 320' and the lens extension part 340'.

The lens 300' can be mounted on the substrate 122' and include a plurality of the lens extension parts 340'. As shown in FIG. 50, one of the plurality of lens extension parts 340' can be located in accordance with the indication groove IXD' formed in the reflection sheet 126'. Since at least one of the lens extension parts 340' is located in accordance with the indication groove IXD' formed in the reflection sheet 126', the mounting part 323' formed in the lens 300' can be located in accordance with the substrate groove SD' formed in the substrate 122'. That is, the lens 300' can be easily mounted on the substrate 122' because at least one of the lens extension parts 340' is located in accordance with the indication groove IXD' formed in the reflection sheet 126'.

As shown in FIG. 50, at least another of the plurality of lens extension parts 340' can be spaced apart from the space between the first long side LE1' and the second long side LE2'. If the lens extension part 340' is spaced apart from the space between the first long side LE1' and the second long side LE2' as described above, the lens extension part 340' can closely attach the reflection sheet 340' not overlapping the substrate 122' to the frame 130'. In this instance, the frame 130' can be the frame 130' of the display device 100' shown in FIG. 33.

Figure 51:
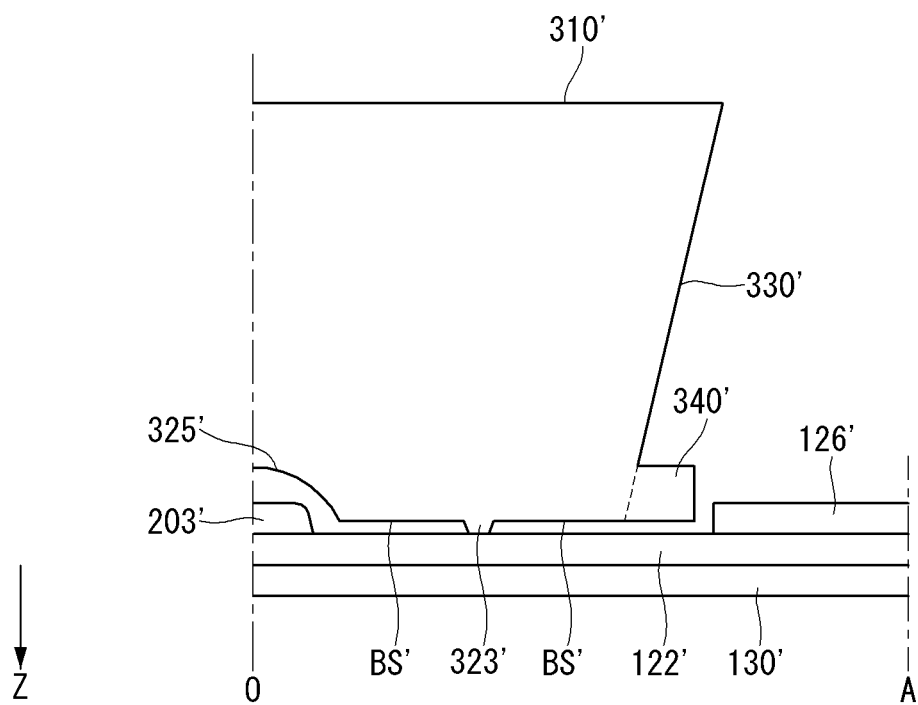

Next, FIG. 51 is a diagram showing a cross section of FIG. 50 taken along line O-A. That is, FIG. 51 may show a cross section of FIG. 50 taken from the light source 203' to the indication groove IXD'. For example, FIG. 51 may show the XZ plane in FIG. 50. The light source 203' can be disposed on the substrate 122'.

As shown in FIG. 51, the reflection sheet 126' can be located on the substrate 122'. In FIG. 51, the lens extension part 340' may not interact with the reflection sheet 126'. That is, the lens extension part 340' of FIG. 51 can indicate the orientation of the lens 300' disposed on the substrate 122'. In other words, the lens extension part 340' of FIG. 51 can correspond to the indication groove IXD' formed in the reflection sheet 126'.

Figure 52:
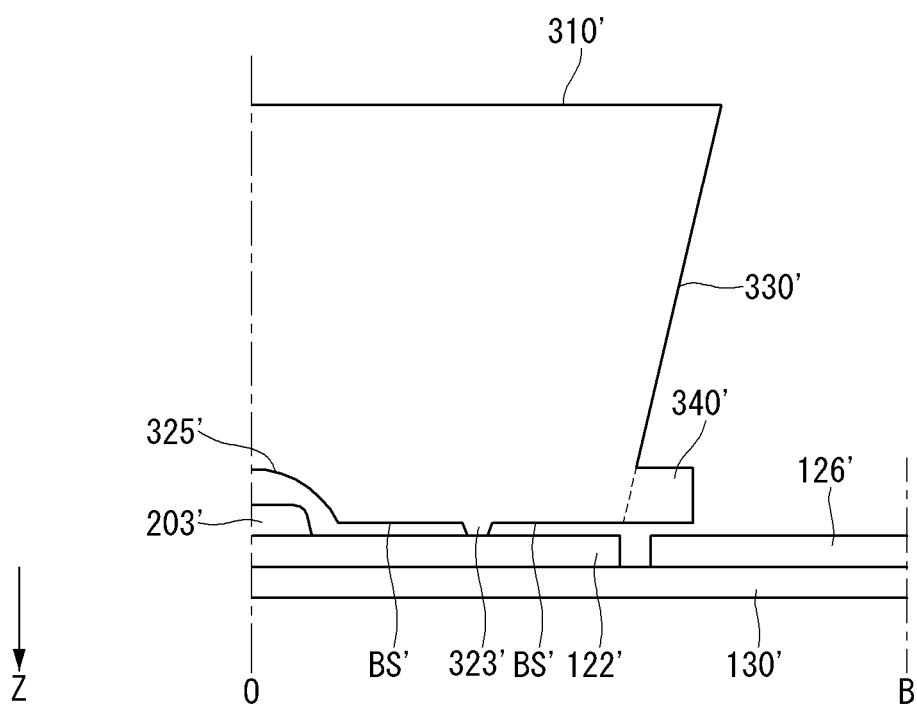
FIGS. 52 to 54 are diagrams showing the third surface of the lens shown in FIG. 45.

FIG. 52 is a diagram showing a cross section of FIG. 50 taken along line O-B. That is, FIG. 52 shows a cross section of FIG. 50 taken from the light source 203' to one lens extension part 340'. In this instance, the lens extension part 340' can be spaced apart from the space between the first long side LE1' and the second long side LE2'.

As shown in FIG. 52, the lens extension part 340' covers part of the reflection sheet 126'. That is, the lens extension part 340' can apply pressure in the Z-axis direction so that the reflection sheet 126' closely adheres to the frame 130'.

At least part of the reflection sheet 126' can be located over the frame 130'. That is, it is preferable to apply pressure to the reflection sheet 126' so that at least part of the reflection sheet 126' closely adheres to the frame 130'. A fixing pin can closely attach the reflection sheet 126' to the frame 130'. According to an embodiment of the present invention, the lens extension part 340' according to an embodiment of the present invention can perform the same function as the fixing pin because at least part of the reflection sheet 126' is located between the lens extension part 340' and the frame 130'. Process efficiency can be improved because the reflection sheet 126' can be substantially fixed at the same time by mounting the lens 300' on the substrate 122'.

Figure 53:
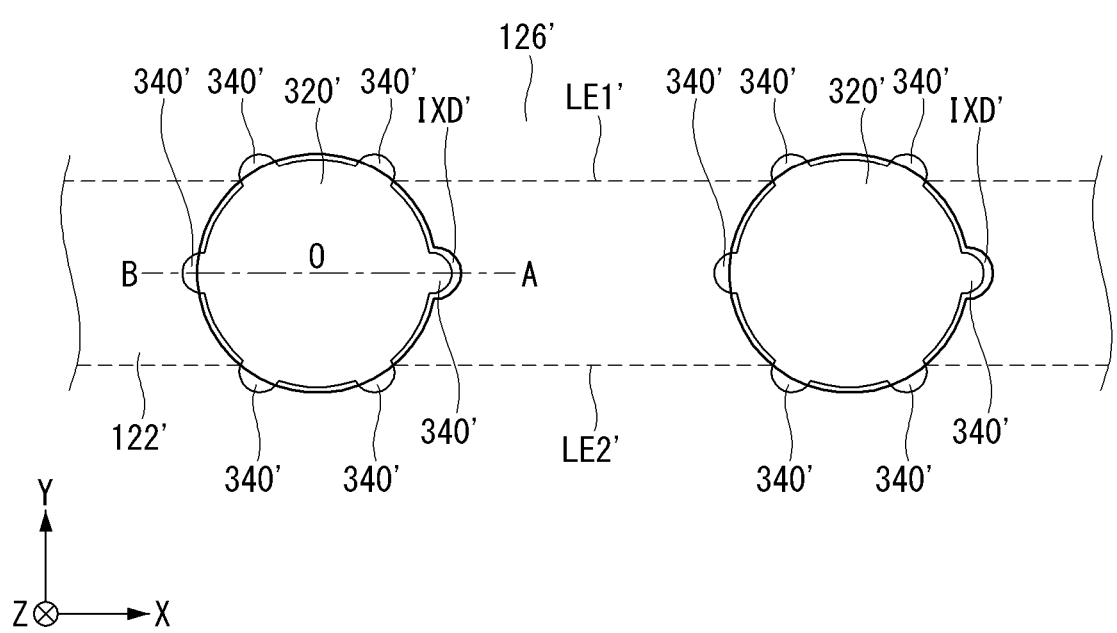

FIG. 53 is a diagram showing another embodiment in which the lens has been mounted on the substrate of FIG. 49. As shown in FIG. 53, according to an embodiment of the present invention, six lens extension parts 340' can be provided. One of the six lens extension parts 340' can be disposed to correspond to the indication groove IXD' formed in the reflection sheet 126'.

A lens extension part 340' that overlaps the substrate 122' other than the lens extension part 340' corresponding to the indication groove IXD' can be present. That is, unlike in the embodiment of FIG. 50, in the embodiment of the present invention shown in FIG. 53, an area in which the substrate 122' and the reflection sheet 126' and the lens extension part 340' overlap can be present.

Figure 54:
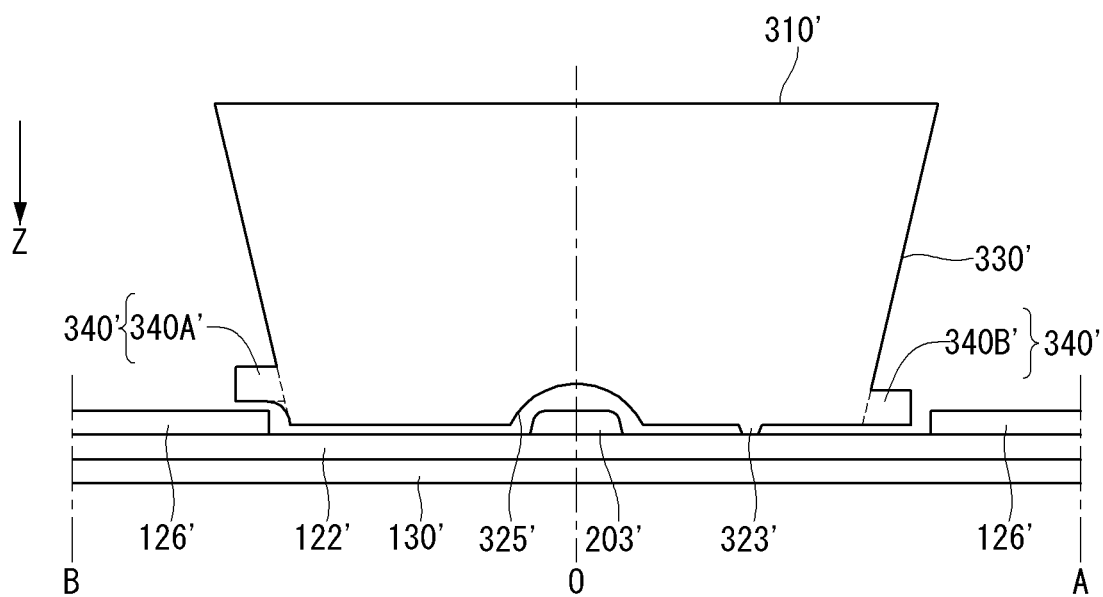

FIG. 54 is a diagram showing a cross section of FIG. 53 taken along line B-O-A. A cross section area taken along line O-A can be substantially the same as FIG. 51. A cross section area taken along line O-B can be different from FIG. 52. That is, the lens extension part 340' may overlap the reflection sheet 126' on the substrate 122'. In other words, the lens extension part 340' may apply pressure to the reflection sheet 126' on the substrate 122'. In this instance, the lens extension part 340' can closely attach the reflection sheet 126' to the frame 130'.

The location of a lens extension part 340A' on the left side of FIG. 54 can be different from that of a lens extension part 340B' on the right side of FIG. 54. That is, the lens extension part 340A' on the left side of FIG. 54 can be located in a negative Z-axis direction compared to the lens extension part 340B' on the right side of FIG. 54. In other words, the lens extension part 340A' on the left side of FIG. 54 can be located on the upper part compared to the lens extension part 340B' on the right side of FIG. 54.

Figure 55:
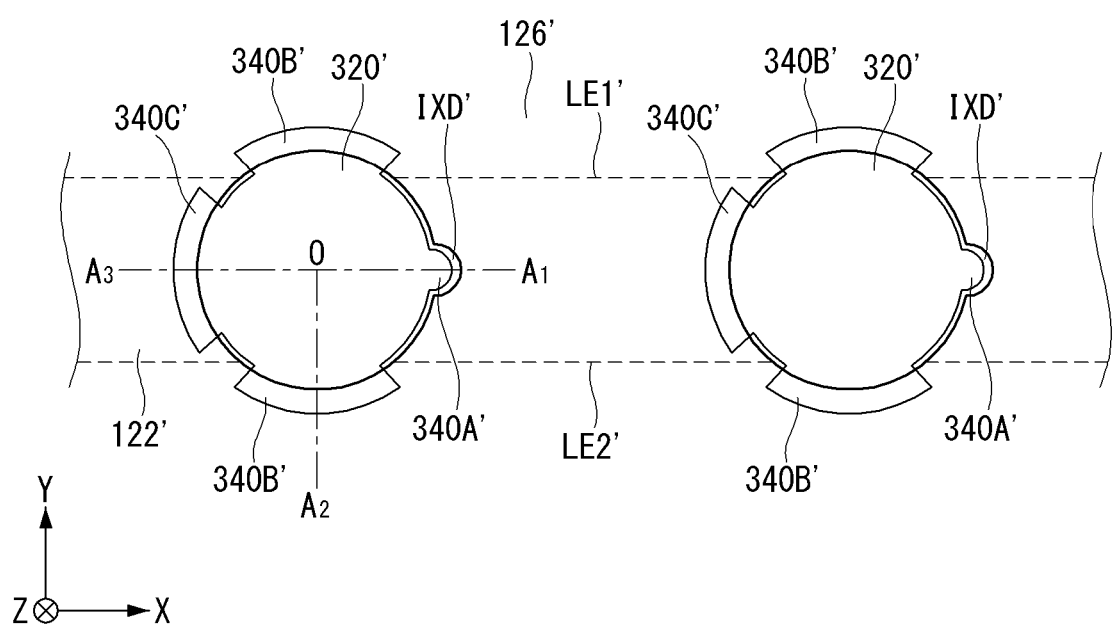
FIGS. 55 and 56 are diagrams showing the first region of the lens shown in FIG. 45.

FIG. 55 is a diagram showing yet another embodiment in which the lens has been mounted on the substrate of FIG. 49. As shown in FIG. 55, according to an embodiment of the present invention, four lens extension parts 340' can be provided. One of the four lens extension parts 340' can be disposed to correspond to the indication groove IXD' formed in the reflection sheet 126'.

The length of the lens extension part 340' according to the outer circumference of the lens 300' can be greater than the length of the lens extension part 340' in a direction vertical to the outer circumference of the lens 300'. That is, the lens extension part 340' may have a blade shape in addition to a protruded shape. In other words, the degree to which the lens extension part 340' surrounds the lens 300' can be greater than the degree to which the lens extension part 340' is protruded. In this instance, the reflection sheet 126' can be closely attached to the frame more stably. Furthermore, side light generated by the light source can be effectively controlled.

Figure 56:
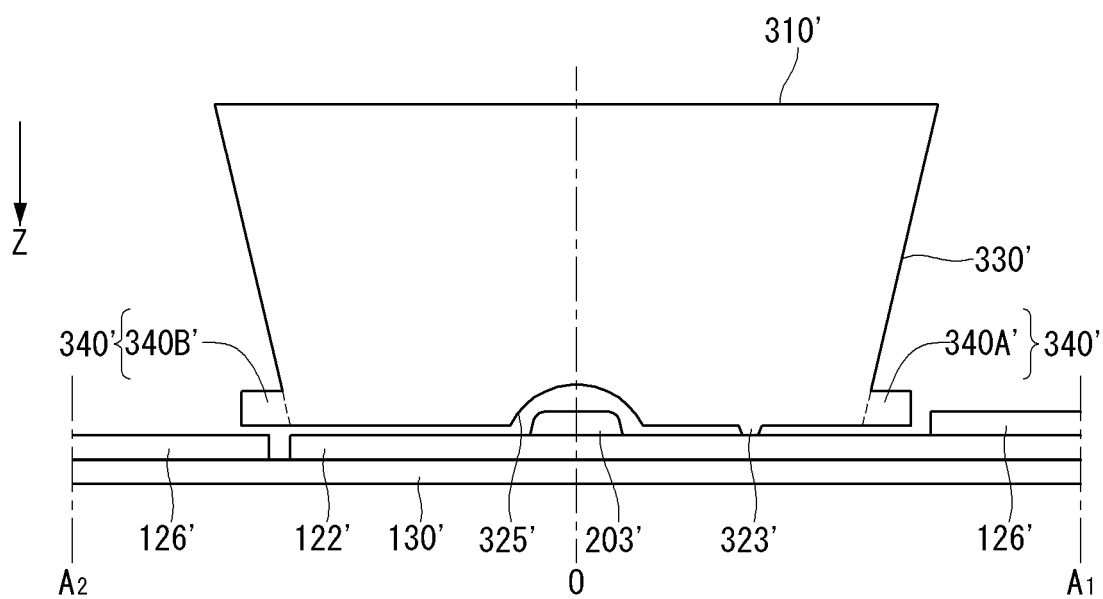

FIG. 56 is a diagram showing a cross section of FIG. 55 taken along line A2-O-A1. A lens extension part 340A' on the right side of FIG. 56 can be located on the same position as a lens extension part 340B' on the left side of FIG. 56 in the Z axis. That is, both the lens extension parts 340A' and 340B' can be located at the same height.

The lens extension part 340B' on the left side of FIG. 56 can closely attach the reflection sheet 126' to the frame 130'. The lens extension part 340A' on the right side of FIG. 56 can be located in the indication groove IXD' formed in the reflection sheet 126', and thus may not closely attach the reflection sheet 126' to the frame 130'.

Figure 57:
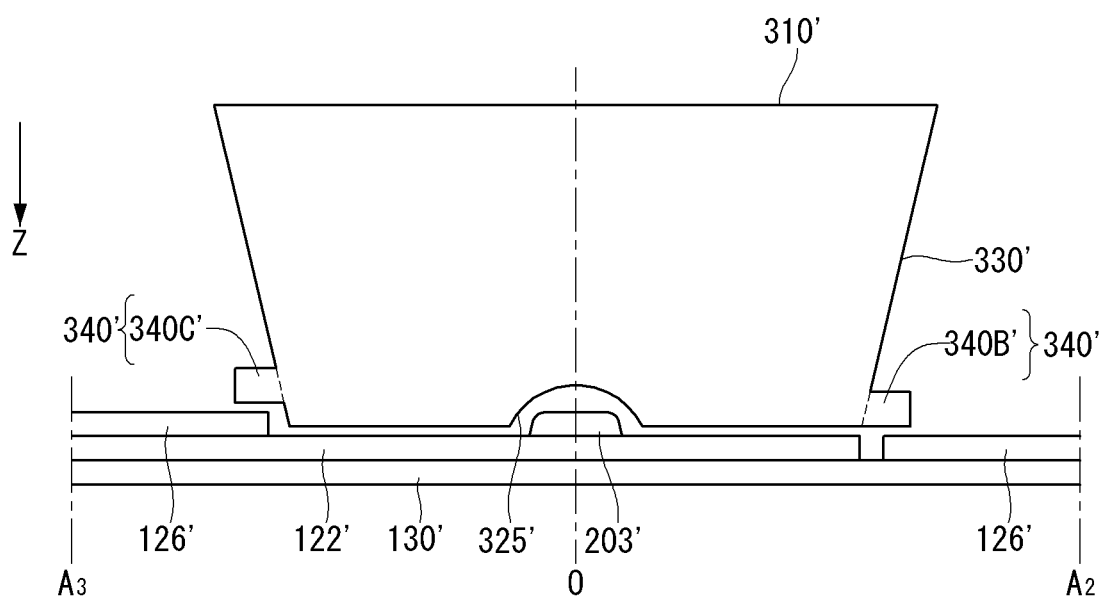
FIG. 57 is a diagram showing an example of an optical path according to the lens of FIG. 45.

FIG. 57 is a diagram showing a cross section of FIG. 55 taken along line A3-O-A2. The lens extension part 340B' on the right of FIG. 57 can be disposed at a lower location than a lens extension part 340C' on the left side of FIG. 57 in the Z axis. That is, both the lens extension parts 340C' and 340B' can be located at different heights.

The lens extension part 340C' on the left side of FIG. 57 can closely attach the reflection sheet 126' to the substrate 122'. That is, the lens extension part 340C' on the left side of FIG. 57 can closely attach the reflection sheet 126' to the frame 130'. The lens extension part 340C' on the left side of FIG. 57 can be disposed at a higher location than the lens extension part 340B' on the right side of FIG. 57 in the Z axis because it closely attaches the reflection sheet 126' to the substrate 122'. The lens extension part 340B' on the right side of FIG. 57 can closely attach the reflection sheet 126' to the frame 130'.

The lens extension part 340C' on the left side of FIG. 57 can be disposed at a higher location than the bottom BS'.

Accordingly, there may be a problem in that side light generated by the light source 203' travels toward A3. If side light generated by the light source 203' travels toward A3, it may travel to the outside through the third surface 330'. The externally traveled side light meets the reflection sheet 126' and can be reflected or scattered again.

Figure 58:
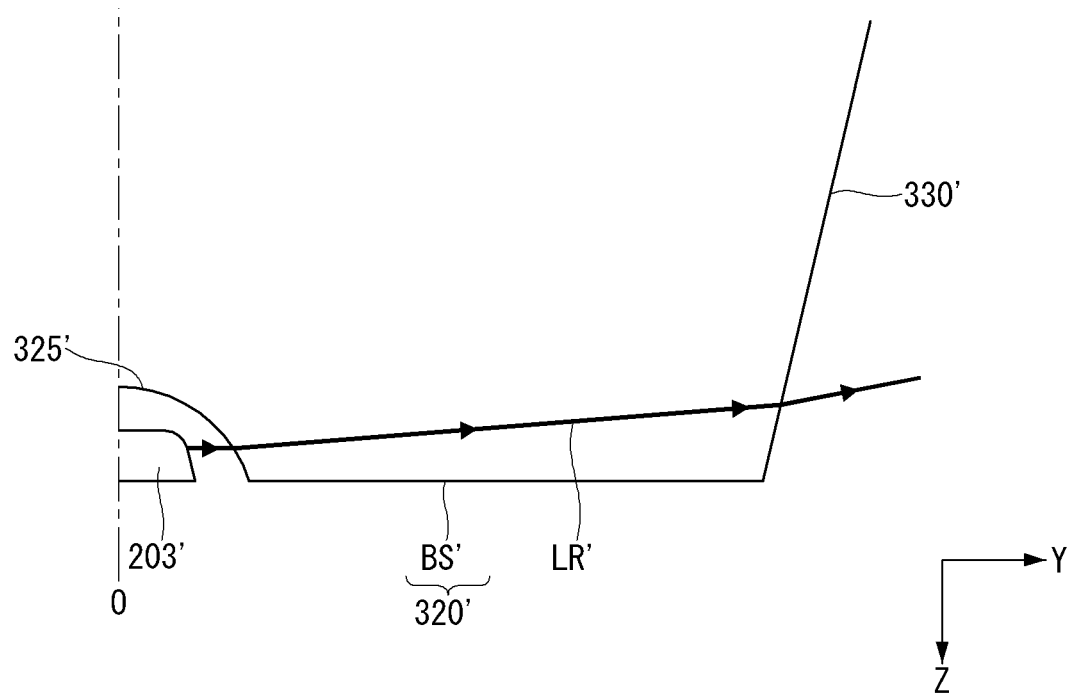
FIGS. 58 to 63 are diagrams showing a lens according to other embodiments of the present invention.

FIG. 58 is a diagram showing the path of a ray of light that passes through the lens in accordance with an embodiment of the present invention. In particular, FIG. 58 shows when the ray of light starting from the light source 203' enters the concave part 325', travels to the inside of the lens 300', and passes through the third surface 330' in which the lens extension part 340' has not been formed.

The ray of light of FIG. 58 shows a ray of light adjacent to the bottom BS', that is, the lower part of the lens 300'. In this instance, the ray of light adjacent to the bottom BS' can be said to be side light LR'. Side light can become a factor to deteriorate quality of a display device. Accordingly, there is a need for a scheme for effectively suppressing such side light. The lens extension part 340' according to an embodiment of the present invention can become a scheme for effectively changing the path of side light.

Figure 59:
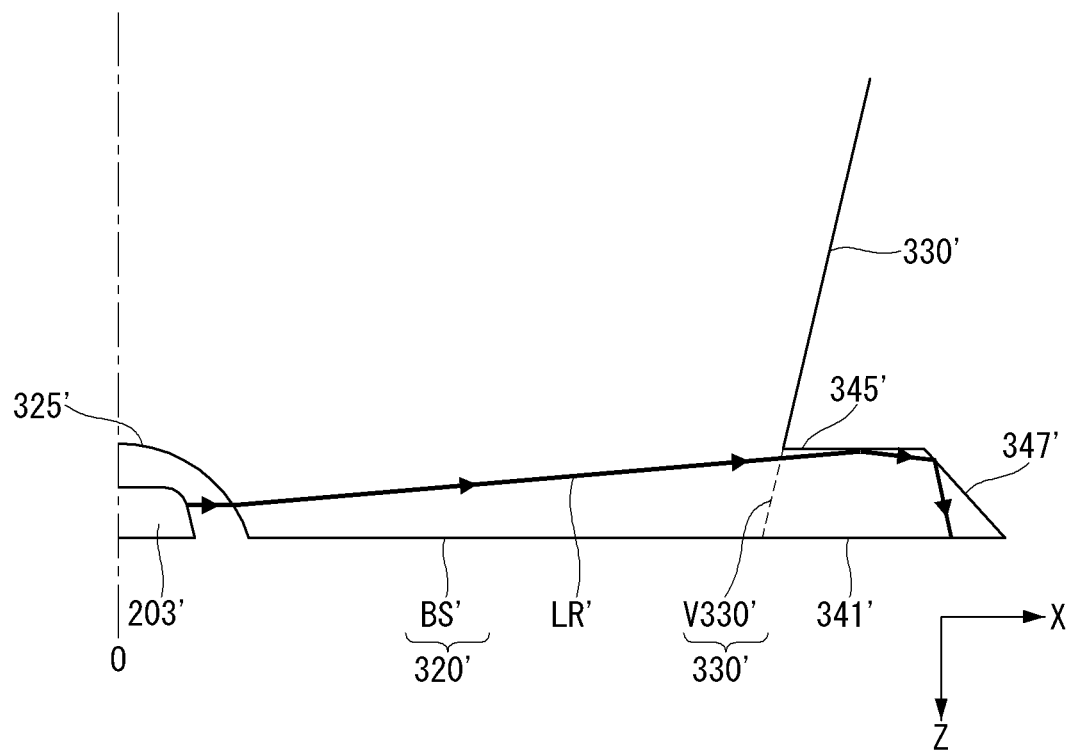

FIG. 59 is a diagram showing the path along which a ray of light passing through the lens travels in accordance with an embodiment of the present invention. In particular, FIG. 59 shows the state in which a ray of light starting from the light source 203' enters the concave part 325', travels to the inside of the lens 300', and passes through the third surface V330' in which the lens extension part 340' has been formed.

In FIG. 59, the third surface V330' having the lens extension part 340' formed therein has been indicated by a dotted line. There is no change in a medium with respect to the third surface V330' having the lens extension part 340' formed therein because the third surface V330' having the lens extension part 340' formed therein is a virtual surface. Accordingly, a ray of light LR' that passes through the third surface V330' having the lens extension part 340' formed therein may enter the lens extension part 340' without any change.

As shown in FIG. 59, the lens extension part 340' may include an extended lower surface 341', an extended upper surface 345', and an extended side surface 347'. The extended lower surface 341' can be parallel to the bottom BS'. The extended lower surface 341' can be connected to the second surface 320'. That is, the extended lower surface 341' can be disposed at the same height as the second surface 320' or the bottom BS' in the Z axis.

The extended upper surface 345' may face the extended lower surface 341'. The extended upper surface 345' can be connected to the third surface 330'. The extended upper surface 345', together with the extended lower surface 341', may restrict the thickness (the Z axis) of the lens extension part 340'.

The extended side surface 347' connects the extended lower surface 341' and the extended upper surface 345'. The extended side surface 347' can be outward inclined from the boundary of the extended upper surface 345' and the extended side surface 347' to the second surface 320'. That is, as shown in FIG. 59, the extended side surface 347' may have a direction extended toward the X axis as it is directed toward the Z axis.

Side light LR' that has entered the lens extension part 340' may reach the extended upper surface 345'. The extended upper surface 345' can be substantially parallel to the bottom BS' or can be formed to have a small angle. Accordingly, an incident angle between the side light LR' that has reached the extended upper surface 345' and the extended upper surface 345' can be small. In this instance, the incident angle is an angle formed by a ray of light and the boundary of different media when the ray of light is incident on the media. The incident angle can be an angle formed by the normal line of the boundary and the ray of light.

That is, an angle at which the side light LR' is incident on the extended upper surface 345' can be smaller than an angle (hereinafter referred to as a "threshold angle") obtained by taking an arcsin function in a reciprocal number of the refractive index of the lens 300'. In this instance, the outside of the lens 300' is air, and the refractive index of air can be considered to be substantially the same as that of vacuum and can be 1. For example, if the lens 300' is made of glass, a threshold angle can be approximately 40 degrees. Accordingly, an angle at which the side light LR' is incident on the extended upper surface 345' can be greater than a threshold angle. That is, the side light LR' incident on the extended upper surface 345' can be subjected to total reflection by the extended upper surface 345'.

The side light LR' reflected by the extended upper surface 345' may travel to the extended side surface 347'. The extended side surface 347' may have a direction extended in the positive X axis and the positive Z axis. That is, the side light LR' that travels toward the extended side surface 347' may have a large incident angle to the extended side surface 347'.

Accordingly, the side light LR' traveling toward the extended side surface 347' can be subjected to total reflection by the extended side surface 347'. In other words, a geometric structure of the extended side surface 347' having the direction extended in the positive X axis and the positive Z axis may have an influence on the total reflection of the side light LR' toward the extended side surface 347'.

The side light LR' that enters the inside of the lens 300' through the concave part 325' travels adjacent to the bottom BS' before it reaches the extended upper surface 345'. Accordingly, the side light LR' that enters the inside of the lens 300' through the concave part 325' may have a larger portion in the speed of an X-axis component than in the speed of a Z-axis component. The side light LR' that enters the inside of the lens 300' through the concave part 325' can be continuously subjected to total reflection by the extended upper surface 345' and the extended side surface 347'.

The path of the side light LR' can be changed while the side light LR' is continuously reflected by the extended upper surface 345' and the extended side surface 347' as described above. The path along which the side light LR' travels has been chiefly the X-axis direction, but the path of the ray of light changed by continuous reflection can be chiefly the Z-axis direction. That is, the side light LR' may have substantially the same direction as light chiefly radiated by the lens 300' due to the structure of the extended side surface 347'.

Figure 60:
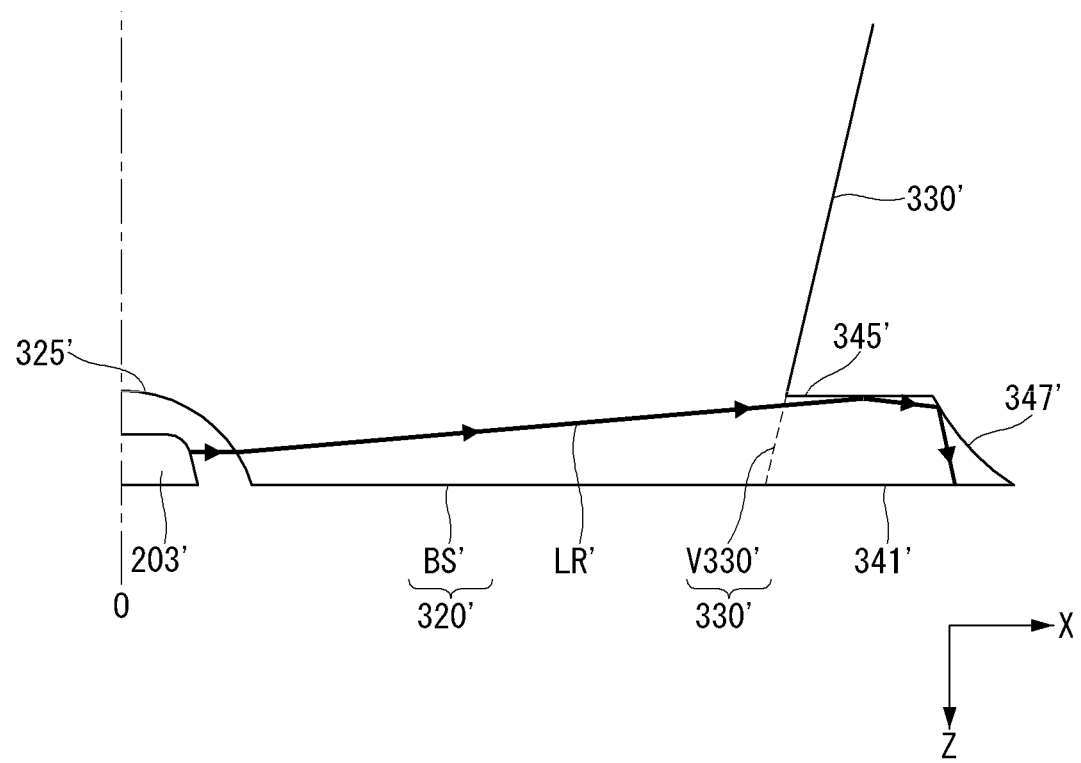

FIG. 60 is a diagram showing the path along which a ray of light passing through the lens travels in accordance with another embodiment of the present invention. FIG. 60 shows the state in which a ray of light starting from the light source 203' enters the concave part 325', travels to the inside of the lens 300', and passes through the third surface V330' having the lens extension part 340' formed therein.

In FIG. 60, the third surface V330' having the lens extension part 340' formed therein has been indicated by a dotted line. There is no change in a medium with respect to the third surface V330' having the lens extension part 340' formed therein because the third surface V330' having the lens extension part 340' formed therein is a virtual surface. Accordingly, a ray of light LR' that passes through the third surface V330' having the lens extension part 340' formed therein enters the lens extension part 340' without any change. Side light LR' that has entered the lens extension part 340' can be incident on the extended upper surface 345' and subjected to total reflection. The ray of light LR' reflected by the extended upper surface 345' may travel toward the extended side surface 347'.

The extended side surface 347' can be convex toward the second surface 320'. Since the extended side surface 347' has a shape convex toward the second surface 320', at least part of the ray of light LR' incident on the extended side surface 347' can be subjected to total reflection. That is, the major path of the side light LR' can become the Z axis due to the structure of the extended side surface 347'.

Figure 61:
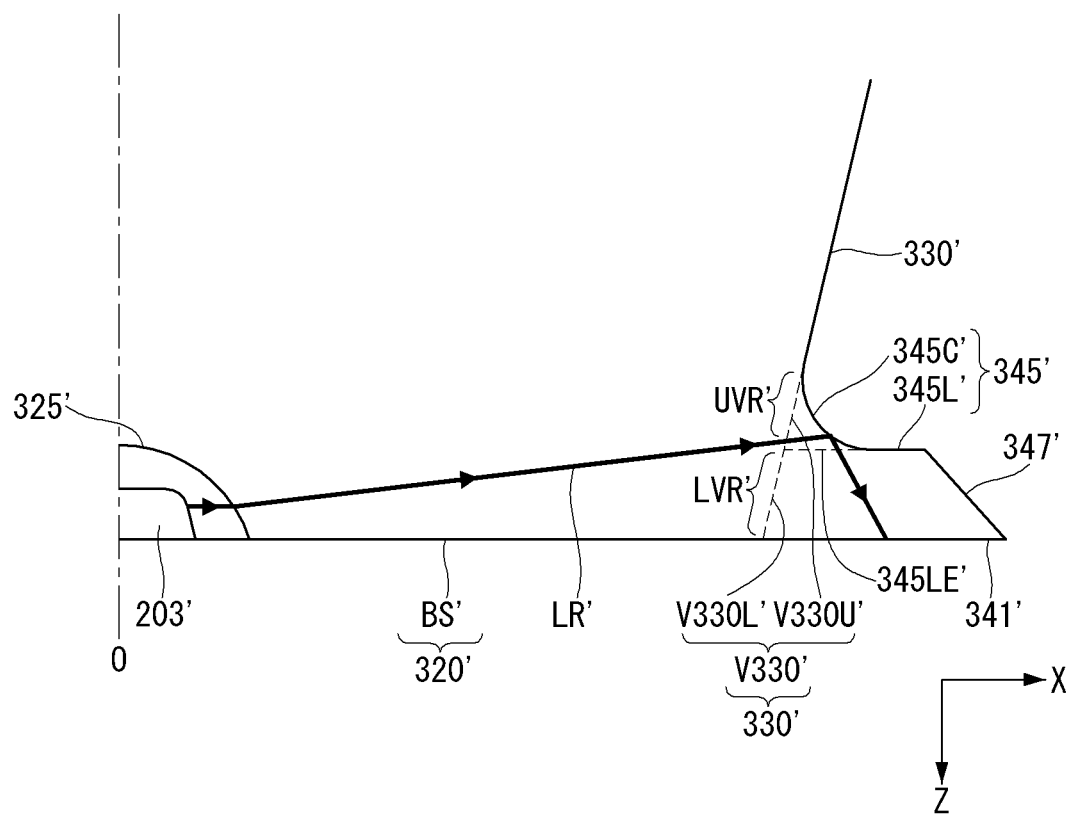

FIG. 61 is a diagram showing the path along which a ray of light passing through the lens travels in accordance with yet another embodiment of the present invention. FIG. 61 shows the state in which a ray of light starting from the light source 203' enters the concave part 325', travels to the inside of the lens 300', and passes through the third surface V330' having the lens extension part 340' formed therein.

In FIG. 61, the third surface V330' having the lens extension part 340' formed therein has been indicated by a dotted line. There is no change in a medium with respect to the third surface V330' having the lens extension part 340' formed therein because the third surface V330' having the lens extension part 340' formed therein is a virtual surface. Accordingly, a ray of light LR' that passes through the third surface V330' having the lens extension part 340' formed therein may enter the lens extension part 340' without any change.

The extended upper surface 345' may include the straight-line part 345L' of the extended upper surface and the curved-line part 345C' of the extended upper surface. The curved-line part 345C' of the extended upper surface can be convex toward the second surface 320'. The curved-line part 345C' of the extended upper surface connects the third surface 330' and the straight-line part 345L' of the extended upper surface. The third surface V330' having the lens extension part 340' formed therein can be divided into a part V330L' neighboring the second surface 320' and the remaining part V330U' by a virtual extension line 345LE' in which the straight-line part 345L' of the extended upper surface has been extended toward the third surface V330'.

The area of the third surface V330' having the lens extension part 340' formed therein is divided as follows. An area corresponding to the part V330L' neighboring the second surface 320' can be said to be 'LVR', and an area corresponding to the remaining part V330U' can be said to be 'UVR'.

If the curved-line part 345C' of the extended upper surface has not been formed, the range of the third surface V330' having the lens extension part 340' formed therein can be reduced by the area UVR. If the curved-line part 345C' of the extended upper surface has not been formed, side light LR' incident on the area UVR may outward travel without being reflected because it has a small incident angle to the third surface 330'. That is, a change in the path along which the side light LR' travels can be very small.

If the curved-line part 345C' of the extended upper surface has been formed, the side light LR' incident on the area UVR can be incident on the extended upper surface 345'. The side light LR' incident on the extended upper surface 345' can be subjected to total reflection. The side light LR' reflected by the extended upper surface 345' may travel toward the extended side surface 347' or the extended lower surface 341'. That is, the path along which the side light LR' travels can be effectively changed by a geometric structure of the extended upper surface.

Figure 62:
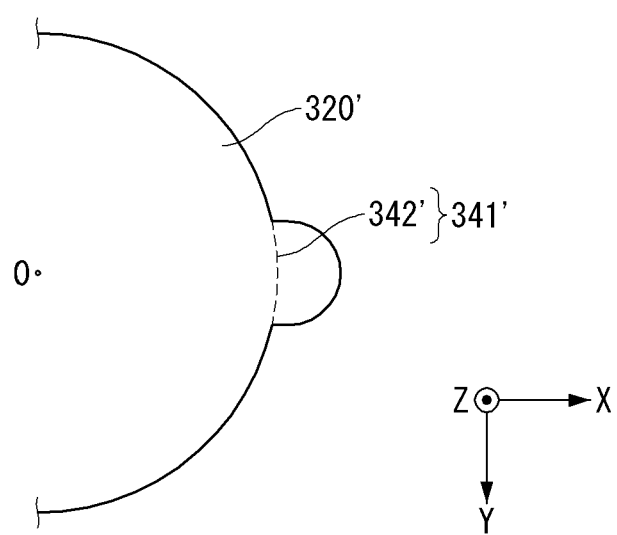

FIG. 62 is a diagram showing an extended lower surface of the lens extension part according to an embodiment of the present invention. FIG. 62 is a diagram of the lens extension part 340' view from the bottom. The extended lower surface 341' may include a first extended lower surface line 342' forming a boundary along with the second surface 320'. The first extended lower surface line 342' can be a virtual boundary. The width of the extended lower surface 341' can be outward narrowed.

Accordingly, the area of the extended lower surface 341' can become small with respect to the area of the boundary of the lens extension part 340' and the third surface 330'. That is, pressure applied to the lens extension part 340' can be effectively transferred to the body of the lens 300' through the third surface 330'.

Figure 63:
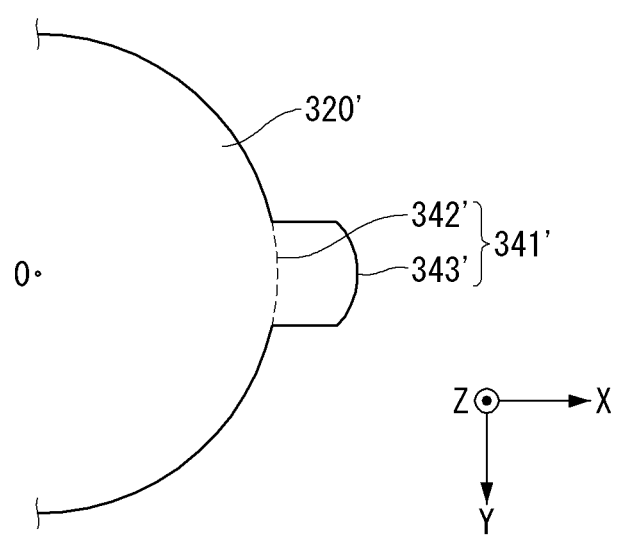

FIG. 63 is a diagram showing an extended lower surface of the lens extension part according to an embodiment of the present invention. In particular, FIG. 63 is a diagram of the lens extension part 340' viewed from the bottom.

The extended lower surface 341' may include a second extended lower surface line 343' facing the first extended lower surface line 342'. The second extended lower surface line 343' can be spaced apart from the first extended lower surface line 342' at a specific interval. Accordingly, pressure applied to the lens extension part 340' can be effectively distributed to the extended lower surface 341'.

Figure 64:
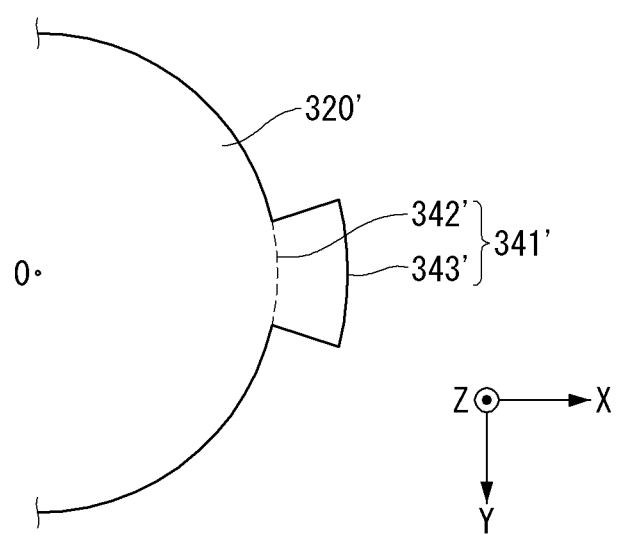
FIGS. 64 and 65 are diagrams showing the deployment of an optical assembly according to other embodiments of the present invention.

FIG. 64 is a diagram showing an extended lower surface of the lens extension part according to an embodiment of the present invention. FIG. 64 is a diagram of the lens extension part 340' viewed from the bottom. The second extended lower surface line 343', together with the first extended lower surface line 342', may share the center of a circular arc while maintaining a specific interval from the first extended lower surface line 342'. That is, if the center of the circular arc of the first and the second extended lower surface lines 342' and 343' is 'O', the light source is located at the center 'O' and thus a ray of traveling light can be taken into consideration. In this instance, a ray of light passing through the first extended lower surface line 342' can travel toward the second extended lower surface line 343' without outward traveling. Accordingly, the path along which side light travels can be effectively changed.

Figure 65:
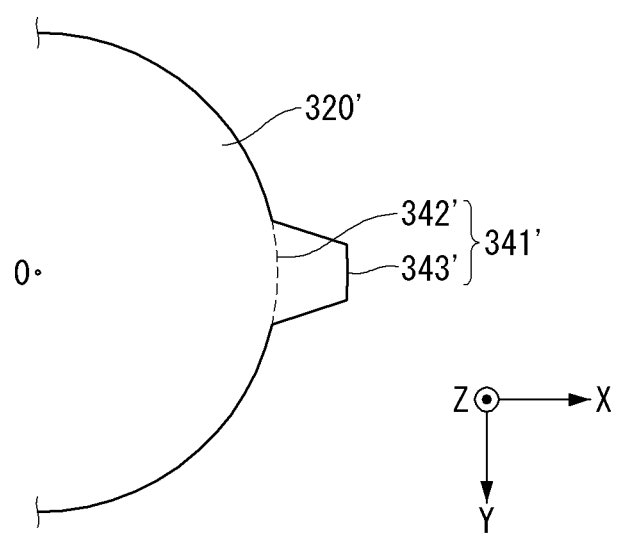

FIG. 65 is a diagram showing an extended lower surface of the lens extension part according to an embodiment of the present invention. FIG. 65 is a diagram of the lens extension part 340' viewed from the bottom. The second extended lower surface line 343' can be shorter than the first extended lower surface line 342'. In this instance, the area of the extended lower surface 341' can become small with respect to the area of the boundary of the lens extension part 340' and the third surface 330'. In other words, the width of the lens extension part 340' can be expressed as being smaller toward the outer side. In other words, the length of the Y direction can be expressed as being smaller as the distance in the X direction becomes distant. This can be applied if a great force is to be applied to the reflection sheet 126' of a small area.

FIGS. 66 to 69 are diagrams showing the lens installed on the substrate according to some embodiments of the present invention. In FIGS. 66 to 69, a plurality of the lens extension parts 340' can be formed. FIGS. 66 to 69 are diagrams of the upper part viewed from the lower part of the lens 300'.

Figure 66:
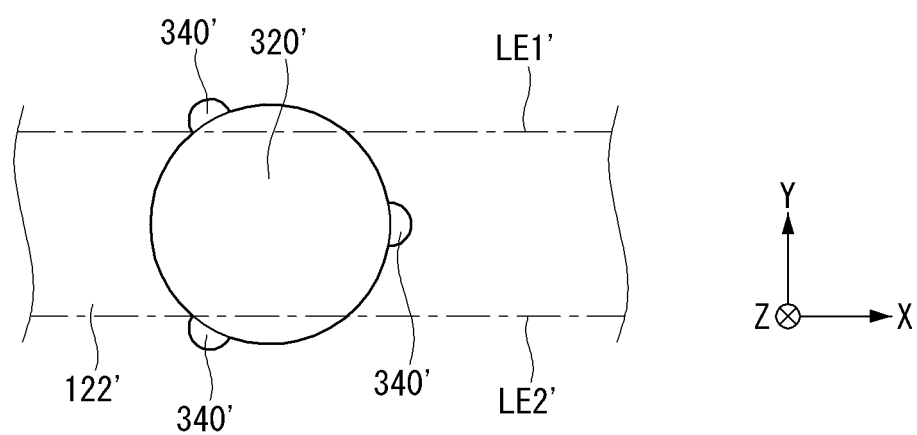
FIGS. 66 to 69 are diagrams showing a lens installed on a substrate according to some embodiments of the present invention.

As shown in FIG. 66, according to an embodiment of the present invention, a plurality of the lens extension parts 340' can be formed. The plurality of lens extension parts 340' can be identical. At least one of the lens extension parts 340' can be used to set right the orientation of the lens 300' installed on the substrate 122'. At least one of the lens extension parts 340' can closely attach the reflection sheet 126' to the frame.

Figure 67:
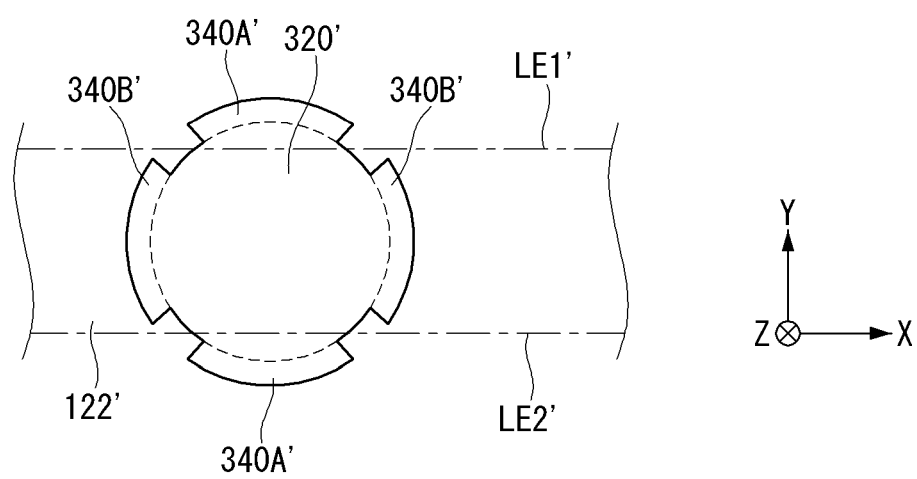

As shown in FIG. 67, according to an embodiment of the present invention, four lens extension parts 340' can be formed. The four lens extension parts 340' can be classified into two groups. The four lens extension parts 340' can be classified into lens extension parts 340B' facing each other in the X axis and lens extension parts 340A' facing each other in the Y axis. At least one of the lens extension parts 340B' facing each other in the X axis can be used to set right the orientation of the lens 300' installed on the substrate 122'. At least one of the lens extension parts 340B' facing each other in the X axis can closely attach the reflection sheet 126', laid on the substrate 122', to the substrate 122'. The lens extension parts 340A' facing each other in the Y axis can closely attach the reflection sheet 126' to the frame 130'. The lens extension parts 340B' facing each other in the X axis and the lens extension parts 340A' facing each other in the Y axis can be identical or different.

Figure 68:
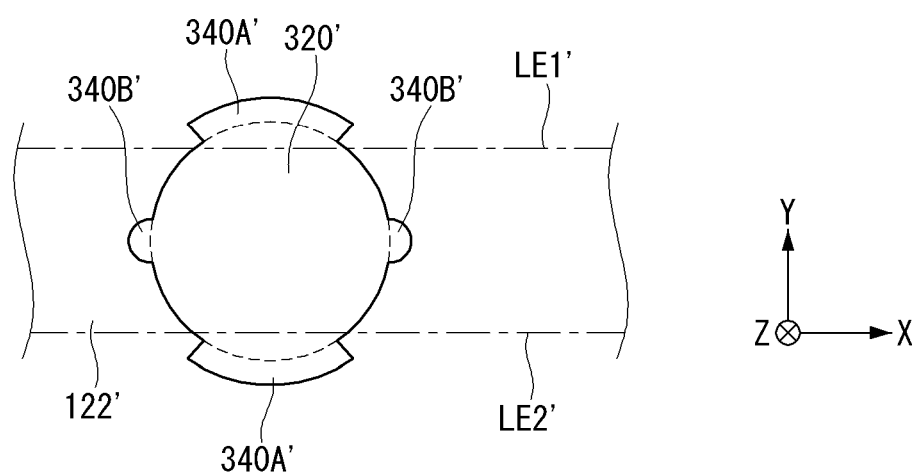

As shown in FIG. 68, according to an embodiment of the present invention, four lens extension parts 340' can be formed. The four lens extension parts 340' can be divided into two groups. The four lens extension parts 340' can be classified into lens extension parts 340B' facing each other in the X axis and lens extension parts 340A' facing each other in the Y axis. The width of the extended lower surface 341' of the lens extension parts 340A' facing each other in the Y axis can be greater than the width of the extended lower surface 341' of the lens extension parts 340B' facing each other in the X axis.

The lens extension parts 340A' facing each other in the Y axis may directly closely attach the reflection sheet 126' to the frame 130', or the lens extension parts 340B' facing each other in the X axis can closely attach the reflection sheet 126' to the frame 130' by closely attaching the reflection sheet 126' to the substrate 122'. That is, the lens 300' of FIG. 68 according to an embodiment of the present invention has a structure in which the reflection sheet 126' is directly closely attached to the frame 130'.

Figure 69:
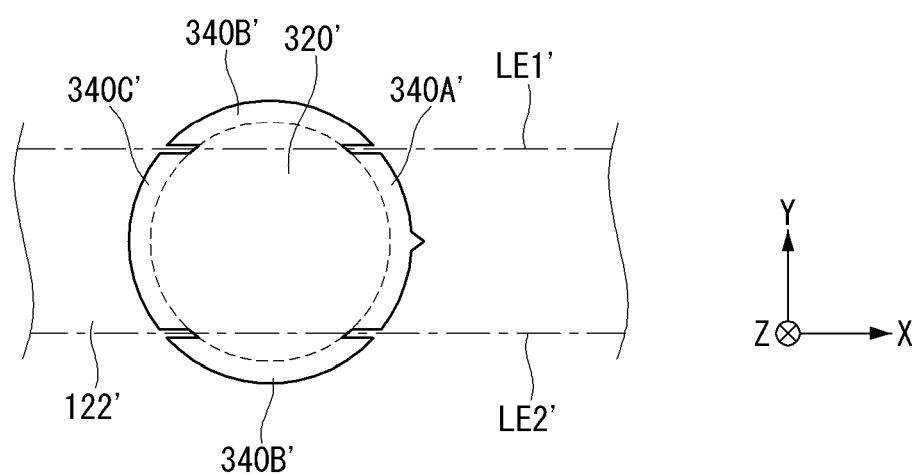

As shown in FIG. 69, according to an embodiment of the present invention, four lens extension parts 340' can be formed. The four lens extension parts 340' can be classified into two groups. The four lens extension parts 340' can be classified into lens extension parts 340B' facing each other in the X axis and lens extension parts 340A' and 340C' facing each other in the Y axis. The lens extension parts 340A' and 340C' facing each other in the Y axis can be classified in the X axis. The plurality of lens extension part 340' shown in FIG. 69 can be divided adjacent to the first long side LE1' or the second long side LE2'. That is, the area in which the lens 300' of FIG. 69 according to an embodiment of the present invention comes into contact with the reflection sheet 126' can be wide, and a ratio of side light whose path is changed in the lens 300' of FIG. 69 can be high. The lens extension parts 340B' facing each other in the X axis and the lens extension parts 340A' and 340C' facing each other in the Y axis may have different heights as described above. Accordingly, the reflection sheet 126' may have a difference in the height at the boundary of the lens extension parts 340'.

The foregoing embodiments are merely examples and are not to be considered as limiting the present disclosure. The present teachings can be readily applied to other types of methods and apparatuses. The features, structures, methods, and other characteristics of the embodiments described herein can be combined in various ways to obtain additional and/or alternative embodiments.

Certain embodiments or other embodiments of the invention described above are not mutually exclusive or distinct from each other. Any or all elements of the embodiments of the invention described above can be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit, comprising:
a frame having a bottom area and a sidewall area extended from the bottom area;
a substrate located on the bottom area of the frame;
a reflection sheet located on the substrate and having a hole;
a light source located on the substrate and disposed in the hole;
a lens located on the light source and comprising a first surface, a second surface forming a bottom surface of the lens and facing the first surface, a third surface connecting the first surface and the second surface; and
a plurality of lens extension parts extended outwardly from the third surface,
wherein the plurality of lens extension parts comprises at least one first lens extension part that overlaps at least a portion of the reflection sheet,
wherein a bottom surface of the at least one first lens extension part is substantially the same level as the second surface of the lens,
wherein the second surface of the lens comprises a concave part facing the light source,
wherein a mounting part of the second surface protrudes from the second surface between the concave part and the plurality of lens extension parts, and
wherein a height of the mounting part is smaller than a height of the at least one first lens extension part.

2. The backlight unit of claim 1, wherein the at least one first lens extension part protrudes outward from the substrate.

3. The backlight unit of claim 1, wherein at least a portion of the lens protrudes outward from the substrate.

4. The backlight unit of claim 1, wherein a diameter of the lens is different depending on a location on the lens.

5. The backlight unit of claim 1, wherein the reflection sheet comprises:
a first sheet area corresponding to the bottom area of the frame; and
a second sheet area corresponding to the sidewall area of the frame, and
wherein the second sheet area comprises a dot area configured to reduce an amount of reflected light.

6. The backlight unit of claim 1, wherein the substrate comprises a substrate groove, and
wherein the mounting part of the lens is fixed to the substrate groove.

7. The backlight unit of claim 2, wherein the plurality of lens extension parts further comprises at least one second lens extension part that overlaps the substrate.

8. The backlight unit of claim 4, wherein a shape of the lens is oval.

9. The backlight unit of claim 7, wherein a height of the second lens extension part is greater than the height of the mounting part.

10. The backlight unit of claim 7, wherein a distance from the second surface of the lens to the at least one first lens extension part is different than a distance from the second surface of the lens to the second lens extension part.

11. The backlight unit of claim 7, wherein shapes of the at least one first lens extension part and the second lens extension part are different from each other.

12. A display device, comprising:
a display panel;
a frame positioned at a back of the display panel and having a bottom area and a sidewall area extended from the bottom area;
a substrate located on the bottom area of the frame;
a reflection sheet located on the substrate and having a hole;
a light source located on the substrate and disposed in the hole;
a lens located on the light source and comprising a first surface, a second surface forming a bottom surface of the lens and facing the first surface, a third surface connecting the first surface and the second surface; and
a plurality of lens extension parts extended outwardly from the third surface,
wherein the plurality of lens extension parts comprise at least one first lens extension part that overlaps at least a portion of the reflection sheet,
wherein a bottom surface of the at least one first lens extension part is substantially the same level as the second surface of the lens,
wherein the second surface of the lens comprises a concave part facing the light source,
wherein a mounting part of the second surface protrudes from the second surface between the concave part and the plurality of lens extension parts, and
wherein a height of the mounting part is less than a height of the at least one first lens extension part.

13. The display device of claim 12, wherein the at least one first lens extension part protrudes outward from the substrate.

14. The display device of claim 12, wherein at least a portion of the lens protrudes outward from the substrate.

15. The display device of claim 12, wherein a diameter of the lens is different depending on a location on the lens.

16. The display device of claim 12, wherein the reflection sheet comprises:
a first sheet area corresponding to the bottom area of the frame; and
a second sheet area corresponding to the sidewall area of the frame, and
wherein the second sheet area comprises a dot area configured to reduce an amount of reflected light.

17. The display device of claim 12, wherein the substrate comprises a substrate groove, and
wherein the mounting part is fixed to the substrate groove.

18. The display device of claim 13, wherein the plurality of lens extension parts comprise at least one second lens extension part that overlaps the substrate.

19. The display device of claim 15, wherein a shape of the lens is oval.

20. The display device of claim 18, wherein a height of the second lens extension part is greater than the height of the mounting part.

21. The display device of claim 18, wherein a distance from the second surface of the lens to the at least one first lens extension part is different than a distance from the second surface of the lens to the second lens extension part.

22. The display device of claim 18, wherein shapes of the at least one first lens extension part and the second lens extension part are different from each other.

* * * * *